US012638859B2

(12) United States Patent
Lynch et al.

(10) Patent No.: US 12,638,859 B2
(45) Date of Patent: May 26, 2026

(54) BIPEDAL ACTION MODEL FOR HUMANOID ROBOT

(71) Applicant: Figure AI Inc., San Jose, CA (US)

(72) Inventors: Corey Lynch, San Jose, CA (US); Toki Migimatsu, San Jose, CA (US); Michael Ahn, San Jose, CA (US)

(73) Assignee: FIGURE AI, San Jose, CA (US)

( * ) Notice: Subject to any disclaimer, the term of this patent is extended or adjusted under 35 U.S.C. 154(b) by 0 days.

(21) Appl. No.: 19/362,617

(22) Filed: Oct. 20, 2025

(65) Prior Publication Data

US 2026/0126805 A1 May 7, 2026

Related U.S. Application Data

(63) Continuation-in-part of application No. 19/325,486, filed on Sep. 10, 2025.

(Continued)

(51) Int. Cl.
G05D 1/49 (2024.01)
B62D 57/032 (2006.01)
(Continued)

(52) U.S. Cl.
CPC .......... G05D 1/495 (2024.01); B62D 57/032 (2013.01); G06F 40/40 (2020.01); G06V 10/766 (2022.01);
(Continued)

(58) Field of Classification Search
USPC .................................................. 700/245–264
See application file for complete search history.

(56) References Cited

U.S. PATENT DOCUMENTS 5,673,367 A 9/1997 Buckley
7,024,276 B2 4/2006 Ito
(Continued)

FOREIGN PATENT DOCUMENTS

CN 102357889 2/2012
CN 209615545 11/2019
(Continued)

OTHER PUBLICATIONS

Jeung et al., Realization of human neck motion with novel robotic mechanism, 2016, IEEE, p. 482-486 (Year: 2016).
(Continued)

*Primary Examiner* — Jonathan L Sample

(57) ABSTRACT

The present disclosure provides a humanoid robot system comprising a mechanical structure including a torso, two arms, and two legs providing at least 30 degrees of freedom, actuators coupled to the degrees of freedom, a sensor suite comprising at least one camera and proprioceptive sensors including joint encoders and an inertial measurement unit, a computing system comprising at least one processor and memory storing instructions which, when executed, implement a hierarchical bipedal action model including a Beta model configured to receive multimodal input data and generate a token sequence indicative of task intent and environmental state, and an Alpha model configured to condition on the token sequence and current robot pose data to output continuous action chunks comprising sequences of future target joint states over a finite horizon, and a low-level controller configured to convert the continuous action chunks into actuator control signals for execution.

60 Claims, 24 Drawing Sheets

Related U.S. Application Data

(60) Provisional application No. 63/883,647, filed on Sep. 17, 2025, provisional application No. 63/819,533, filed on Jun. 6, 2025, provisional application No. 63/776,429, filed on Mar. 24, 2025, provisional application No. 63/760,617, filed on Feb. 19, 2025, provisional application No. 63/750,617, filed on Jan. 28, 2025, provisional application No. 63/725,279, filed on Nov. 26, 2024, provisional application No. 63/722,057, filed on Nov. 18, 2024, provisional application No. 63/715,270, filed on Nov. 1, 2024.

(51) Int. Cl.

| | |
|---|---|
| *G05D 1/495* | (2024.01) |
| *G06F 40/40* | (2020.01) |
| *G06V 10/766* | (2022.01) |
| *G06V 10/774* | (2022.01) |
| *G05D 101/15* | (2024.01) |
| *G05D 109/12* | (2024.01) |
| *G05D 111/50* | (2024.01) |

(52) U.S. Cl.
CPC ....... *G06V 10/774* (2022.01); *G05D 2101/15* (2024.01); *G05D 2109/12* (2024.01); *G05D 2111/52* (2024.01); *G05D 2111/58* (2024.01)

(56)  References Cited

U.S. PATENT DOCUMENTS

| | | | |
|---|---|---|---|
| 7,072,741 B2 | 7/2006 | Nagashima | |
| 7,308,336 B2 | 12/2007 | Takenaka | |
| 7,319,918 B2 | 1/2008 | Takenaka | |
| 7,386,364 B2 | 6/2008 | Mikami | |
| 7,664,569 B2 | 2/2010 | Shimizu | |
| D641,808 S | 7/2011 | Matsuda | |
| 8,224,652 B2 | 7/2012 | Wang | |
| D677,743 S | 3/2013 | Koshiishi | |
| D687,908 S | 8/2013 | Hoang | |
| D689,566 S | 9/2013 | Wong | |
| 8,942,849 B2 | 1/2015 | Maisonnier | |
| 9,205,560 B1 | 12/2015 | Edsinger | |
| 9,302,393 B1 * | 4/2016 | Rosen | G06N 3/008 |
| 9,494,415 B2 | 11/2016 | Sweetser | |
| 9,569,976 B2 | 2/2017 | Krauss | |
| D794,692 S | 8/2017 | Haranaka | |
| D795,320 S | 8/2017 | Liu | |
| D795,321 S | 8/2017 | Liu | |
| 9,789,607 B1 | 10/2017 | Whitman | |
| 9,842,585 B2 | 12/2017 | Huang | |
| 9,868,210 B1 | 1/2018 | Whitman | |
| D835,214 S | 12/2018 | Xiong | |
| D838,759 S | 1/2019 | Kowalski | |
| D841,708 S | 2/2019 | Koshiishi | |
| 10,203,209 B2 | 2/2019 | Roumeliotis | |
| 10,349,245 B2 | 7/2019 | Tokuchi | |
| D866,684 S | 11/2019 | Früh | |
| D868,866 S | 12/2019 | Gable | |
| D872,152 S | 1/2020 | Xiong | |
| D873,320 S | 1/2020 | Clerc | |
| 10,545,497 B1 | 1/2020 | Cui | |
| 10,571,896 B2 | 2/2020 | Benaim | |
| D885,451 S | 5/2020 | Chen | |
| D888,120 S | 6/2020 | Hurst | |
| D892,886 S | 8/2020 | Klassen | |
| D892,887 S | 8/2020 | Klassen | |
| D893,573 S | 8/2020 | Yan | |
| D898,789 S | 10/2020 | Nazarikhorram | |
| D911,459 S | 2/2021 | Xiong | |
| 10,946,528 B2 | 3/2021 | Gupta | |
| 10,960,539 B1 | 3/2021 | Kalakrishnan | |
| D932,531 S | 10/2021 | Xu | |
| 11,188,821 B1 | 11/2021 | Kalakrishnan | |
| 11,247,738 B2 | 2/2022 | Lavalley | |

| | | | |
|---|---|---|---|
| 11,416,003 B2 | 8/2022 | Whitman | |
| 11,498,223 B2 | 11/2022 | Williams | |
| 11,546,504 B2 | 1/2023 | Kim | |
| 11,600,010 B2 | 3/2023 | Doutre | |
| D985,643 S | 5/2023 | Li | |
| 11,645,444 B2 | 5/2023 | Scheutz | |
| 11,736,677 B2 | 8/2023 | Grunnet-Jepsen | |
| 11,833,680 B2 | 12/2023 | Deits | |
| 11,851,120 B2 | 12/2023 | Fay | |
| 11,999,423 B2 | 6/2024 | Whitman | |
| 12,054,208 B2 | 8/2024 | Swilling | |
| 12,070,863 B2 | 8/2024 | Whitman | |
| 12,077,229 B2 | 9/2024 | Whitman | |
| 12,097,626 B2 | 9/2024 | Ikeda | |
| D1,051,193 S | 11/2024 | Mahoor | |
| 12,134,181 B2 | 11/2024 | Klingensmith | |
| 12,172,537 B2 | 12/2024 | Gonano | |
| 12,205,214 B2 | 1/2025 | Starke | |
| 12,214,497 B2 | 2/2025 | Whitman | |
| 12,235,652 B2 | 2/2025 | Whitman | |
| 12,240,117 B2 | 3/2025 | Chebotar | |
| D1,069,875 S | 4/2025 | Belon | |
| 12,290,940 B1 | 5/2025 | Abate | |
| D1,082,881 S | 7/2025 | Wang | |
| 12,365,094 B2 | 7/2025 | Mccall | |
| 12,403,611 B2 | 9/2025 | Mccall | |
| 12,466,075 B2 * | 11/2025 | Stathis | B25J 9/1697 |
| 12,482,243 B1 * | 11/2025 | Cass | G06V 10/774 |
| 12,515,706 B2 * | 1/2026 | Li | B60W 60/0016 |
| 2002/0103576 A1 * | 8/2002 | Takamura | B25J 9/163 |
| | | | 700/245 |
| 2003/0060930 A1 * | 3/2003 | Fujita | B25J 9/1602 |
| | | | 700/245 |
| 2004/0015265 A1 * | 1/2004 | Asano | G06N 3/008 |
| | | | 700/245 |
| 2004/0019485 A1 * | 1/2004 | Kobayashi | G10L 13/033 |
| | | | 704/260 |
| 2004/0039483 A1 * | 2/2004 | Kemp | B62D 57/032 |
| | | | 700/245 |
| 2004/0230340 A1 * | 11/2004 | Fukuchi | G05D 1/0088 |
| | | | 318/568.12 |
| 2006/0217838 A1 | 9/2006 | Sugino | |
| 2009/0059033 A1 | 3/2009 | Shimada | |
| 2010/0280662 A1 | 11/2010 | Abdallah | |
| 2011/0058800 A1 | 3/2011 | Lee | |
| 2011/0071671 A1 | 3/2011 | Ihrke | |
| 2012/0072215 A1 | 3/2012 | Yu | |
| 2012/0078419 A1 | 3/2012 | Kim | |
| 2012/0155775 A1 * | 6/2012 | Ahn | G05D 1/0272 |
| | | | 701/527 |
| 2012/0215539 A1 | 8/2012 | Juneja | |
| 2012/0310412 A1 | 12/2012 | Seo | |
| 2013/0175816 A1 | 7/2013 | Kawasaki | |
| 2013/0345863 A1 | 12/2013 | Linder | |
| 2014/0039675 A1 | 2/2014 | Ead | |
| 2015/0192399 A1 | 7/2015 | Raab | |
| 2015/0290795 A1 | 10/2015 | Oleynik | |
| 2016/0008988 A1 | 1/2016 | Kennedy | |
| 2016/0064263 A1 | 3/2016 | Hosek | |
| 2017/0028551 A1 * | 2/2017 | Hemken | B25J 9/163 |
| 2017/0028563 A1 | 2/2017 | Hemken | |
| 2017/0080582 A1 | 3/2017 | Mugnier | |
| 2017/0125008 A1 | 5/2017 | Maisonnier | |
| 2017/0326736 A1 | 11/2017 | Nagatsuka | |
| 2018/0136912 A1 | 5/2018 | Venkataramani | |
| 2018/0182260 A1 | 6/2018 | Ciniello | |
| 2018/0232201 A1 | 8/2018 | Holtmann | |
| 2018/0357552 A1 | 12/2018 | Campos | |
| 2019/0005374 A1 * | 1/2019 | Shankar | B25J 9/161 |
| 2019/0079924 A1 | 3/2019 | Sugiura | |
| 2019/0100263 A1 | 4/2019 | Amino | |
| 2019/0163985 A1 * | 5/2019 | Wang | G06Q 30/00 |
| 2019/0329413 A1 | 10/2019 | Johnson | |
| 2019/0371307 A1 | 12/2019 | Zhao | |
| 2020/0009739 A1 | 1/2020 | Moon | |
| 2020/0086479 A1 | 3/2020 | Messier | |
| 2020/0117214 A1 * | 4/2020 | Jonak | G01S 17/89 |
| 2020/0117336 A1 * | 4/2020 | Mani | G06F 9/453 |
| 2020/0368616 A1 * | 11/2020 | Delamont | A63F 13/52 |

(56) References Cited

U.S. PATENT DOCUMENTS

| | | | | |
|---|---|---|---|---|
| 2021/0331313 | A1* | 10/2021 | Klingensmith | B25J 13/006 |
| 2021/0390420 | A1* | 12/2021 | Barnett | G06N 5/02 |
| 2022/0226996 | A1 | 7/2022 | Ishizuka | |
| 2022/0294062 | A1 | 9/2022 | Kamon | |
| 2022/0314448 | A1* | 10/2022 | Wales | B25J 9/161 |
| 2022/0388174 | A1 | 12/2022 | Stathis | |
| 2022/0390952 | A1 | 12/2022 | Yu | |
| 2022/0410380 | A1 | 12/2022 | Lu | |
| 2023/0048725 | A1 | 2/2023 | Barbour | |
| 2023/0126906 | A1* | 4/2023 | Kranski | B25J 9/161 |
| | | | | 700/245 |
| 2023/0129990 | A1* | 4/2023 | Liu | B25J 9/163 |
| | | | | 700/246 |
| 2023/0143315 | A1 | 5/2023 | Whitman | |
| 2023/0168921 | A1* | 6/2023 | Kim | G06F 15/80 |
| | | | | 712/220 |
| 2023/0173683 | A1 | 6/2023 | Gomez | |
| 2023/0182296 | A1 | 6/2023 | Sermanet | |
| 2023/0222454 | A1* | 7/2023 | Cella | B25J 9/1682 |
| | | | | 705/28 |
| 2023/0306302 | A1* | 9/2023 | Mori | G06N 3/092 |
| 2023/0347514 | A1 | 11/2023 | Xiao | |
| 2023/0390948 | A1 | 12/2023 | Hsu | |
| 2024/0091964 | A1 | 3/2024 | Smith | |
| 2024/0095077 | A1* | 3/2024 | Singh | G06F 9/5027 |
| 2024/0181637 | A1 | 6/2024 | Gillett | |
| 2024/0193848 | A1* | 6/2024 | Wang | G06T 15/06 |
| 2024/0199068 | A1* | 6/2024 | Pavone | B60W 60/001 |
| 2024/0217104 | A1 | 7/2024 | Neville | |
| 2024/0228191 | A1 | 7/2024 | Kumar | |
| 2024/0289973 | A1* | 8/2024 | Liu | A61F 2/6607 |
| 2024/0416963 | A1* | 12/2024 | Li | B60W 60/0016 |
| 2025/0050507 | A1 | 2/2025 | Camasmie | |
| 2025/0147517 | A1 | 5/2025 | Swilling | |
| 2025/0196326 | A1 | 6/2025 | Katz | |
| 2025/0196327 | A1 | 6/2025 | Geating | |
| 2025/0218160 | A1* | 7/2025 | Wang | G06V 10/82 |

FOREIGN PATENT DOCUMENTS

| | | |
|---|---|---|
| CN | 210998685 | 7/2020 |
| CN | 115649316 | 1/2023 |
| CN | 218802294 | 4/2023 |
| CN | 117301022 | 12/2023 |
| CN | 117462367 | 1/2024 |
| KR | 3020240036125 | 9/2024 |
| SU | 1734994 | 5/1992 |
| WO | 2023107501 | 6/2023 |
| WO | 2023110778 | 6/2023 |
| WO | 2023246994 | 12/2023 |
| WO | 2023246995 | 12/2023 |
| WO | 2024058844 | 3/2024 |
| WO | 2024085904 | 4/2024 |
| WO | 2024112350 | 5/2024 |
| WO | 2024112351 | 5/2024 |
| WO | 2024123766 | 6/2024 |
| WO | 2024163992 | 8/2024 |
| WO | D243074010 | 10/2024 |
| WO | 2025019583 | 1/2025 |
| WO | 2025042802 | 2/2025 |
| WO | 2025072321 | 4/2025 |

OTHER PUBLICATIONS

Barker et al., Natural head movement for HRI with a muscular-skeletal head and neck robot, 2017, IEEE, p. 587-592 (Year: 2017).
Gao et al., Development of a low motion-noise humanoid neck: Statics analysis and experimental validation, 2010, IEEE, p. 1203-1208 (Year: 2010).
International Search Report for PCT/US2025/012544.
International Search Report for PCT/US2025/010425.
International Search Report for PCT/US2025/011450.
Keselman et al., "Intel RealSense stereoscopic depth cameras," in Proceedings of the IEEE Conference on Computer Vision and Pattern Recognition Workshops, pp. 1-10, 2017.
Brown et al., "Language Models are Few-Shot Learners," arXiv:2005. 14165v4 (Jul. 22, 2020).
Bjorck, Johan, et al. "Gr00t n1: An open foundation model for generalist humanoid robots." arXiv preprint arXiv:2503.14734 (Mar. 18, 2025).
Chang et al., "A Survey on Evaluation of Large Language Models," ACM Trans. Intell. Syst. Technol., vol. 15, No. 3, Article 39. (Mar. 2024).
Chen et al., "InternVL: Scaling up Vision Foundation Models and Aligning for Generic Visual-Linguistic Tasks," https://github.com/OpenGVLab/InternVL (2024).
Gia et al., "Densely Connected Feature Pyramid Network for Image Segmentation," 2020 8th International Conference on Digital Home (ICDH).
Jin et al., "Unified Language-Vision Pretraining in LLM With Dynamic Discrete Visual Tokenization," arXiv:2309.04669v3 [cs. CV] Mar. 22, 2024.
Kim et al., "Parallel Feature Pyramid Network for Object Detection," ECCV 2018.
Kim et al., "Giving Robots a Hand: Learning Generalizable Manipulation with Eye-in-Hand Human Video Demonstrations," arXiv:2307. 05959v1 (Jul. 12, 2023).
Kirillov et al., "Panoptic Feature Pyramid Networks," IEEE Xplore (2018).
Lee et al., "Learning Robot Activities from First-Person Human Videos Using Convolutional Future Regression," IEEE Xplore (2017).
Li et al., "Supervision Exists Everywhere: A Data Efficient Contrastive Language-Image Pre-Training Paradigm," arXiv:2110. 05208v2 (Mar. 14, 2022).
Li et al., BLIP: Bootstrapping Language-Image Pre-training for Unified Vision-Language Understanding and Generation, Proceedings of the 39 th International Conference on Machine Learning, Baltimore, Maryland, USA, PMLR 162, 2022.
Lin et al., "Feature Pyramid Networks for Object Detection," IEEE Xplore (2016).
Lin et al., "Feature Pyramid Networks for Object Detection," IEEE Xplore (2024).
Liu et al., "A Survey of Attacks on Large Vision-Language Models: Resources, Advances, and Future Trends," Journal of Latex Class Files, vol. 14, No. (Aug. 8, 2021).
Liu et al., "Imitation from Observation: Learning to Imitate Behaviors from Raw Video via Context Translation," arXiv:1707.03374v2 (Jun. 18, 2018).
Liu et al., "RoBERTa: A Robustly Optimized BERT Pretraining Approach," arXiv:1907.11692v1 (Jul. 26, 2019).
Liu et al., "Improved Baselines with Visual Instruction Tuning," IEEE Xplore (2024).
Liu et al., "Visual Instruction Tuning," 37th Conference on Neural Information Processing Systems (NeurIPS 2023).
Lin et al., "VILA: On Pre-training for Visual Language Models," https://github.com/Efficient-Large-Model/VILA (2024).
Mandi et al., "Towards More Generalizable One-shot Visual Imitation Learning," bencharXiv: 2110.13423v2 [cs.RO] Feb. 8, 2022.
Maniparambil et al., "Do Vision and Language Encoders Represent the World Similarly?" IEEE Xplore (2024).
Nvidia "Object Detection Synthetic DataGeneration," Nvidia Corporation, (Nov. 9, 2024).
Peng et al., "DeepMimic: Example-Guided Deep Reinforcement Learning of Physics-Based Character Skills," ACM Trans. Graph., vol. 37, No. 4, Article 143. Publication date: Aug. 2018.
Radford et al., "Improving Language Understanding by Generative Pre-Training," 2018.
Radford et al., "Language Models are Unsupervised Multitask Learners," 2019.
Radford et al., "Learning Transferable Visual Models From Natural Language Supervision," Proceedings of the 38 th International Conference on Machine Learning, PMLR 139, 2021.

(56) References Cited

OTHER PUBLICATIONS

Raffel et al., "Exploring the Limits of Transfer Learning with a Unified Text-to-Text Transformer," Journal of Machine Learning Research 21 (2020) 1-67.
Ramachandruni et al., "Attentive Task-Net: Self Supervised Task-Attention Network for Imitation Learning using Video Demonstration," 2020 IEEE International Conference on Robotics and Automation (ICRA) May 31—Paris, France. (Aug. 31, 2020).
Rombach et al., "High-Resolution Image Synthesis with Latent Diffusion Models," IEEE Xplore (2022).
Sanh et al., "DistilBERT, a distilled version of BERT: smaller, faster, cheaper and lighter," arXiv:1910.01108v4 (Mar. 1, 2020).
Schulman et al., "Proximal Policy Optimization Algorithms," arXiv:1707.06347v2 (Aug. 28, 2017).
Sharma et al., "Third-Person Visual Imitation Learning via Decoupled Hierarchical Controller," 33rd Conference on Neural Information Processing Systems (NeurIPS 2019), Vancouver, Canada.
Sieb et al., "Graph-Structured Visual Imitation," 3rd Conference on Robot Learning (CoRL 2019), Osaka, Japan. (May 12, 2020).
Smith et al., "AVID: Learning Multi-Stage Tasks via Pixel-Level Translation of Human Videos,"arXiv:1912.04443v3 (Jun. 21, 2020).
Stadie et al., "Third-Person Imitation Learning," arXiv:1703.01703v2 (Sep. 22, 2019).
Touvron et al., "Llama 2: Open Foundation and Fine-Tuned Chat Models," arXiv:2307.09288v2 (Jul. 19, 2023).
Vaswani et al., "Attention Is All You Need," 31st Conference on Neural Information Processing Systems (NIPS 2017), Long Beach, CA, USA. (Jun. 12, 2017).
Wang et al., "Structbert: Incorporating Language Structures Into Pre-Training for Deep Language Understanding,," arXiv:1908.04577v3 (Sep. 27, 2019).
Xiong et al., "Learning by Watching: Physical Imitation of Manipulation Skills from Human Videos," arXiv:2101.07241v2 (Nov. 14, 2021).
Yao et al., "Filip: Fine-Grained Interactive Language-Image Pre-Training," arXiv:2111.07783v1 (Nov. 9, 2021).
Yin et al., "A Survey on Multimodal Large Language Models," arXiv:2306.13549v2 (Apr. 1, 2024).
Sun et al., "Learning by Watching via Keypoint Extraction and Imitation Learning," Machines 2022, 10, 1049. https://doi.org/10.3390/machines10111049 (Nov. 9, 2022).
Hebi Robotics, "T-Series Actuator," Jan. 29, 2024.
Available online at https://youtu.be/YsdnsNjvwKo?si=bu2dXk8mQaL86C2M, at least as early as Aug. 23, 2023.
Available online at https://www.youtube.com/watch?v=q8ldbodRG14, at least as early as May 22, 2019.
Available online at https://youtu.be/GtPs_ygfaEA?si=7lv6MEFvFoaacKfa, at least as early as Aug. 15, 2023.
Available online at https://www.youtube.com/watch?v=G6JE7mNYz2A, at least as early as Oct. 17, 2024.
Available online at https://www.youtube.com/watch?v=FuNFr7V7KFQ, at least as early as Aug. 19, 2024.
Available online at https://www.youtube.com/watch?v=GzX1qOIO1bE, at least as early as May 13, 2024.
Available online at https://youtu.be/_MBd_XfXy9M?si=PbEHUJpRUFqaxS3J, at least as early as Jun. 26, 2023.
Available online at https://youtu.be/SHPxcRBIXNO?si=VbJqbK7jzUqtZGmn, at least as early as Sep. 26, 2023.
Available online at https://youtu.be/BvFxD-8AhJA?si=Vx1F4a76tbQDUX48, at least as early as Nov. 16, 2023.
Available online at https://www.youtube.com/watch?v=jWTWWuzB6Cg, at least as early as Aug. 27, 2024.
Available online at https://www.youtube.com/watch?v=B-ebMigAHzQ, at least as early as Sep. 30, 2024.
Available online at https://youtu.be/XiQkeWOFwmk?si=1qOPC8gXgmmGvXRT, at least as early as May 16, 2023.
Available online at https://youtu.be/cpraXaw7dyc?si=JvPaT6eMA18psrmU, at least as early as Dec. 13, 2023.
Available online at https://www.youtube.com/watch?v=DrNcXgoFv20, at least as early as Oct. 18, 2024.

Available online at https://youtu.be/BNSZ8Fwcd20?si=_YnVgjYblVuhASk1, at least as early as Oct. 27, 2023.
Available online at https://youtu.be/SS3Ga2HQQ0s?si=Dwr3sJuCsOeUoSLj, at least as early as Nov. 20, 2023.
Available online at https://www.youtube.com/watch?v=iWC8rSjDywU, at least as early as Oct. 18, 2024.
Available online at https://youtu.be/sihlDeJ4Hmk?si=fJsKpvRFPzFejmS6, at least as early as Dec. 27, 2023.
Available online at https://www.youtube.com/watch?v=zkBnFPBV3f0, at least as early as Jul. 11, 2013.
Available online at https://www.youtube.com/watch?v=oXBYZxa25vc&t=1s, at least as early as Apr. 3, 2013.
Available online at https://www.youtube.com/watch?v=LBeml9AmTT4, at least as early as Apr. 7, 2015.
Available online at https://www.youtube.com/watch?v=IE-YBaYjbqY, at least as early as Dec. 10, 2013.
Available online at https://www.youtube.com/watch?v=y-j4dixQQml&t=222s, at least as early as May 22, 2012.
Available online at https://www.youtube.com/watch?v=Bmglbk_Op64&t=1s, at least as early as Nov. 10, 2011.
Available online at https://www.youtube.com/watch?v=20GHG-R9eFI, at least as early as Mar. 6, 2023.
Available online at https://www.youtube.com/watch?v=bUrLuUxv9gE, at least as early as Aug. 30, 2024.
Available online at https://www.youtube.com/watch?v=- 9EM5_VFIt8, at least as early as Apr. 16, 2024.
Available online at https://www.youtube.com/watch?v=29ECwExc-_M&t=2s, at least as early as Apr. 17, 2024.
Available online at https://www.youtube.com/watch?v=67CUudkjEG4, at least as early as Oct. 26, 2009.
Available online at https://www.youtube.com/watch?v=yBmatGQ0giY&t=1s, at least as early as Aug. 11, 2022.
Available online at https://www.youtube.com/watch?v=bdVrWxjK2vo, at least as early as Sep. 17, 2024.
Available online at https://www.youtube.com/watch?v=qw2y0kceAv0, at least as early as Oct. 15, 2024.
Available online at https://www.youtube.com/watch?v=B_I2k7MZEKg, at least as early as Jun. 30, 2024.
Available online at https://www.youtube.com/watch?v=CbA9wA9etGA, at least as early as Sep. 19, 2024.
Available online at https://www.youtube.com/watch?v=zLhA-RWBBYU, at least as early as Jul. 5, 2024.
Available online at https://www.youtube.com/watch?v=_mQJw8VhZ7w&t=111s, as least as early as Oct. 5, 2022.
Available online at https://www.youtube.com/watch?v=1fC7b2LjVW4, at least as early as Jul. 12, 2016.
Available online at https://www.youtube.com/watch?v=UPOLcE1vwA0, at least as early as Apr. 28, 2016.
Available online at https://www.youtube.com/watch?v=UBbk18oZbTc, at least as early as Oct. 14, 2024.
Available online at https://www.youtube.com/watch?v=UHe1zSQwep0, at least as early as Oct. 14, 2024.
Available online at https://www.youtube.com/watch?v=MCbGeC-kuBM, at least as early as Aug. 5, 2024.
Available online at https://www.youtube.com/watch?v=ujdK3yd2gHY, at least as early as Jul. 2, 2024.
Available online at https://www.youtube.com/watch?v=-HizP4UQvug, at least as early as Apr. 25, 2024.
Available online at https://www.youtube.com/watch?v=ioOkbUQqmZ0, at least as early as Nov. 9, 2022.
Available online at https://www.youtube.com/watch?v=zmqWU2dQKZ8, at least as early as Oct. 24, 2024.
Available online at https://www.youtube.com/watch?v=q8ldbodRG14, at least as early as Feb. 26, 2024.
Available online at https://www.youtube.com/watch?v=CUhuhleQNos, at least as early as May 22, 2019.
Available online at https://www.youtube.com/watch?v=dY57qnD_O7U, at least as early as Jul. 27, 2021.
Pateromichelakis et al., Head-eyes system and gaze analysis of the humanoid robot Romeo, 2014, IEEE, p. 1374-1379 (Year: 2014).
Ye, Seonghyeon, et al. "Latent action pretraining from videos." arXiv preprint arXiv:2410.11758 (2024).

(56)          References Cited

OTHER PUBLICATIONS

Zhang et al., "An Object Attribute Guided Framework for Robot Learning Manipulations from Human Demonstration Videos," 2019 IEEE/RSJ International Conference on Intelligent Robots and Systems (IROS) Macau, China, (Nov. 4, 2019).
Zhang et al., "MM-LLMs: Recent Advances in MultiModal Large Language Models," arXiv:2401.13601v5 (May 28, 2024).
Zhang et al., "Llama-Adapter: Efficient Fine-Tuning of Large Language Models With Zero-Initialized Attention," arXiv:2303.16199v3 (Sep. 18, 2024).
Zhou et al., "Watch, Try, Learn: Meta-Learning From Demonstrations and Rewards," arXiv:1906.03352v4 (Jan. 30, 2020).
International Search Report for PCT/US2025/016930.
Nakada et al., Deep Learning of Neuromuscular and Visuomotor Control of a Biomimetic Simulated Humanoid, 2020, IEEE, p. 3952-3959 (Year: 2020).
Lim et al., Basic emotional walking using a biped humanoid robot, 1999, IEEE, p. 954-959 (Year: 1999).
Albers et al., Upper Body of a new Humanoid Roboy—the Design of Armar III, 2006, IEEE, p. 308-309 (Year: 2006).
International Search Report for PCT/US2025/023064.
Englsberger et al., "Overview of the Torque-Controlled Humanoid Robot TORO," 2014 14th IEEE-RAS International Conference on Humanoid Robots (Humanoids), Nov. 18-20, 2014. Madrid, Spain.
Mikayla Tetteh-Martey, (date posted Nov. 3, 2024), Blurring Lines: Resurgence of 'I, Robot', Cornellsun.com, URL: (https:// www.cornellsun.com/article/2024/11/blurring-lines-resurgence-of-i-robot/, (Year: 2024).
Mike Oitzman, (date posted Aug. 6, 2024), Figure 02 humanoid robot is ready to get to work, therobotreport.com, URL: (https:// www.therobotreport.com/figure-02-humanoid-robot-is-ready-to-get-to-work/), (Year: 2024).
International Search Report for PCT/US2025/019793.
International Search Report for PCT/US2025/025005.
International Search Report for PCT/US2025/024817.
Cheng et al., "Human Posture Estimation Using Voxel Data for "Smart" Airbag Systems: Issues and Framework," IEEE, p. 84-89 (2004).
Droeschel et al., "Learning to Interpret Pointing Gestures with a Time-of-Flight Camera," IEEE, p. 481-488 (2025).
Frohlich et al., "Design and Impementation of a Spherical Joint for Mobile Manipulators," IEEE, p. 251-258 (2025).
Netzev et al., "Many Faced Robot—Design and Manufacturing of a parametric, Modular and Open Source Robot Head," IEEE, p. 342-348 (2019).
Netzev et al., Design and implementation of a spherical joint for mobile manipulators, 2019, IEEE, p. 342-348 (Year: 2019).
Haddadin et al., The "DLR crash report": Towards a standard crash-testing protocol for robot safety—Part II: Discussions, 2009, IEEE, p. 280-287 (Year: 2009).
Yaghoubi et al., Region-Based CNNs for Pedestrian Gender Recognition in Visual Surveillance Environments, 2019, IEEE, p. 1-5 (Year: 2019).
Pateromichelakis et al., Head-eyes system and gaze analysis of the humanoid robot Romeo, 2014, IEEE, p. 1374-131379 (Year: 2014).
Mokhtari et al., Taban:A Retro-Projected Social Robotic—Head for Human-Robot Interaction, 2019, IEEE, p. 46-51 (Year: 2019).
International Search Report for PCT/US25/23325.
Kim, Moo Jin, et al. "Openvla: An open-source vision-language-action model." arXiv preprint arXiv:2406.09246 (Jun. 13, 2024).
Advancing Physical AI with NVIDIA Cosmos World Foundation Model Platform, avaiable at https://developer.nvidia.com/blog/advancing-physical-ai-with-nvidia-cosmos-world-foundation-model-platform/ (Jan. 9, 2025).
Building a Synthetic Motion Generation Pipeline for Humanoid Robot Learning, avaiable at https://developer.nvidia.com/blog/building-a-synthetic-motion-generation-pipeline-for-humanoid-robot-learning/ (Mar. 18, 2025).
Brohan, Anthony, et al. "Rt-1: Robotics transformer for real-world control at scale." arXiv preprint arXiv:2212.06817 (Dec. 13, 2022).

Zitkovich, Brianna, et al. "Rt-2: Vision-language-action models transfer web knowledge to robotic control." Conference on Robot Learning. PMLR, (Jul. 28, 2023).
Lynch, Corey, et al. "Interactive language: Talking to robots in real time." IEEE Robotics and Automation Letters (Oct. 12, 2023).
Team, Octo Model, et al. "Octo: An open-source generalist robot policy." arXiv preprint arXiv:2405.12213 (May 20, 2024).
Lynch, Corey, Kamelia Aryafar, and Josh Attenberg. "Images don't lie: Transferring deep visual semantic features to large-scale multimodal learning to rank." Proceedings of the 22nd ACM SIGKDD international conference on knowledge discovery and data mining. (Nov. 20, 2015).
Sermanet, Pierre, et al. "Time-contrastive networks: Self-supervised learning from video." 2018 IEEE international conference on robotics and automation (ICRA). IEEE, (Mar. 20, 2018).
Dwibedi, Debidatta, et al. "Learning actionable representations from visual observations." 2018 IEEE/RSJ international conference on intelligent robots and systems (IROS). IEEE, Feb. 2, 2018).
Lynch, Corey, et al. "Learning latent plans from play." Conference on robot learning. Pmlr, (Dec. 20, 2020).
Pirk, Sören, et al. "Online object representations with contrastive learning." arXiv preprint arXiv:1906.04312 (Jun. 10, 2019).
Gupta, Abhishek, et al. "Relay policy learning: Solving long-horizon tasks via imitation and reinforcement learning." arXiv preprint arXiv:1910.11956 (Oct. 25, 2019).
Lynch, Corey, and Pierre Sermanet. "Language conditioned imitation learning over unstructured data." arXiv preprint arXiv:2005.07648 (Jul. 7, 2020).
Jang, Eric, et al. "Bc-z: Zero-shot task generalization with robotic imitation learning." Conference on Robot Learning. PMLR, (Feb. 4, 2022).
Gupta, Abhishek, et al. "Bootstrapped autonomous practicing via multi-task reinforcement learning." arXiv preprint arXiv:2203.15755 (Mar. 29, 2022).
Heravi, Negin, et al. "Visuomotor control in multi-object scenes using object-aware representations." arXiv preprint arXiv:2205.06333 (May 12, 2022).
Ding, Tianli, et al. "Goalseye: Learning high speed precision table tennis on a physical robot." arXiv preprint arXiv:2210.03662 (Oct. 13, 2022).
Driess, Danny, et al. "Palm-e: An embodied multimodal language model." (Mar. 6, 2023).
Wiedebach, Georg, et al. "Walking on partial footholds including line contacts with the humanoid robot atlas." 2016 IEEE-RAS 16th International Conference on Humanoid Robots (Humanoids). IEEE, 2016.
Griffin, Robert J., et al. "Walking stabilization using step timing and location adjustment on the humanoid robot, atlas." 2017 IEEE/RSJ International Conference on Intelligent Robots and Systems (IROS). IEEE, 2017.
Griffin, Robert J., et al. "Straight-leg walking through underconstrained whole-body control." 2018 IEEE International Conference on Robotics and Automation (ICRA). IEEE, 2018.
Griffin, Robert J., et al. "Capture point trajectories for reduced knee bend using step time optimization." 2017 IEEE-RAS 17th International Conference on Humanoid Robotics (Humanoids). IEEE, 2017.
Griffin, Robert J., et al. "Footstep planning for autonomous walking over rough terrain." 2019 IEEE-RAS 19th international conference on humanoid robots (humanoids). IEEE, 2019.
Garcia, Gabriel, Robert Griffin, and Jerry Pratt. "0-step capturability, motion decomposition and global feedback control of the 3D variable height-inverted pendulum." arXiv preprint arXiv:1912.06078 (2019).
Dafarra, Stefano, et al. "Non-linear trajectory optimization for large step-ups: Application to the humanoid robot atlas." 2020 IEEE/RSJ International Conference on Intelligent Robots and Systems (IROS). IEEE, 2020.
Calvert, Duncan, et al. "A fast, autonomous, bipedal walking behavior over rapid regions." 2022 IEEE-RAS 21st International Conference on Humanoid Robots (Humanoids). IEEE, 2022.

* cited by examiner 1.2.8

Figures 4, 5:
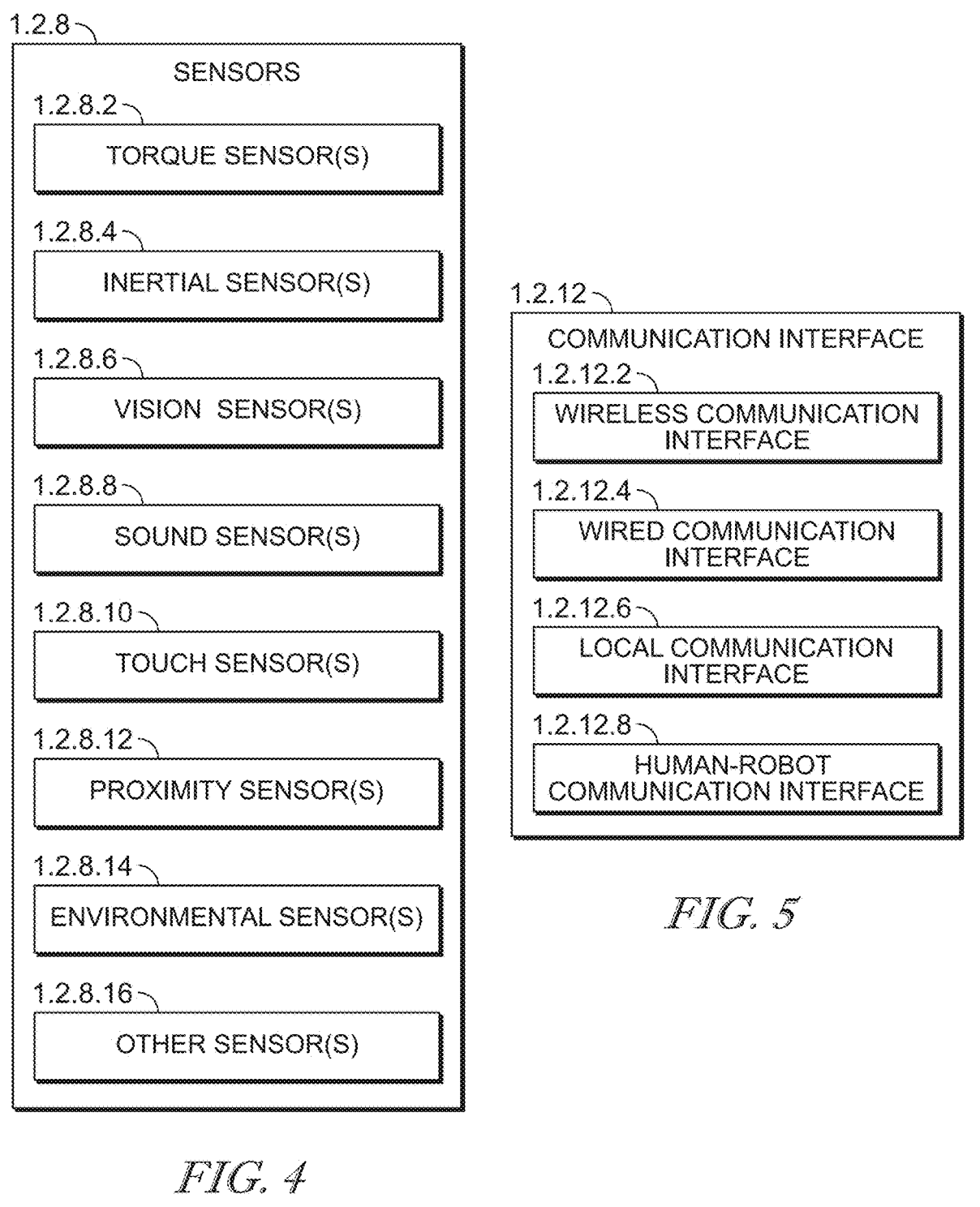

SENSORS

1.2.8.2
TORQUE SENSOR(S)

1.2.8.4
INERTIAL SENSOR(S)

1.2.8.6
VISION SENSOR(S)

1.2.8.8
SOUND SENSOR(S)

1.2.8.10
TOUCH SENSOR(S)

1.2.8.12
PROXIMITY SENSOR(S)

1.2.8.14
ENVIRONMENTAL SENSOR(S)

1.2.8.16
OTHER SENSOR(S)

COMMUNICATION INTERFACE

1.2.12.2
WIRELESS COMMUNICATION INTERFACE 1.2.12.4
WIRED COMMUNICATION INTERFACE 1.2.12.6
LOCAL COMMUNICATION INTERFACE 1.2.12.8
HUMAN-ROBOT COMMUNICATION INTERFACE

MOVEMENT CONTROLLER

1320

COORDINATION ENGINE

1356

BODY COORDINATION PLANNER

1360

FOOT PLACEMENT PLANNER

1370

NAVIGATION ENGINE

1344

COMMUNICATION MODULE

1346

DATA STORAGE

1348

OTHER

1350

BEHAVIOR MANAGER

1364

MODEL PREDICTIVE CONTROL ENGINE

1390

MODE MANAGER

1352

AUTONOMY SELECTOR

1414

COMMUNICATION MODULE

1416

DATA STORAGE

1418

OTHER

3000

COLLECT TRAINING DATA
3002

SELECTED DEPLOYMENT
CONFIGURATION
3006

PREPARE TRAINING DATA
3004

SELECTED ARCHITECTURE
3008

INGEST TRAINING DATA
3010

SELECT AND APPLY LEARNING METHOD TO
GENERATE HIERARCHICAL BAM
3012

FINETUNE HIERARCHICAL BAM 3020

MODIFY ONE OR MORE FEATURES OF
TRAINING DATA IN 4002
3022

ITERATIVELY TRAIN BAM USING THE
MODIFIED DATA
3024

GENERATE HIERARCHICAL BAM
3026

Figure 11:
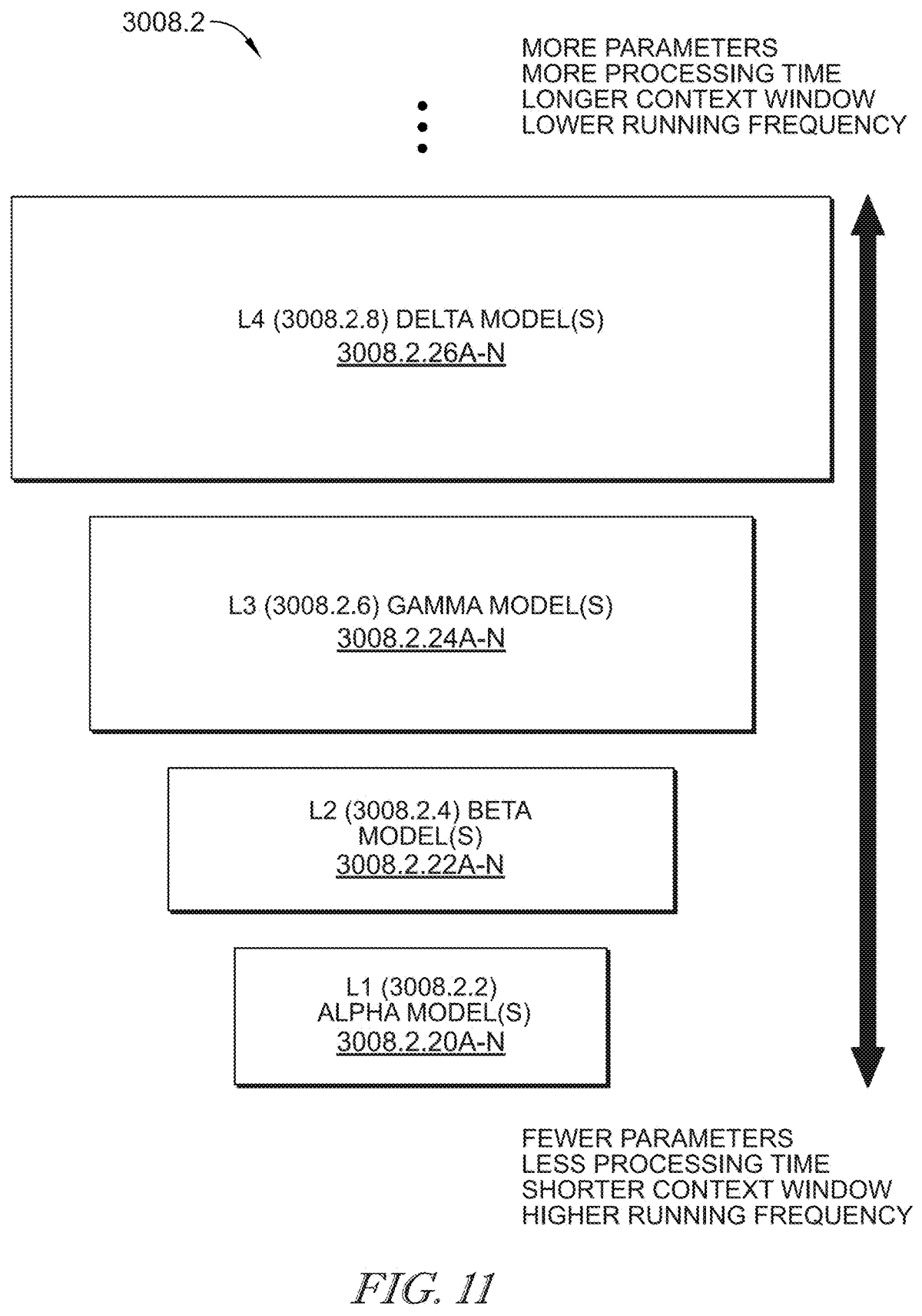

3008.2

MORE PARAMETERS
MORE PROCESSING TIME
LONGER CONTEXT WINDOW
LOWER RUNNING FREQUENCY

L4 (3008.2.8) DELTA MODEL(S)
3008.2.26A-N

L3 (3008.2.6) GAMMA MODEL(S)
3008.2.24A-N

L2 (3008.2.4) BETA
MODEL(S)
3008.2.22A-N

L1 (3008.2.2)
ALPHA MODEL(S)
3008.2.20A-N

FEWER PARAMETERS
LESS PROCESSING TIME
SHORTER CONTEXT WINDOW
HIGHER RUNNING FREQUENCY

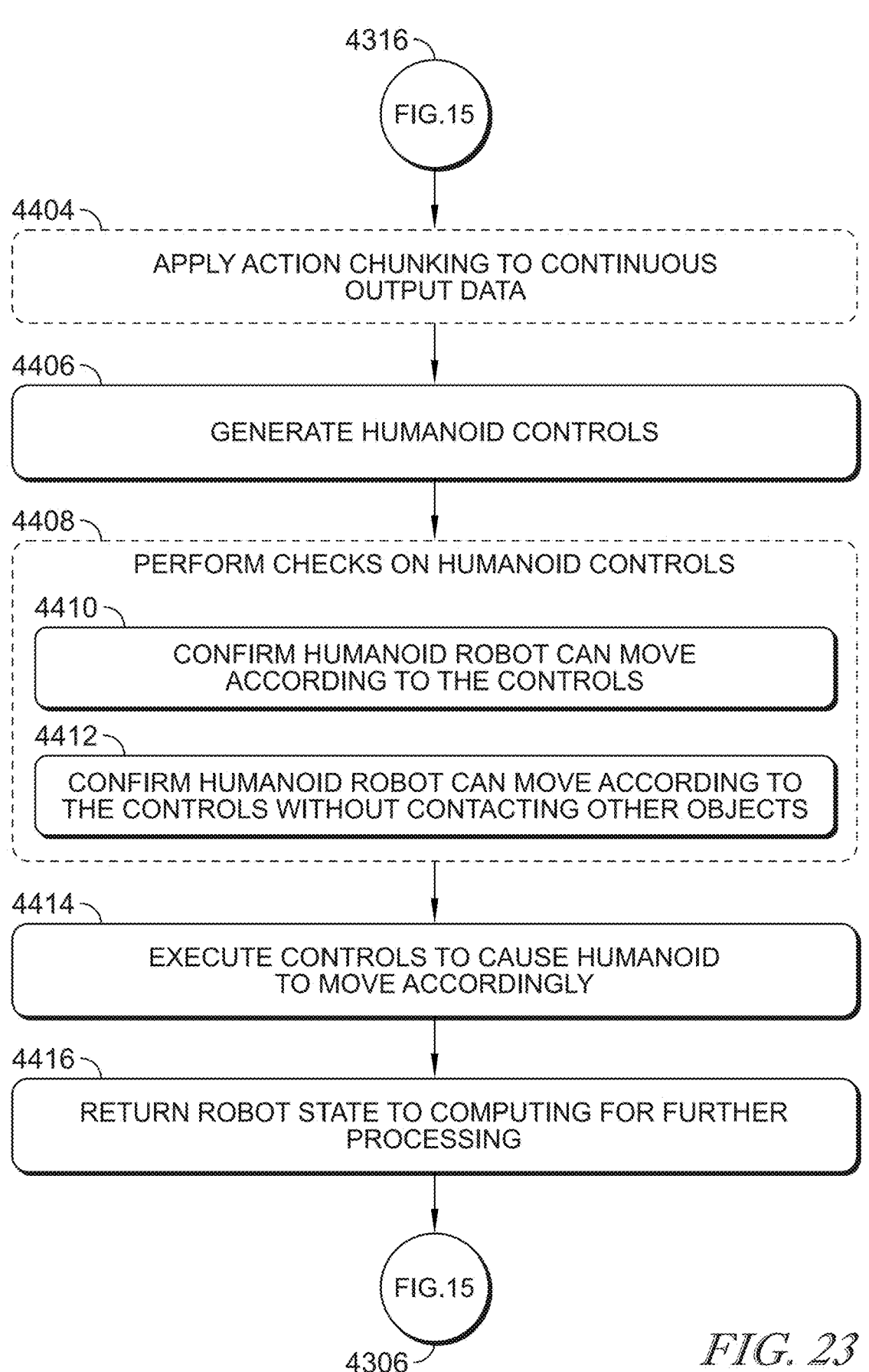

4404
APPLY ACTION CHUNKING TO CONTINUOUS OUTPUT DATA

4406
GENERATE HUMANOID CONTROLS

4408
PERFORM CHECKS ON HUMANOID CONTROLS

4410
CONFIRM HUMANOID ROBOT CAN MOVE ACCORDING TO THE CONTROLS

4412
CONFIRM HUMANOID ROBOT CAN MOVE ACCORDING TO THE CONTROLS WITHOUT CONTACTING OTHER OBJECTS

4414
EXECUTE CONTROLS TO CAUSE HUMANOID TO MOVE ACCORDINGLY

4416
RETURN ROBOT STATE TO COMPUTING FOR FURTHER PROCESSING

BIPEDAL ACTION MODEL FOR HUMANOID ROBOT

CROSS-REFERENCE TO RELATED APPLICATIONS

This application is: (i) a continuation-in-part of U.S. patent application Ser. No. 19/325,486, filed Sep. 10, 2025, and (ii) claims the benefit of and priority to U.S. Provisional Patent Application Nos. 63/715,270, filed Nov. 1, 2024, 63/722,057, filed Nov. 18, 2024, 63/725,279, filed Nov. 26, 2024, 63/760,617, filed Feb. 19, 2025, 63/776,429, filed Mar. 24, 2025, 63/819,533, filed Jun. 6, 2025 and 63/883,647, filed Sep. 17, 2025, each of which is fully incorporated herein by reference.

TECHNICAL FIELD

This disclosure relates to system design and architectures, methods and techniques for training and using a hierarchical bipedal action model (BAM) to control a humanoid robot.

BACKGROUND

The field of robotics has long pursued the goal of creating humanoid robots capable of performing complex tasks in unstructured, human-centric environments. A significant challenge in this pursuit is the development of control systems that can manage the vast number of degrees of freedom (DoF) inherent in a humanoid form. Conventional robotic control systems have traditionally been limited in their scope and capability. Many existing models are narrowly focused, designed to control only a specific part of the robot, such as a 7-DoF end-effector or arm. This approach effectively treats the robot as a disembodied limb, failing to coordinate the entire body. As a result, such systems cannot perform actions that require dynamic balance, postural adjustments, or the use of the torso and legs to extend reach and navigate obstacles. The movements produced are often rigid and limited to a constrained set of pre-programmed motions.

Furthermore, a common deficiency in conventional systems is their reliance on generating discrete, or "binned," action outputs. This method breaks down continuous motion into a finite set of poses or commands. The result is often jerky, imprecise, and unnatural movement, akin to a video with a low frame rate. This discretization introduces compounding errors over time, causing the robot to deviate from its intended path and struggle with tasks requiring fluid, continuous adjustments. These systems lack the temporal consistency needed for smooth, long-horizon tasks and are not robust enough to adapt to the unpredictable nature of real-world environments.

Therefore, a significant need exists for a more advanced control architecture that can overcome these fundamental limitations. There is a demand for a system that can provide comprehensive, whole-body control over a high-degree-of-freedom humanoid robot and generate continuous, real-time control outputs to produce fluid, human-like motion, thereby enabling more effective and reliable performance in complex, dynamic settings.

SUMMARY

According to an aspect of the present disclosure, a humanoid robot system is provided. The humanoid robot system comprises a mechanical structure including a torso, two arms, and two legs providing at least 30 degrees of freedom. The system comprises a plurality of actuators coupled to the degrees of freedom. The system comprises a sensor suite comprising at least one camera and one or more proprioceptive sensors including joint encoders and an inertial measurement unit (IMU). The system comprises a computing system comprising at least one processor and memory storing instructions which, when executed, cause the computing system to implement a hierarchical bipedal action model (BAM) including a Beta model configured to receive multimodal input data and to generate a token sequence indicative of task intent and environmental state, and an Alpha model configured to condition on the token sequence and current robot pose data to output continuous action chunks each comprising a sequence of future target joint states over a finite horizon. The system comprises a low-level controller configured to convert the continuous action chunks into actuator control signals for execution by the plurality of actuators.

According to other aspects of the present disclosure, the humanoid robot system may include one or more of the following features. The Beta model may comprise a vision-language model having between 1 billion and 50 billion trainable parameters and operating at 1-10 Hz, and the Alpha model may comprise a transformer-based architecture having between 50 million and 1 billion trainable parameters and operating at 50-350 Hz. Each continuous action chunk may span 8-32 future timesteps over a horizon of 50-200 ms, each timestep specifying a target joint position and at least one of a target velocity, acceleration, or torque. The Alpha model may comprise a sequence model that cross-attends to the task-conditioning representation configured to iteratively denoise latent action proposals, and overlapping action chunk predictions may be fused by weighted averaging to produce the continuous action chunks. The multimodal input data may comprise visual frames from the at least one camera, proprioceptive histories comprising encoder and IMU streams, and natural-language commands, and the Alpha model may employ cross-attention to fuse the token sequence from the Beta model with the robot pose data. Visual frames may be processed by a vision encoder into time-stamped image embeddings and natural-language commands may be processed by a language encoder into language embeddings, the embeddings being temporally aligned with the proprioceptive histories.

According to other aspects of the present disclosure, the humanoid robot system may include one or more of the following features. The token sequence may encode high-level behavioral intent and scene affordances and the Alpha model may use the token sequence to generate control trajectories that span multiple future control periods beyond a present timestep. The control trajectories may be represented as a matrix having rows corresponding to robot degrees of freedom and columns corresponding to temporal indices, individual elements specifying desired changes in at least one of position, orientation, velocity, or torque for a corresponding actuator. The BAM may be trained end-to-end by backpropagation to jointly optimize the Beta model and the Alpha model so that semantic reasoning produced by the Beta model is aligned with low-level motor control generated by the Alpha model. Training of the Alpha model may use a regression loss computed between predicted action chunks and demonstration trajectories, and gradients from the regression loss may be propagated through the Alpha model into the Beta model.

According to other aspects of the present disclosure, the humanoid robot system may include one or more of the following features. The computing system may comprise multiple graphics processing units (GPUs), the Beta model executing on a first GPU and the Alpha model executing on a second GPU, both GPUs housed within the torso to achieve low-latency local inference. The low-level controller may execute action chunks using asynchronous overlap, such that a subsequent action chunk is generated before a current action chunk completes execution. The system may further comprise a safety layer configured to validate each action chunk prior to execution against at least one of: kinematic limits, torque/current limits, self-collision constraints, environmental collision boundaries, terrain stability criteria, and semantic safety policies derived from the token sequence. Proprioceptive sensor histories spanning 1-5 seconds may be embedded with positional encodings to preserve spatio-temporal relationships prior to processing by transformer layers of the Alpha model. The Beta model and the Alpha model may communicate via a latent vector representing task semantics, the latent vector being updated at a slower rate than the action chunk generation rate.

According to another aspect of the present disclosure, a method for training a hierarchical bipedal action model (BAM) for humanoid robot control is provided. The method comprises collecting training data comprising internet-scale data and real-world robot demonstrations. The method comprises preprocessing the training data to form multimodal sequences comprising visual frames, normalized robot state information, and action labels. The method comprises training a hierarchical model comprising a Beta model configured to output a token sequence and an Alpha model configured to output continuous action chunks, wherein gradients from a regression loss on the action chunks are backpropagated through the Alpha model into the Beta model to jointly optimize both models. The method comprises deploying the trained hierarchical model on a humanoid robot for autonomous task execution.

According to other aspects of the present disclosure, the method may include one or more of the following features. Preprocessing may comprise tokenizing visual frames into patch embeddings, temporally aligning language and visual embeddings with proprioceptive histories, normalizing state variables to fixed scales, and generating action chunks that span 50-150 ms. The method may further comprise performing knowledge distillation from a larger teacher model into at least the Beta model to obtain a compressed student model. Deploying may comprise loading model weights onto onboard GPUs within a torso of the humanoid robot, establishing closed-loop control with sensor feedback at at least 100 Hz, and executing safety verification that rejects or truncates action chunks violating kinematic or collision constraints. The Alpha model may comprise a diffusion transformer with cross-attention to the token sequence, and the Beta model may comprise a multimodal large language model with cross-attention layers for vision-language fusion.

According to another aspect of the present disclosure, a humanoid robot is provided. The humanoid robot comprises a mechanical structure providing at least 30 degrees of freedom across a torso, arms, and legs. The robot comprises actuators configured to drive the degrees of freedom. The robot comprises cameras, IMUs, and joint encoders. The robot comprises a computing system configured to execute a bipedal action model (BAM) that processes multimodal input data and outputs continuous control trajectories for whole-body coordination, the BAM including a Beta model operating at 1-10 Hz and an Alpha model operating at 25-350 Hz.

According to other aspects of the present disclosure, the humanoid robot may include one or more of the following features. The continuous control trajectories may comprise action chunks each spanning 8-16 timesteps with a temporal resolution of at most 8 ms per timestep. Training of the BAM may be performed end-to-end with a regression loss on action chunks, the Beta model and Alpha model being coupled via a latent vector interface to permit gradient flow across the interface. The BAM may employ cross-modal attention to align visual features with linguistic descriptions, transformer layers that process proprioceptive histories spanning 1-5 seconds, and positional encodings to maintain spatio-temporal relationships in multimodal representations. The computing system may implement real-time semantic safety monitoring by comparing proposed actions to safety policies inferred from the token sequence and by inhibiting actions that conflict with the policies.

According to another aspect of the present disclosure, a humanoid-robot control system is provided. The system comprises a Beta model configured to process multimodal observations comprising at least one image and a natural-language task input to generate a task-conditioning representation. The system comprises an Alpha model configured to operate at a control frequency higher than a frequency of the Beta model and to generate continuous action outputs for a humanoid robot having at least twenty degrees of freedom based at least in part on the task-conditioning representation and robot state, wherein the Alpha model outputs the continuous whole-body action outputs as sequential action chunks each comprising a plurality of future control steps to reduce compounding imitation-learning errors during long-horizon tasks.

According to other aspects of the present disclosure, the humanoid-robot control system may include one or more of the following features. The Alpha model may comprise a transformer-based denoising policy that cross-attends to the task-conditioning representation to generate the sequential action chunks. The transformer-based denoising policy may be trained using flow-matching or diffusion-style denoising of noised action chunks. Each action chunk may comprise between 8 and 32 action steps and may be executed with overlapping prediction and execution to create smooth motion. The system may further comprise embodiment-specific state and action encoders configured to project robot-specific states and actions to a shared embedding used by the Alpha model. The Beta model may operate at a frequency of 10-20 Hz and the Alpha model may operate at a frequency of at least 50 Hz. The system may be trained using a layered data corpus comprising internet data, simulation data, and real-world robot data. Action labels for action-less data may be obtained using a pseudo-action generation technique.

According to other aspects of the present disclosure, the humanoid robot system may include one or more of the following features. The system may further comprise a controller configured to transform the sequential action chunks into actuator commands subject to kinematic-feasibility and collision-avoidance safety checks prior to execution. The Beta model and the Alpha model may be jointly trained end-to-end by backpropagating an action-prediction loss from the Alpha model into the Beta model. The action chunks may decouple an inference rate of the Beta model from a control rate of the humanoid robot such that each action chunk spans multiple control cycles. The Alpha model may comprise a sequence model that cross-attends to the task-conditioning representation to generate the sequential action chunks. Each action chunk may comprise between 8 and 32 action steps. The system may comprise robot-specific decoders configured to project robot-specific states to a shared representation used by the Alpha model. The Alpha model may operate at a frequency of at least 50 Hz. The continuous whole-body action outputs may be configured to directly actuate multiple body segments including torso, arms, legs, and neck. The Alpha model may be trained using reinforcement learning.

According to another aspect of the present disclosure, a method of controlling a humanoid robot is provided. The method comprises receiving, by a Beta model, an image and a natural-language task description. The method comprises generating, by the Beta model, a task-conditioning representation of the task. The method comprises generating, by an Alpha model operating at a higher frequency than the Beta model, a sequence of continuous whole-body action chunks conditioned on the task-conditioning representation and robot state. The method comprises executing, by a whole-body controller, the sequence of action chunks with feasibility and safety checks.

According to other aspects of the present disclosure, the method may include one or more of the following features. The method may further comprise asynchronously predicting a subsequent action chunk while a current action chunk is being executed. Generating the sequence of action chunks may comprise denoising noised action tokens using a transformer that cross-attends to the task-conditioning representation. The method may further comprise adapting the Alpha model to a new robot embodiment by training embodiment-specific encoders. The method may further comprise updating the task-conditioning representation during execution in response to detected state changes or language feedback. The action chunks may each span 50 to 150 milliseconds and include between 8 and 16 future timesteps. The method may further comprise co-training the Beta model and the Alpha model end-to-end across web-scale video data, synthetic simulation data, and real-robot teleoperation data. The Beta model may maintain a rolling temporal context of prior observations and actions and may update the task-conditioning representation responsive to observations during execution.

According to another aspect of the present disclosure, a non-transitory computer-readable medium storing instructions is provided. The instructions, when executed by one or more processors of a humanoid robot, cause the one or more processors to perform the operations of receiving, by a Beta model, an image and a natural-language task description, generating, by the Beta model, a task-conditioning representation of the task, generating, by an Alpha model operating at a higher frequency than the Beta model, a sequence of continuous whole-body action chunks conditioned on the task-conditioning representation and robot state, and executing, by a whole-body controller, the sequence of action chunks with feasibility and safety checks.

According to other aspects of the present disclosure, the non-transitory computer-readable medium may include one or more of the following features. The instructions may further cause querying of the Beta model at at most 20 Hz and control by the Alpha model at at least 100 Hz. The instructions may further cause execution of action-chunk temporal-ensemble smoothing by averaging overlapping chunk predictions for a same timestep with recency weighting. The instructions may further cause rejection or modification of control commands that fail kinematic feasibility. The instructions may further cause querying of the Beta model at at most 20 Hz and control by the Alpha model at at least 50 Hz.

According to another aspect of the present disclosure, a system for controlling a humanoid robot is provided. The system comprises a computing architecture communicatively coupled to a humanoid robot, the humanoid robot comprising a plurality of actuators defining more than twenty degrees of freedom (DoF), wherein the computing architecture is configured to execute a hierarchical bipedal action model (BAM), the BAM comprising a first, high-level cognitive model (Beta model) operating at a first frequency, the first model configured to receive a multimodal input comprising at least one of a user command or sensor data and to generate a token sequence indicative of task intent that is embedded as a continuous latent vector based on the multimodal input, and a second, low-level motor model (Alpha model) operating at a second frequency, the second model configured to receive the token sequence indicative of task intent from the first model, to operate at the second frequency wherein the second frequency is substantially higher than the first frequency, and to generate a continuous control output based on the a token sequence indicative of task intent, wherein the continuous control output is configured to control the plurality of actuators defining the more than twenty DoF of the humanoid robot.

According to other aspects of the present disclosure, the system for controlling a humanoid robot may include one or more of the following features. The more than twenty DoF may comprise at least sixty-two DoF, enabling whole-body control of the humanoid robot. The continuous control output may comprise continuous floating-point values representing at least one of target joint positions, joint torques, end-effector poses, or Deltas thereof. The continuous control output may be generated as an action chunk, the action chunk comprising a sequence of predicted future actions over a time horizon. The action chunk may mitigate compounding errors associated with imitation learning and may decouple the first frequency of the first model from a high control frequency of the humanoid robot. The action chunk may be executed using a temporal ensembling technique, wherein a final executed action is a weighted average of multiple overlapping predicted action chunks.

According to other aspects of the present disclosure, the humanoid robot system may include one or more of the following features. The first model (Beta model) may be a large-scale model comprising between 500 million and 2 trillion parameters. The first model (Beta model) may be pretrained on internet-scale data using a cross-entropy loss function. The first model (Beta model) may be one of a vision-language model (VLM), a large language model (LLM), or a multimodal large language model (MLLM). The second model (Alpha model) may be a small-scale model comprising fewer than 100 million parameters. The second model (Alpha model) may be trained on robot teleoperation data using a regression-based loss function. The second model (Alpha model) may be a cross-attention encoder-decoder transformer or a visuomotor policy. The first frequency may be between 1 Hz and 50 Hz, and the second frequency may be between 50 Hz and 350 Hz. The computing architecture may be located onboard the humanoid robot, and both the first model and the second model may execute on one or more processors onboard the humanoid robot. The computing architecture may be split, wherein the second model (Alpha model) executes on one or more processors onboard the humanoid robot, and the first model (Beta model) executes on a remote computing system communicatively coupled to the humanoid robot via a network.

According to other aspects of the present disclosure, the humanoid robot system may include one or more of the following features. The first model and the second model may be trained end-to-end, wherein error gradients from the continuous control output are backpropagated through the second model, across the a token sequence indicative of task intent, and into the first model. The BAM may be trained using a layered data structure comprising a foundational layer of internet-scale text and human video data, a middle layer of simulation and synthetic data, and a top layer of real-world humanoid robot data collected via teleoperation. The foundational layer may include human demonstration data collected using a robot-free method, wherein an operator uses a virtual reality (VR) or augmented reality (AR) headset to capture first-person video synchronized with head and hand positions. The second model (Alpha model) may comprise a plurality of specialized models operating in parallel, wherein a first specialized model controls a left arm of the humanoid robot and a second specialized model controls a right arm of the humanoid robot. The system may further comprise a safety check module configured to validate the continuous control output before execution by confirming the control output is within kinematic joint limits and by verifying the control output is collision-free. The continuous control output generated by the second model (Alpha model) may overcome limitations of discrete, binned action outputs by producing fluid, human-like motion and mitigating temporal inconsistencies and jerky movements associated with conventional control systems.

BRIEF DESCRIPTION OF THE DRAWINGS

The drawing figures depict one or more implementations in accordance with the present teachings, by way of example only, not by way of limitation. These figures are intended to illustrate and not to restrict the scope of the disclosure. In the figures, like reference numerals refer to the same or similar elements. This convention is maintained throughout the drawings for consistency.

FIG. 4 is a block diagram of sensors for the humanoid robot of FIGS. 1-3B;

FIG. 5 is a block diagram of a communication interface for the humanoid robot of FIGS. 1-3B;

FIG. 11 is a flowchart showing an exemplary hierarchical architecture for the BAM;

FIG. 22-23 are flowcharts illustrating a process of using the BAM to output robot actions;

DETAILED DESCRIPTION

Figure 1:
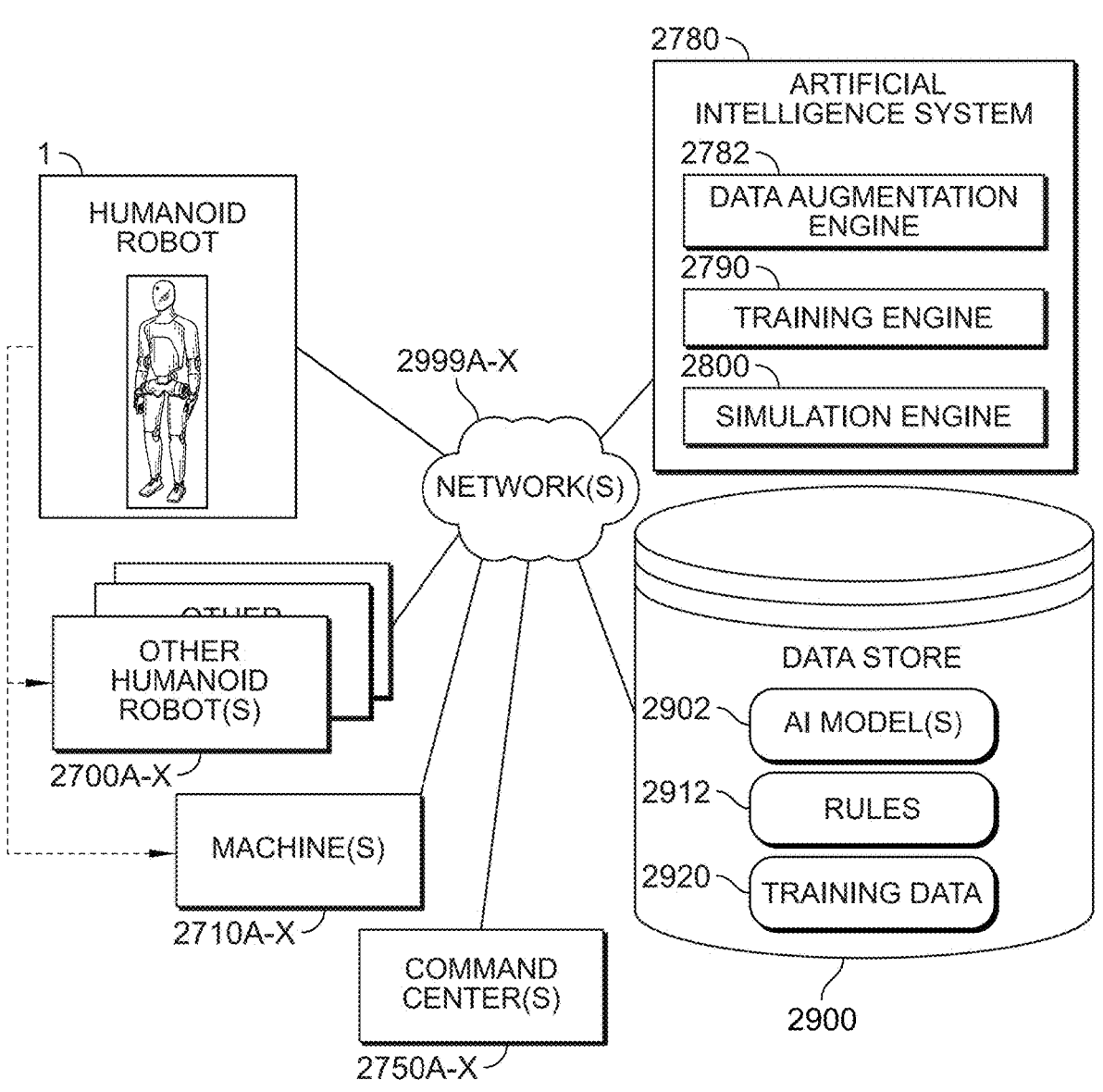
FIG. 1 is a diagram illustrating an environment and a network in which one or more humanoid robots of FIG. 1 may operate, connect, command and/or be commanded by, control and/or be controlled by, and/or interact.

In the following detailed description, numerous specific details are set forth by way of examples in order to provide a thorough understanding of the relevant teachings. These examples are illustrative and not exhaustive. It should be apparent to those skilled in the art that the scope of the teachings is not limited to these specific details. Additionally or alternatively, well-known methods, procedures, components, and/or circuitry have been described at a relatively high-level, without detail, in order to avoid unnecessarily obscuring aspects of the present disclosure.

While this disclosure includes several embodiments, there is shown in the drawings and will herein be described in detail certain embodiments with the understanding that the present disclosure is to be considered as an exemplification of the principles of the disclosed methods and systems and is not intended to limit the broad aspects of the disclosed concepts to the embodiments illustrated. As will be realized, the disclosed methods and systems are capable of other and different configurations, and one or more details are capable of being modified, all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts or the method of assembling the shoulder and upper arm may be performed in a different order. Accordingly, the drawings, flow charts and detailed description are to be regarded as illustrative in nature, not restrictive or limiting.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A. Introduction

Disclosed herein is a bipedal action model (BAM) architecture characterized by a decoupled dual-system design, comprising a high-level cognitive L2 model and a low-level reactive motor L1 model. The L2 model, which may be a large, pretrained vision-language model with billions of parameters, is responsible for perception, language understanding, and long-horizon planning. It operates at a low frequency to process complex multimodal inputs, such as a user command like "get me a drink from the fridge," and generates a token sequence indicative of task intent, embedded as a continuous latent vector, which encapsulates the semantic goal of the task. This latent vector is then passed to the L1 model, a smaller, high-frequency visuomotor policy with millions of parameters, which translates the high-level intent from L2 model into precise, continuous robot actions. This separation of concerns allows for independent development and optimization of the reasoning and control components, enabling the robot to benefit from the broad world knowledge of large models while maintaining the real-time responsiveness required for fluid and safe physical interaction in dynamic environments.

The placement of the L2 and L1 models offers a range of deployment configurations to balance computational resources, latency, and autonomy. A fully local deployment, with both models running on the bipedal robot or humanoid robot's onboard hardware, minimizes communication latency and enables network-independent operation, which is suitable for tasks in environments with unreliable connectivity, but places a high demand on the robot's computational resources. The BAM's model architecture is highly configurable, allowing for different combinations of single and multiple models for the L2 and L1 models to be employed. A system may be composed of a first pool that contains a single L2 model and a second pool that contains a single L1 model. Meanwhile, the training of a BAM relies on a layered data structure that is designed to provide the model with a broad understanding of the world while grounding it in the specifics of robotic embodiment. The foundational layer consists of vast quantities of internet-scale text, images, and videos, supplemented by human demonstration data collected through robot-free methods like VR/AR systems, which provides a broad base of common-sense knowledge. The middle layer is composed of simulation and synthetic data, which provides a scalable way to generate millions of task-specific training examples in a controlled environment. The top layer contains the highest-fidelity real-world robot data, collected through teleoperation, which is essential for fine-tuning the model, bridging the sim-to-real gap, and ensuring its actions are physically plausible and effective.

The training process for a BAM can be adapted to its specific architecture, such as an L1 model-only or a combined L2/L1 model, and can be based on imitation learning or other types of learning. The process can involve preparing a comprehensive, multimodal training dataset, which is then used to train the selected model configuration. For an L1 model-only, the training focuses on learning a direct mapping from visual and state inputs to actions, making it highly proficient at a specific task. The co-trained of the combined L2/L1 model can be an end-to-end process, where the error between the L1 model's predicted action and a ground-truth demonstration are backpropagated through both models. This allows the high-level L2 model to be fine-tuned and its general knowledge to be grounded in the physical actions of the L1 model, leading to a more robust and generalizable policy.

The deployment of a trained BAM can involve a continuous, closed-loop process of perception, planning, and action. During runtime, the deployed model receives a stream of multimodal inputs, including user commands and real-time sensor and state data from the robot. This data is ingested by the BAM, which outputs a sequence of action chunks representing the desired future trajectory of the robot. These high-level actions can then translated into low-level motor commands by a whole body controller, which also performs a series of safety checks to ensure the commands are kinematically feasible and collision-free before executing them on the robot's actuators. The robot's new state is then fed back into the BAM, allowing for a continuous cycle of action generation that enables the robot to perform long-horizon tasks and dynamically adapt to its environment.

The disclosed BAM integrates artificial intelligence models into a tangible system that solves significant, long-standing technological problems in robotic control. The disclosed BAM is not merely an instruction to "apply" an abstract idea on a generic computer; rather, it is a particular technological solution to a deeply rooted technological problem. A primary technical improvement offered by the BAM is its revolutionary approach to whole-body, continuous control. Conventional robotic systems are fundamentally limited, often confined to controlling a 7-degree-of-freedom (DoF) end-effector with discrete, binned-value outputs, which results in movements that are characteristically clunky, stilted, and imprecise. The disclosed BAM architecture overcomes this critical deficiency by providing direct, continuous control over the full sixty-two degrees of freedom of the bipedal or humanoid robot. This is not a mere improvement in processing speed but a fundamental paradigm shift in robotic control, enabling highly coordinated, human-like motions that leverage the robot's entire physical structure for dynamic balance, extended reach, and sophisticated obstacle negotiation. This constitutes a specific, tangible improvement to the functioning and capability of the robot itself, far exceeding the abstract idea of robotic control.

Action chunking can be used for the BAM output, where the L2 model predicts a sequence of multiple future actions in a single inference step. This approach offers several advantages, including the mitigation of compounding errors in imitation learning, the ability to handle non-Markovian behaviors in demonstration data, and the decoupling of the model's low inference frequency from the robot's high control frequency, which can be helpful in achieving smooth, human-like motion. Various action chunking strategies can be employed, from simple sequential execution, which is easy to implement but may lead to jerky movements, to more advanced asynchronous methods like real-time chunking and temporal ensemble, which are designed to improve motion smoothness and reactivity by overlapping the prediction and execution of action chunks.

Furthermore, the BAM provides a particular solution to the well-known technical problem of compounding errors in imitation learning through its use of "action chunking." By predicting and executing a sequence of future actions in a single inference step, the BAM architecture specifically mitigates the accumulation of small prediction errors that cause prior art systems to deviate from desired trajectories. This technique provides a concrete solution that improves the temporal consistency and reliability of the robot's movements. This is combined with a specific and versatile internal architecture, such as the hierarchically arranged L2 and L1 models with defined local, remote, or split deployment configurations, which solves the technical challenge of achieving real-time, context-aware decision-making without the debilitating latency that plagues remote-only systems. The invention is therefore not directed to the mere idea of a solution, but to a particular, structured, and effective way of achieving a desired technical outcome.

B. Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Although selected human medical terminology is used to describe features and/or relative positions related to the humanoid robot, it should be understood that said medical terminology may not directly correspond to the exact same features of a human. It should be understood that names of various assemblies and components (e.g., including housings and assemblies contained within) may generally relate to a location of similar anatomy of a human body and may not have an exact correlation in dimension, function, or shape. The reference system including three orthogonal reference planes is defined with respect to the robot in a neutral standing position to describe relative positions of components of the robot. Although standard human medical terminology is used to describe the anatomical reference planes (i.e., sagittal, coronal, transverse) of the robot, the planes may be shifted from the typical location on a human to be meaningful for the kinematic layout and features of the robot.

Humanoid Robot: a robot that is capable of bipedal locomotion and includes components (e.g., head, torso, etc.) that generally resemble parts of a human. However, the robot does not need to include every part of a human (e.g., hands with over ten degrees of freedom), nor do its components need to have a shape that exactly or substantially resembles human parts. Furthermore, it should be understood that a humanoid robot is not designed to be primarily quadruped or have a wheeled base.

Neutral State: a state where the robot is standing upright on a horizontal support surface (PG) and facing a forward direction with its torso substantially vertically aligned over its pelvis and legs, where the legs are substantially straight with the knees substantially aligned under the hips and substantially above the ankles, such that the robot's weight is balanced over its feet. In the neutral state, the robot's head is facing forward (i.e., in the forward direction), the arms are located at the sides of the robot, the hands are oriented with the palms facing substantially inward, and the fingers pointing in a substantially downward direction toward the horizontal support surface. An illustrative example of the neutral state for the humanoid robot 1 is shown FIG. 3A.

Figure 3A:
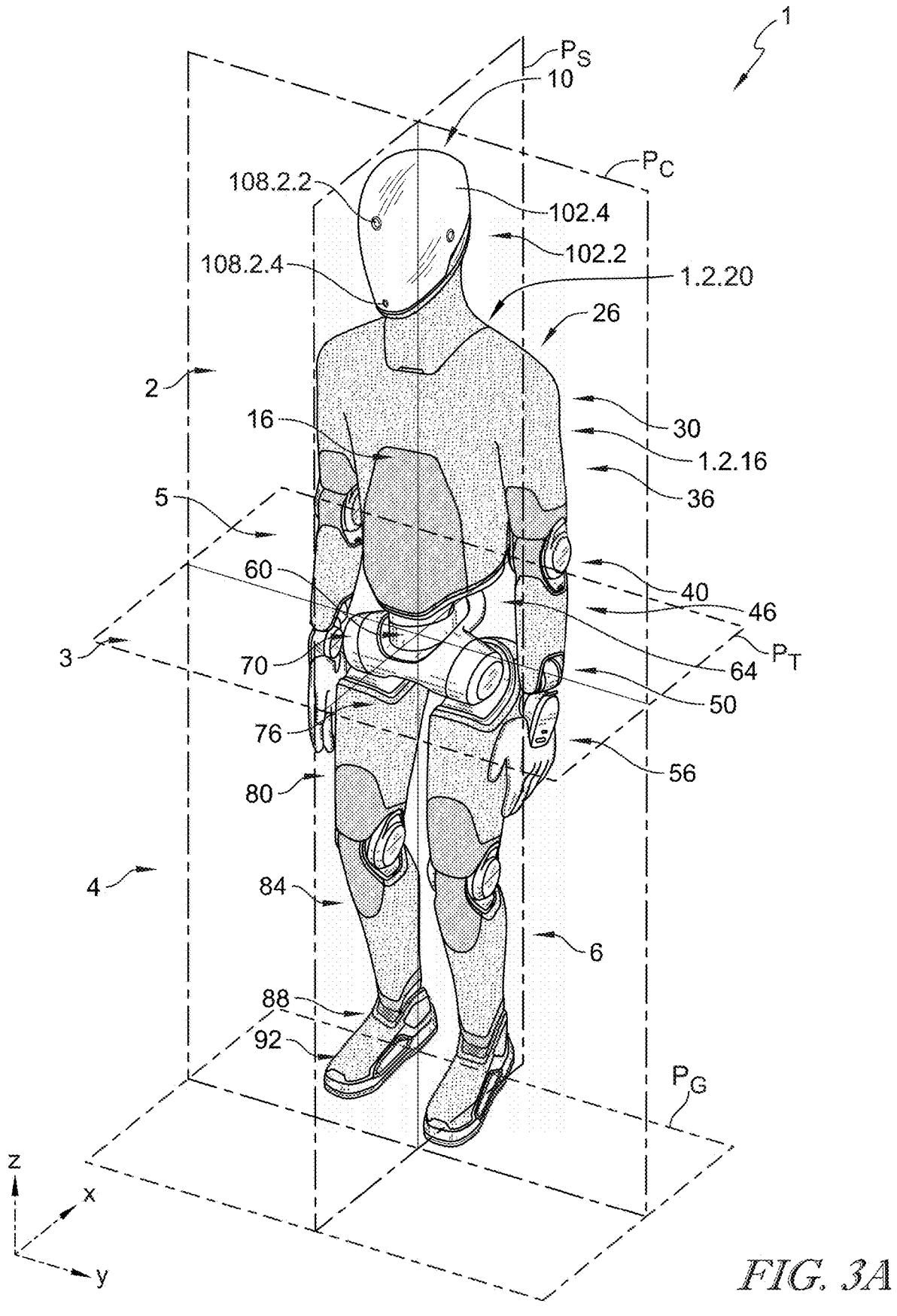
FIG. 3A is a perspective view of a humanoid robot of FIGS. 1-2.
Figure 3B:
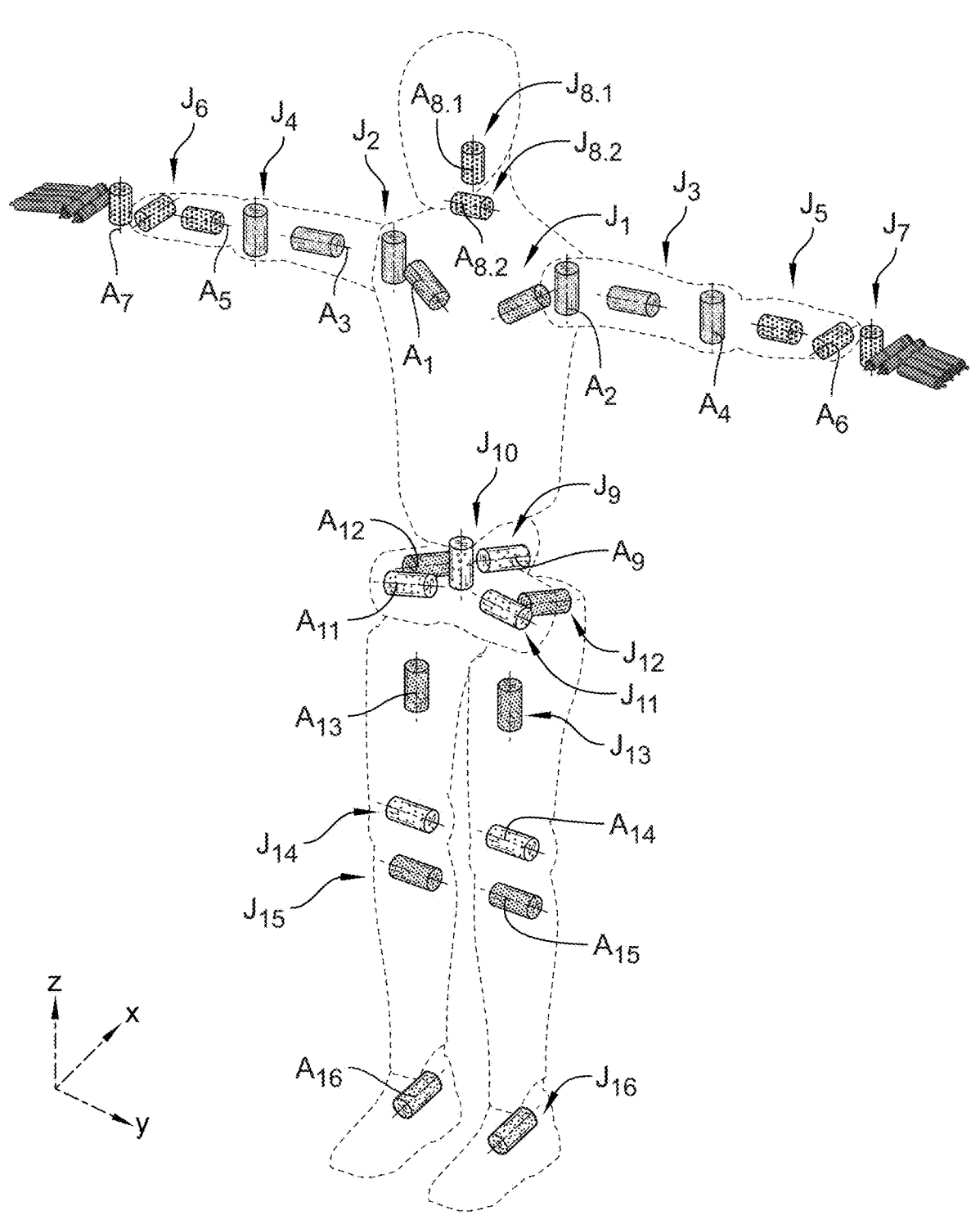
FIG. 3B is a diagram illustrating actuators contained within the humanoid robot of FIGS. 1-3A and the corresponding rotational axes of said actuators.

Extended State: a state of the robot with the arms extended outward laterally at the shoulder (as illustrated in FIG. 3B) and oriented with the palms of the hands substantially facing downward and the fingers pointing in a substantially outward direction, where the central and lower portions of the robot remain in a neutral state.

Sagittal Plane: a vertical plane when the robot is in the neutral state that aids in defining left and right sides of the robot for all states. Accordingly, the sagittal plane may: (i) divide the robot and/or the torso into left and right portions or halves, (ii) extend through an axis of rotation about which the torso twists or rotates relative to the pelvis and legs, (iii) contain an origin point of the robot, and/or (iv) be positioned between the left and right legs, and/or left and right arms. In an illustrative embodiment, the sagittal plane ($P_S$) (e.g., as illustrated in FIG. 3A) is a vertical plane positioned at a midway point between the left and right legs and the left and right arms and contains a rotational axis $A_{10}$ of a torso twist actuator (J10) (e.g., as illustrated in FIG. 3B) located in the spine 60 of the robot 1 and divides the left and right sides of the robot 1 (e.g., as illustrated in FIG. 3A). In other words, in an illustrative embodiment, the sagittal plane ($P_S$) is a plane that is colinear with the rotational axis $A_{10}$ of the torso twist actuator (J10).

Coronal Plane: a vertical plane when the robot is in the neutral state that aids in defining front and back portions of the robot for all states. Accordingly, the coronal plane may: (i) divide the robot and/or the torso into front and back portions or halves, (ii) contain an axis of rotation about which the torso pitches forward or backward from the neutral state, (iii) contain an axis of rotation of a knee joint about which a lower shin pitches forward and backward, and/or (iv) contains an axis of rotation of an elbow joint about which a lower forearm moves forward and backward, when the robot is in the extended state. In various embodiments, said axis of rotation for torso pitch may be two colinear axes, a single centrally located axis, an axis defined by a line connecting the midpoints of two non-collinear actuator axes that provide the torso pitch function, or an axis defined by a line connecting the center of actuator bearings of two actuators that provide the torso pitch function. In the illustrative embodiment (see, e.g., FIGS. 3A and 3B), the coronal plane ($P_C$) is a vertical plane that contains the rotational axes $A_{11}$ of the hip flex actuators (J11) located in the hips 70 (and likewise may contain an axis defined by a line connecting the midpoints of a left hip flex actuator (J11) axis ($A_{11}$) and a right hip flex actuator (J11) axis ($A_{11}$) and rotational axis $A_{10}$ of torso twist actuator (J10) located in the spine 60 of the robot 1. As shown in these figures, the coronal plane ($P_C$) does not bisect the robot, or torso, into equal front and back halves, as it is offset forward of a majority of the arm actuators in the extended position, and other positional relationships that can be understood from the figures.

Transverse Plane: a horizontal plane that aids in defining the upper and lower portions of the robot. Accordingly, the transverse plane may: (i) divide the robot into upper and lower portions or halves, and/or (ii) contain an axis of rotation about which the torso pitches forward or backward, as discussed above. In the illustrative embodiment, the transverse plane ($P_T$) is a horizontal plane that contains the mid-point of the rotational axes $A_{11}$ of the hip flex actuators (J11) located in the hips 70 of the robot 1.

Origin Point: an orthogonal intersection point of the sagittal plane, coronal plane, and transverse plane, all of which extend through the humanoid robot disclosed herein. In the illustrative embodiment of the robot 1 shown in FIG. 3A, an origin point (Cp) is present and shown.

Reference Axes: consist of: (i) the Z-axis (vertical) is defined pursuant to the intersection of the sagittal plane and coronal plane, (ii) the Y-axis (horizontal) is defined pursuant to the intersection of the coronal plane and transverse plane; and (iii) the X-axis (depth) is defined pursuant to the intersection of the sagittal plane and transverse plane. FIG. 3A illustrates example Z, Y, X reference axes where the sagittal, coronal, and transverse planes share a common origin point.

Kinematic Chain: a representation of an assembly of rigid bodies connected by joints to provide constrained motion. Within this application, e.g., FIG. 3B, a kinematic chain is illustrated by cylindrical bodies, where the respective central axis of each individual cylindrical body represents the position and orientation of the axis of rotation for the individual joints. For example, each rotary actuator has a central rotational axis. Other types of actuators may include linkages that provide rotational movement about one or more rotational axes via linkages, bearing or other rotation features, or other means.

Range of Motion: a range of rotational motion of an actuator about an axis of rotation, where a first and second angle define a rotational limit in opposing rotational directions from a neutral position of the actuator with the limits expressed in Radians.

Degrees of Freedom (DoF): the number of parameters that define the configuration of the kinematic chain and possible movements associated therewith.

Singularities: geometric configurations of the robot's joints in which one or more degrees of freedom are effectively lost due to the alignment or overlap of rotational or translational axes, which in some cases is also affected by interference of extents of components where one or more of the components are moved by the joint.

Actuator Bearing: a specific component of the individual actuator that is generally ring-shaped with parallel edge guides, wherein the rotational axis ($A_n$) of the actuator is centered within the actuator bearing and orthogonal to the parallel edge guides. Within this application, the actuator bearings of individual actuators are referenced to further define orientation of the rotational axes and/or relative size of the individual actuator.

Actuator bearing plane ($B_n$): a plane defined mid-width of actuator bearing between parallel edge guides and orthogonal to the rotational axis ($A_n$).

Textile: a flexible (e.g., fabric-like), highly durable cover material that has high elastic stretch capabilities and is resistant to pilling, abrasions, and cuts. A textile includes both common textiles (e.g., traditional woven cloth), engineered textiles, and non-fabric-like materials (e.g., plastics or polymers), and/or a combination of the above.

C. Robot(s) and Environment

FIG. 1 illustrates an exemplary network and/or operational environment in which a humanoid robot (also referred to as a bipedal robot) 1, which is further detailed in additional figures herein, may operate. The environment may include a plurality of interconnected components, such as: (i) the humanoid robot 1, (ii) one or more other humanoid robots 2700A-X which may the same as or different from the robot 1, (iii) one or more machines 2710A-X, (iv) one or more command centers 2750A-X, (v) one or more remote artificial intelligence (AI) system(s) 2780 which are remote from the robot 1, such as a cloud-based AI system, and (vi) one or more data stores 2900. Each component may be interconnected with another component, directly or indirectly, by at least one of: (i) one or more networks 2999A-X, (ii) direct communication systems (not illustrated—e.g., a data store 2900 may have direct communication with a remote AI system 2780) and/or (iii) physical contact with one another (e.g., the humanoid robot 1 may be in direct physical contact when operating a machine 2710A-X). The one or more networks 2999A-X may include, for example, the Internet, a local area network, a wide area network, a private network, a cloud computing network, or a network based on a wireless communication protocol. Additionally, it should be understood that the humanoid robot 1 may be interconnected with one or more other humanoid robots 2700A-X through a wireless communication protocol, such as a Bluetooth connection or a connection based on a near-field communication protocol, or through a wired connection.

The humanoid robot 1 may be collocated with one or more of the other humanoid robots 2700A-X to collectively or separately perform a given task or workflow. Such operations may occur, e.g., at a worksite such as a factory, warehouse, industrial facility, or home. Furthermore, the humanoid robot 1 may also be situated in a separate geographical location relative to other humanoid robots 2700A-X. For example, the humanoid robot 1 may be located in a given worksite, while another humanoid robot 2700A-X is located at another worksite in a different geographical location.

The operational environment may generally include machines 2710A-X, which may be embodied as any device, heavy machinery, or object with which a humanoid robot 1 and/or other humanoid robots 2700A-X may interact. For instance, a machine 2710A-X can include, among other things, tools, packaging machinery, forklifts, drilling machines, pallet movers, HVAC equipment, carts, bins, and platform machines.

The command centers 2750A-X may be comprised of one or more physical computing devices or virtual computing instances executing on a local or cloud network. These centers 2750A-X may be utilized for one or more of monitoring, managing, and configuring tasks, as well as for issuing control directives to the humanoid robot 1 and other humanoid robots 2700A-X at one or more worksites. A command center 2750A-X may be collocated with any of the humanoid robot 1 or the other humanoid robots 2700A-X, or it may be located in a different geographical location from the robots 1 and other humanoid robots 2700A-X. The computing devices of the command centers 2750A-X may execute software that is used to monitor (e.g., charge level, task performance, etc.), manage the robots 1 and other humanoid robots 2700A-X, and/or transmit long-horizon goals, tasks, and control directives to the robots 1 and other humanoid robots 2700A-X over the networks 2999A-X. Additionally and as such, the humanoid robots 1 and other humanoid robots 2700A-X may each be configured to: (i) send data to the command centers 2750A-X, (ii) perform a given task based on the transmitted long-horizon goals, tasks, and control directives, and/or (iii) infer a task based on the transmitted long-horizon goals, tasks, and control directives.

The command centers 2750A-X may determine, based on available humanoid robots 1 and the capabilities of each robot, which of the robots may be best suited for a given task. For example, the command centers 2750A-X may identify a humanoid robot 2700A-X to transfer parts to the other room once they are placed in the jig. The command centers 2750A-X may thereafter relay the assignment to the assigned other humanoid robot 2700A-X, which may be identified based on a unique identifier (e.g., serial number) assigned to each of the humanoid robots 1 and 2700A-X, and also to the other humanoid robots 2700A-X to indicate which other humanoid robot 2700A-X has been assigned the task.

The remote AI system 2780 may be comprised of one or more computing devices that are configured to perform global operations related to AI/ML for the entire computing environment. For example, the remote AI system 2780 may store, retrieve, and otherwise manage data within the data store 2900. This data may include one or more AI models 2902, rules 2912, and training data 2920. The AI models 2902 may be embodied as any type of model that: (i) can be run in an environment that is remote from the humanoid robot 1 and 2700A-X, while being in communication with the humanoid robot 1 to enable the humanoid robots 1 and 2700A-X to perform the functions described herein (e.g., observing, reasoning, and performing tasks), (ii) can be sent to the humanoid robot 1 and 2700A-X, where the humanoid robot 1 and 2700A-X runs the model locally to perform the functions described herein, and/or (iii) can be used in the training of any model described herein. For instance, the AI models 2902 may comprise artificial neural networks, convolutional neural networks, recurrent neural networks, generative adversarial networks, variational autoencoders, diffusion models, transformer models, natural language processing models (e.g., speech-to-text and/or text-to-speech), object detection models, image segmentation models, facial recognition models, transfer learning models, autoregressive models, large language models, visual language models, vision-action models, multi-modal language models, graph neural networks, reinforcement learning models, or any other type of model known in the art or disclosed herein. The rules 2912 may be comprised of sets of rules and conditions that are used to enable: (i) deterministic behavior by the humanoid robot 1 and the other humanoid robots 2700A-X, (ii) training the models that enable the humanoid robots 1 and 2700A-X to perform the functions described herein, and/or any other known rule. For example, the rules 2912 may include any combination of finite state machines, reactive control protocols, safety rules, configuration files, task sequencing protocols, safety protocols, and/or protocols for compliance with standards, safety, morals and/or regulations.

The training data 2920 may be embodied as any type of data that is used to train one or more of the AI models 2902. For example, the training data 2920 may include: (i) image data, such as raw image data, annotated image data, or synthetic data comprising computer-generated images used to augment real image datasets, particularly in instances where usable data is scarce; (ii) video data, such as raw video data, annotated video data, or synthetic data; (iii) text data, such as natural language instructions, dialogue data, machine-readable instructions, or natural language mapping data; (iv) depth data, such as map data or point cloud data; (v) robot joint trajectories; (vi) robot joint locations; (vii) robot joint location data, which may be obtained from teleoperation of a robot; (viii) robot joint rotations data, which may also be obtained from teleoperation of a robot; (ix) other robot sensor data, such as inertial measurement unit (IMU) data, force and torque data, or proximity sensor data; (x) simulation data; (xi) human demonstration data, such as first person or third person images or videos of humans performing a task; (xii) robot demonstration data, such as images or videos of other robots performing a task; (xiii) any combination of the aforementioned data types; and/or (xiv) any other known data type. For clarity, it should be understood that any data type that is described above may be either labeled or unlabeled.

The remote AI system 2780 may include a data augmentation engine 2782, a training engine 2790, and a simulation engine 2800. The data augmentation engine 2782 may be embodied as any combination of hardware, software, or circuitry that is configured to increase the size and diversity of the training data 2920, particularly in instances where the training data is limited. For example, the data augmentation engine 2782 may be configured to perform: (i) image augmentation of visual data such as images and video frames (e.g., identifying anatomical point and/or kinematic chains), (ii) sensor data augmentation to simulate real-world inaccuracies like noise, thereby assisting in training the AI models 2902 to account for such inaccuracies, (iii) trajectory augmentation to modify the speed or timing of movements, which assists the AI models 2902 in learning to recognize and adapt to different behaviors, or to alter the trajectories or paths of the robot 1 in simulations, and (iv) domain randomization, which involves altering parameters including textures, lighting, and object positions.

The illustrative training engine 2790 may be embodied as any combination of hardware, software, or circuitry for training the AI models 2902, given a set of rules 2912 and training data 2920. To do so, the training engine 2790 may apply a variety of AI/ML techniques, such as supervised learning techniques (e.g., classification, regression), unsupervised learning techniques (e.g., clustering, dimensionality reduction, anomaly detection), semi-supervised learning techniques (e.g., training with both labeled and unlabeled data), reinforcement learning techniques (e.g., model-free methods, model-based methods), ensemble learning, active learning, and transfer learning techniques (e.g., by leveraging pre-trained models 2902). It should be understood that each of these techniques may be applied online or offline.

The simulation engine 2800 may be embodied as any combination of hardware, software, or circuitry for executing one or more of the AI models 2902 within a virtualized simulation environment. This allows for the simulation and analysis of various aspects of the humanoid robot 1, such as its kinematics, sensor behavior, overall behavior, anomalies, and the like. For example, the simulation engine 2800 may generate the simulation environment based on real-world mapping data that was previously observed and/or generated by the humanoid robot 1 or other humanoid robots 2700A-X, or that was obtained from third-party services. The simulation engine 2800 may also generate a physics-accurate model of the humanoid robot 1, which has a specified configuration (e.g., a physical structure, joints, sensors, actuators, and other components with predefined parameter sets). The data generated from the simulations may then be used by the training engine 2790 to build, train, alter, fine-tune, or modify a previously generated model, a new model, and/or rules. Advantageously, the simulation engine 2800 is designed to improve efficiencies in the manufacture, testing, and deployment of a given humanoid robot 1 for a specified purpose.

The remote AI system 2780 may account for the substantial computing and resource demands required by AI/ML-based techniques by processing at least a portion of data, requests, and/or training. As such, the humanoid robots 1 may be configured with considerably less powerful compute, network, and storage resources. For instance, the humanoid robot 1 may prioritize certain processes, such as those relating to the performance of a presently assigned task, and offload other processes, such as the refining of local AI/ML models, to the remote AI system 2780. The remote AI system 2780 may also periodically update the humanoid robots 1 and 2700A-X with refined AI models 2902 and training data 2920, or it may receive updates and propagate them to the robots 1, for instance, via over-the-air updates or push subscription-based updates. The remote AI system 2780 may also push updated rules 2912 to the robots 1 and 2700A-X. Additionally, the remote AI system 2780 may receive data from each of the humanoid robots 1 and 2700A-X, which may include behavioral information, learning information, model reinforcement data, and the like. The remote AI system 2780 may store such data as training data 2920 and subsequently use this data to refine the AI models 2902.

Although FIG. 1 depicts the data augmentation engine 2782, the training engine 2790, and the simulation engine 2800 as executing on a single remote AI system 2780, one of skill in the art will recognize that each of these engines may execute on separate systems or computing nodes associated with the remote AI system 2780. Such an arrangement may be advantageous in improving the performance and resource management of each of the engines 2782, 2790, and 2800.

D. Humanoid Robot

Figure 2:
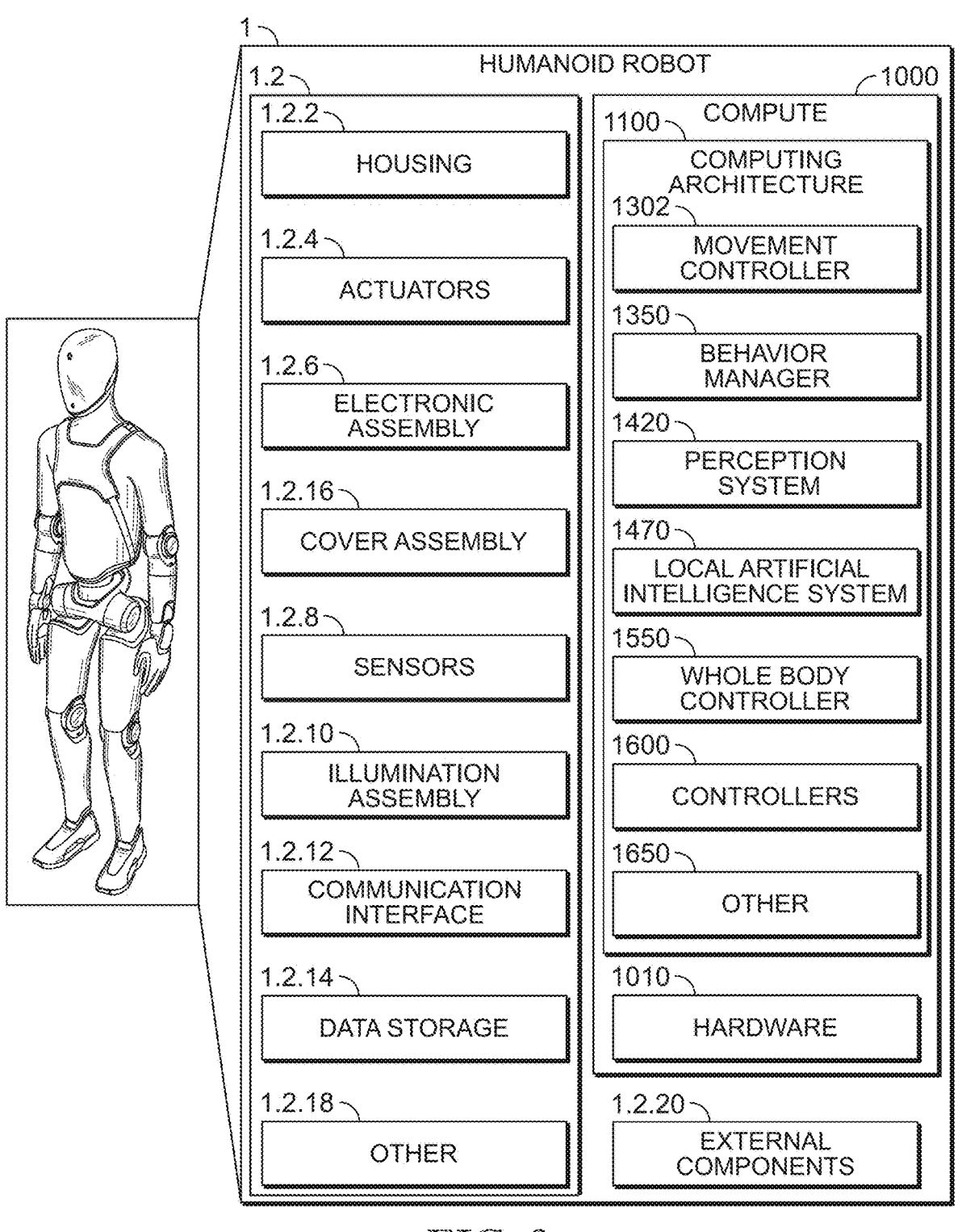
FIG. 2 is a block diagram illustrating components of the humanoid robot of FIG. 1.

FIG. 2 is a block diagram of a humanoid robot 1 that includes a variety of architectures and other components that may include: (i) a mechanical/electrical architecture 1.2 that includes housings 1.2.2, actuators 1.2.4, electronic assembly 1.2.6, sensors 1.2.8, communication interface 1.2.12, illumination assembly 1.2.10, data storage 1.2.14, exterior covering assembly 1.2.16, external components 1.2.20, other components 1.2.18, and (ii) compute 1000 that includes a computing architecture 1100.

a. Humanoid Robot Configuration

The high-level configuration for the robot 1 includes assemblies that function together to provide the robot with a humanoid shape and enable said robot to perform human-like movements. As such, the structures and kinematic principles that are inherent to non-humanoid systems cannot be simply adopted or implemented into a humanoid robot 1 without undergoing careful analysis and empirical verification against the complex realities of design, testing, and manufacturing. Theoretical designs that attempt such direct modifications are insufficient, and in some instances woefully insufficient, because they amount to mere design exercises that are not tethered to the complex realities of successfully creating a functional, general-purpose humanoid robot.

i. Robot Components

In addition to the general systems, assemblies, components, and parts described above, the humanoid robot 1 in the illustrative embodiment shown in FIG. 3A may include the following systems, assemblies, components, and parts, which can be broadly categorized into three regions. As shown in FIG. 3A, these three regions include: (i) an upper portion 2, which includes a head and neck assembly 10, a torso 16, left and right arm assemblies 5, and left and right hands 56; (ii) a central portion 3, which includes a spine 60, a pelvis 64, and left and right upper leg assemblies 6.1 of left and right leg assemblies 6; and (iii) a lower portion 4, which includes left and right lower leg assemblies 6.2 of leg assemblies 6.

In the illustrative embodiment shown in FIG. 3A, each arm assembly 5 may include a shoulder 26, an upper humerus 30, a lower humerus 36, an upper forearm 40, a lower forearm 46, and a wrist 50. The hand 56 is coupled to the wrist 50. Each leg assembly 6 may include: (i) an upper leg assembly 6.1, which may comprise a hip 70, an upper thigh 76, and a lower thigh 80, and, (ii) a lower leg assembly 6.2, which may comprise a shin 84, a talus 88, and a foot 92. In other embodiments, some of these systems, assemblies, components, or parts may be omitted, combined, or replaced with alternative designs.

1. Head and Neck Assembly

The head and neck assembly 10 of the humanoid robot 1 may be designed to enhance its anthropomorphic characteristics, while also providing functional capabilities that support interaction, perception, and communication. The head and neck assembly 10 is coupled to a torso 16 and possesses an overall shape that generally resembles the general shape of a human head. The head and neck assembly 10 is, however, specifically designed to lack pronounced human facial structures, such as cheeks, eye protrusions, a mouth, or other moving parts, to maintain a non-humanlike appearance. The exterior surface of the head 10.1 is characterized by an absence of large flat surfaces (e.g., the head 10.1 is not a cube or prism) and the head is also not formed with significant cylindrical features or perfect circles. Instead, almost all exterior surfaces of the head 10.1 are curvilinear or contain substantial curvilinear aspects, which presents a generally egg-shaped appearance when viewed from the front or top.

Structurally, the head 10.1 is symmetrical about the sagittal plane $P_S$ but is asymmetrical about Z-Y and X-Y planes that intersect the head and are parallel to the coronal plane ($P_C$) and the transverse plane ($P_T$), respectively. The width (parallel to the y-axis) and depth (parallel to the x-axis) of the head 10.1 change constantly from top to bottom, reaching a maximum dimension in the temple region, which is located at approximately 30-50% of the head's height from its top end.

The head 10.1 itself may house a range of components, such as high-resolution cameras, microphones, and displays, all of which are contained within an impact-resistant polymer shell 102.2. This shell 102.2 includes a large, freeform (i.e., not conforming to a regular or formal structure or shape) frontal shield 102.4 that covers the frontal and crown regions of the head 10.1. The frontal shield 102.4 is formed as a separate and distinct piece from the displays positioned behind it, thereby protecting the displays and internal electronics from damage. This separation provides a significant advantage during the performance of industrial tasks, as a damaged frontal shield 102.4 is substantially cheaper and easier to replace than a damaged display. The frontal shield 102.4 extends rearward beyond an auricular region into an occipital region and extends down to a chin region, but it does not extend below a jaw line.

Cameras embedded within the head 10.1 may include RGB, depth-sensing, thermal imaging capabilities and/or any other cameras disclosed herein, which are designed to enable the humanoid robot 1 to perform tasks such as object recognition, environmental mapping, and facial expression analysis. For the specific purpose of generating a low-latency Virtual Reality (VR) view, a pair of high-resolution, high-frame-rate RGB cameras with global shutters may be utilized. For example, this pair of cameras may be the vertically arranged cameras 108.2.2 and 108.2.4, or they may be horizontally arranged internal/external cameras. Microphones may be arranged in an array to facilitate directional audio input and noise cancellation, which enhances the ability of the humanoid robot 1 to understand and respond to verbal commands.

Displays integrated into the head 10.1 may serve as user interfaces, providing visual feedback or conveying expressions to improve communication and user engagement. Unlike the heads of conventional robots, the disclosed head 10.1 includes a main display 108.4 that is curved in at least one direction and is positioned at an angle relative to a sagittal plane. This curved design permits the inclusion of a larger display with a greater surface area compared to a flat screen, which increases the amount of information that can be conveyed, such as robot status and sensor data. This information is displayed using generic blocks or shapes rather than anthropomorphic features like eyes or a mouth. In addition to the main display 108.4, two side-facing displays are included to show indicia such as the identification number/serial number, battery life, current task, any required safety indicia, and/or any other information associated with the humanoid robot 1.

Further, an extent of the illumination assembly 1.2.10, which comprises a plurality of light emitters, is positioned adjacent to an edge (e.g., lower) of the frontal shield 102.4.

These light emitters may be configured to function as indicator lights to communicate the status of the robot 1 to nearby humans—for instance, by emitting light that appears to humans in different colors (e.g., yellow for working, green for idle, red for an error state, or blue for thinking) or illumination sequences-without relying on the main displays. This method of communication may be more power-efficient than displays, and may relay information more rapidly.

Additionally, the head 10.1 may house: (i) other sensors, such as gyroscopes and accelerometers, (ii) heat management systems (e.g., heat pipes, fans, etc.), (iii) wireless communication modules (e.g., 5G cellular, Wi-Fi, Bluetooth) and antennas. To maximize bandwidth and ensure connectivity, a plurality of 5G cellular radios may be positioned in the torso 16 and wired through the neck to the antennas in the head 10.1. The head and neck assembly 10 may also incorporate advanced materials and shock-absorbing structures to protect the sensitive electronic components housed within, which may improve the overall durability and reliability of the humanoid robot 1.

Additionally, variations of head 10.1 may include modular head designs that allow for the quick customization or replacement of sensory and communication components. These modular designs may facilitate easy upgrades or modifications to the capabilities of the humanoid robot 1 without requiring extensive changes to the overall head and neck assembly 10. Furthermore, advanced control algorithms may be implemented to enable more natural, biomimetic head movements, potentially incorporating machine learning techniques to adapt and refine the motion patterns of the head 10.1 based on interaction data and environmental feedback.

2. Torso

The torso assembly 16 is a central component within the humanoid robot 1, extending vertically between the waist and the head and neck assembly 10, and horizontally between the shoulders 26. The torso 16 is designed to provide the robot 1 with a generally humanoid shape, offer structural and operable support for the arm assemblies 5 and the head and neck assembly 10, and house and protect internal components, including the arm actuators (J1) 190 and an electronics assembly 1.2.6 housed at least partially within the torso 16.

The electronics assembly 1.2.6 within the torso 16 contains various interconnected components that are essential for the operation of the robot 1, including the battery pack, the compute 1000 (which includes CPUs and GPUs), power distribution unit, and a charging system. The components are strategically positioned to optimize space and balance. The battery pack may be rearwardly offset, positioned in a rear section of the torso 16, while the compute 1000 is placed in a forward section. This spatial distribution helps to maintain a balanced posture, allows for efficient cooling, and maximizes the size and power density of the battery pack. A cooling system may be integrated between the battery pack and the compute 1000 to manage their respective thermal loads. The electronics assembly 1.2.6 may be designed with modularity to facilitate easier maintenance, repair, and upgrades. The charging system may support both wired and wireless protocols. A wired system might use a docking station, while a wireless system could utilize inductive charging, with coils that may be embedded in a housing 1.2.2 and/or the feet 92. The charging system may also include safety features such as overcharge protection and temperature monitoring.

The torso 16 may have a total volume of more than 10 liters, preferably more than 15 liters, and most preferably more than 20 liters. However, the torso 16 has a total volume that is less than 40 liters and most preferably less than 30 liters. The torso 16 also has an uninterrupted internal height that is more than 250 mm, and is preferably near to 300 mm, but is less than 350 mm. This substantial internal volume may accommodate a battery pack that exceeds 2 liters, preferably more than 4 liters, and most preferably more than 6 liters in capacity. Consequently, the humanoid robot 1 may incorporate a battery pack with a capacity exceeding 2.5 kWh, which may provide an operational runtime of over 3.5 hours under normal conditions, and preferably more than 4.5 hours, and most preferably more than 6 hours. In some implementations, the torso 16 may adopt a quasi-trapezoidal prism configuration, wherein its front surface is smaller than its back surface, with angled side shrouds connecting these two sections. This geometric design may enhance the range of motion of the robot 1, particularly by improving its ability to reach across its own body.

3. Arm Assemblies

The arm assemblies include joints between the components that may include interfaces, which are selected to provide high torque transmission efficiency and precise alignment, and may include components such as splined shafts, polygon couplings, Oldham couplings, bellows couplings, jaw couplings, universal joints, magnetic couplings, or flexure couplings. Additionally, the components of the arm assembly may incorporate features such as hard-stops, cooling channels, heat sinks, or other materials, structures, components, or assemblies described herein. For example, a heat pipe may extend from the hand to the lower forearm. Furthermore, the wrist 50 may include a quick-release mechanism that enables the interchange of different end-effectors or tools. Moreover, the housing of each component may be designed with internal reinforcement structures, may be made from various materials (e.g., metal alloys or advanced materials like carbon-fiber-reinforced polymers).

4. Leg Assemblies

The leg assemblies 6 include joints between the components that may include interfaces, which are selected to provide high torque transmission efficiency and precise alignment, and may include components such as splined shafts, polygon couplings, Oldham couplings, bellows couplings, jaw couplings, universal joints, magnetic couplings, or flexure couplings. Additionally, the components of the leg assembly may incorporate features such as hard-stops, cooling channels, heat sinks, or other materials, structures, components, or assemblies described herein. For example, a heat pipe may extend from the knee to the shin 84. Furthermore, the talus 88 may include a quick-release mechanism that enables the interchange of a different foot 92. Moreover, the housing of each component may be designed with internal reinforcement structures, may be made from various materials (e.g., metal alloys or advanced materials like carbon-fiber-reinforced polymers).

To enhance the stability and adaptability of the humanoid robot 1, the leg assemblies 6 may incorporate advanced sensing and control systems, as well as comprehensive protective systems. For instance, force sensors located in the feet 92 and ankles may provide real-time feedback on ground contact forces and pressure distribution. This data may be used by the control system of the humanoid robot 1 to make rapid adjustments in order to maintain balance, especially when moving on uneven or dynamic surfaces. Inertial measurement units (IMUs) positioned in the leg assemblies 6 and the pelvis 64 may also provide crucial information on the orientation and acceleration of each leg segment, thereby allowing for the precise control of leg positioning during movement.

b. Mechanical and Electrical Architecture

The mechanical and electrical architecture 1.2 may be embodied as any combination of hardware, software, and circuitry that enables the humanoid robot 1 to operate and perform physical functions in response to electrical charges or electrical signals. As illustrated comprehensively in additional figures herein, the robot 1 is composed of a plurality of assemblies and components that are specifically arranged to emulate or generally resemble human anatomical structures and their functional characteristics. A humanoid form is advantageous because it enables the robot 1 to execute a wide range of general tasks that are typically performed by humans, such as walking between different locations, handling and moving objects, and retrieving items from various positions and orientations. Non-humanoid forms (e.g., wheeled robots or quadrupeds) typically lack the versatility and effectiveness that are required to perform such a diverse array of generalized tasks.

i. Actuators

The actuators 1.2.4 contained within the robot 1 include thirty actuators (J1)-(J16), excluding the end effectors, that are housed within various components of the robot 1 to actuate movement of said components. An additional aggregate total of twelve actuators are in both hands 56 combined. Below is a summary table showing the actuator 1.2.4 reference names and numbers for the thirty actuators (J1)-(J16), the quantity of each, descriptive actuator names used herein for consistency, common corresponding informal actuator names, and associated rotational axes from the high-level configuration of the illustrative embodiment robot 1. Specific actuators in each hand 56 (e.g., six actuators in each hand) are not individually included in the below table

TABLE 1

| Actuator | Qty | Actuator Name | Informal Actuator Name(s) | Axis |
|---|---|---|---|---|
| (J1) 190 | 2 | arm | primary arm | $A_1$ |
| (J2) 280 | 2 | shoulder | (none) | $A_2$ |
| (J3) 320 | 2 | upper arm twist | upper arm x, upper arm roll | $A_3$ |
| (J4) 374 | 2 | elbow | arm z, arm yaw, lower humerus | $A_4$ |
| (J5) 468 | 2 | lower arm twist | lower arm x, lower arm roll | $A_5$ |
| (J6) 484 | 2 | wrist flex | wrist/hand y, wrist/hand pitch, flick | $A_6$ |
| (J7) 520 | 2 | wrist pivot | wrist/hand z, wrist/hand yaw, wave | $A_7$ |
| (J8.1) 120 | 1 | head twist | head no | $A_{8.1}$ |
| (J8.2) 140 | 1 | head nod | head yes | $A_{8.2}$ |
| (J9) 680 | 1 | torso lean | spine x, torso/spine roll | $A_9$ |
| (J10) 620 | 1 | torso twist | spine z, torso/spine yaw | $A_{10}$ |
| (J11) 720 | 2 | hip flex | hip y, hip/leg pitch, forward kick | $A_{11}$ |
| (J12) 768 | 2 | hip roll | hip x, hip/leg roll, sideways kick | $A_{12}$ |
| (J13) 782 | 2 | leg twist | hip z, hip/leg yaw | $A_{13}$ |
| (J14) 820 | 2 | knee | lower thigh, lower leg y, lower leg pitch, rear kick | $A_{14}$ |
| (J15) 860 | 2 | foot flex | foot y, foot pitch, or first ankle | $A_{15}$ |
| (J16) 900 | 2 | foot roll | talus, foot roll, foot x, second ankle | $A_{16}$ |

It should be understood that in other embodiments, some of these systems, assemblies, components, and/or parts may be omitted, combined, or replaced with alternative systems, assemblies, components, and/or parts. The robot 1 only uses electric actuators, and thereby lacks manual, hydraulic, cable-based, or pneumatic actuators. The exclusive use of electric actuators reduces assembly, maintenance, weight, and cost, and increases durability and safety considerations related to operating the robot 1 within or around other humans.

ii. Sensors

As illustrated in FIG. 4, sensors 1.2.8 may be embodied as any hardware, software, and/or circuitry for providing sensor data indicative of perceived stimuli, conditions, and measurements to enable the humanoid robot 1 to process, reason, and act appropriately (e.g., based on a given task, a set of rules, and/or other constraints). The sensors 1.2.8 may include one or more torque sensors 1.2.8.2, inertial sensors 1.2.8.4, visual sensors 1.2.8.6, auditory sensors 1.2.8.8, touch sensors 1.2.8.10, proximity sensors 1.2.8.12, environmental sensors 1.2.8.14, and other sensors 1.2.8.16. The sensors 1.2.8 may provide sensor data (e.g., torque, inertia measures, audiovisual sensor data, touch data, proximity data, environmental data, etc.) to the compute 1000 processors, further described below, to enable appropriate interaction between the humanoid robot 1 and the environment.

The torque sensors 1.2.8.2 may comprise one or more torque cells that are positioned within the actuators and are designed to measure the amount of force or torque applied to a part of the humanoid robot 1. The measurements may be transmitted to other components of the humanoid robot 1, such as the whole body controller 1550 or one or more controllers 1600, to enable balance, locomotion, manipulation, and handling by the humanoid robot 1.

The inertial sensors 1.2.8.4 may comprise sensors for measuring the motion, position, and orientation of the humanoid robot 1 relative to the environment for purposes of navigation, stabilization, and interaction with the environment and surroundings. For example, the inertial sensors 1.2.8.4 can include one or more accelerometers (e.g., to measure acceleration forces in one or more directions for use in determining changes in velocity and orientation), gyroscopes (e.g., to measure angular velocity for use in tracking rotational movement and maintaining balance), IMUs (e.g., combining the accelerometers and gyroscopes for use in providing comprehensive motion and orientation data), and Global Positioning System (GPS) receivers (e.g., to provide location data based on satellite signals, for use in outdoor navigation and positioning).

The visual sensors 1.2.8.6 may comprise sensors for capturing visual data, including cameras (e.g., red-green-blue (RGB) standard color cameras, grayscale monocular cameras, and stereo cameras (e.g., to capture depth perception)), depth cameras (e.g., depth cameras using technologies such as structured light or time-of-flight to measure distance to objects, Azure® Kinect® depth camera, Intel® RealSense® depth camera, etc.), LIDAR (Light Detection and Ranging) sensors (e.g., to measure distance to objects by emitting laser pulses, analyze the reflections, and provide detailed 2D or 3D maps of the environment), radar (e.g., to detect objects via radio waves and measure distance and speed for use in various applications including navigation and obstacle detection). Visual sensors 1.2.8.6 may also include event-based cameras, which report changes in pixel intensity rather than full frames, offering advantages in speed and data efficiency for dynamic scenes. Examples of said visual sensors 1.2.8.6 include the cameras 108.2.2 and 108.2.4 contained in the head 10.1 of the robot 1.

The auditory sensors 1.2.8.8 may comprise sensors for capturing audio data, including microphones (e.g., to capture audio signals for voice recognition, environmental noise detection, or communication), ultrasonic transducers (e.g., to capture distance measurement and obstacle detection through high-frequency sound waves), spatial audio sensors such as microphone arrays and direction of arrival sensors (e.g., to capture sound from different locations to determine the direction and distance of sound sources for 3D positioning). Auditory sensors 1.2.8.8 could also include specialized acoustic sensors for detecting specific sound patterns, such as the sound of failing machinery or distress calls, further enhancing the robot's environmental awareness.

The touch sensors 1.2.8.10 may comprise sensors for detecting physical contact or pressure applied to the surface of the humanoid robot 1, e.g., to enable tactile feedback, safety and collision avoidance, object handling and manipulation, and interaction with the environment and surroundings. Example touch sensors 1.2.8.10 may include pressure sensors to measure an amount of pressure applied to a surface by the humanoid robot 1, such as capacitive sensors (e.g., to detect touch or proximity through changes in capacitance), resistive sensors (e.g., to detect pressure or touch by measuring changes in resistance), piezoelectric sensors (e.g., to generate an electrical charge in response to mechanical stress or pressure and detect vibrations or impact), force-sensitive resistors (e.g., to change resistance based on the amount of applied force), and optical touch sensors (e.g., to use light beams or infrared to detect touches or proximity). Alternative touch sensors 1.2.8.10 may involve artificial skin technologies that provide a more distributed and nuanced sense of touch, capable of detecting not only contact but also shear forces and temperature changes on the robot's surfaces.

The proximity sensors 1.2.8.12 may comprise sensors for detecting the presence or absence of objects within a given range without necessarily making physical contact with the object, e.g., to provide obstacle avoidance, navigation, and object detection. Example proximity sensors 1.2.8.12 can include ultrasonic sensors (e.g., to measure distance by emitting ultrasonic waves and detecting reflection of the waves for avoiding obstacles and measuring distance) and infrared rangefinders (e.g., to detect, using infrared light, the presence or distance of objects for proximity sensing and simple obstacle detection). Capacitive proximity sensors may also be used as part of proximity sensors 1.2.8.12, particularly for close-range interactions.

The environmental sensors 1.2.8.14 may comprise sensors for measuring various physical parameters of the environment and surroundings to enable the humanoid robot 1 to interact with the environment and surroundings, adapt to changes in the environment and surroundings, and perform a given task. Example environmental sensors 1.2.8.14 can include thermocouples (e.g., to measure temperature by generating a voltage proportional to temperature difference), thermistors (e.g., to measure temperature based on changes in resistance), magnetometers (e.g., to measure magnetic fields for navigation and orientation), light sensors (e.g., to measure intensity of light in the environment), gas sensors (e.g., to detect presence and concentration of various gases and monitor air quality), and humidity sensors (e.g., to measure relative humidity in the air). Other environmental sensors 1.2.8.14 could include barometric pressure sensors for altitude determination or weather prediction, radiation sensors for operation in hazardous environments, or particulate matter sensors for air quality assessment in industrial settings.

c. Compute

As illustrated in FIG. 2, the compute 1000 may comprise any combination of hardware, software, and circuitry to perform various computing functions that enable the humanoid robot 1 to operate semi- or fully-autonomously. Specifically, the compute 1000 includes: (i) compute hardware 1010, and (ii) computing architecture 1100. Such functions may include processing long-horizon goals, coordinating with other humanoid robots 2700A-X, processing sensor information, controlling the humanoid robot 1 based on the sensor information and goals, controlling the activation or deactivation of mechanical components, learning, simulating, refining behavioral models, and policy management.

i. Hardware

The compute hardware 1010 may operate as one or more general purpose processors or special purpose processors (e.g., digital signal processors, application specific integrated circuits (ASICs), field programmable gate arrays (FPGAs), etc.) that can be configured to execute computer-readable program instructions stored in the aforementioned data storage devices. Such instructions can be executed to provide controller operations (e.g., to activate or deactivate components of the mechanical and electrical architecture 1.2, etc.). Specifically, the humanoid robot 1 may be configured with a variety of processors such as one or more central processing units (CPUs) 1100 (e.g., x86 CPUs, ARM CPUs, RISC-V CPUs, embedded CPUs such as Internet-of-Things CPUs or mobile CPUs), graphics processing units (GPUs) (e.g., ray tracing GPUs, accelerated computing GPUs, embedded GPUs such as system-on-chip (SoC) GPUs or mobile GPUs), neural network processing units (for example, tensor processing units designed for tensor computations in machine learning tasks; dedicated neural network processing units such as Intel Nervana NNP, Graphcore IPU, IBM TrueNorth, or Qualcomm Cloud AI 100; custom neural network processing units such as Amazon Web Services (AWS) Inferentia, Apple Neural Engine, and Huawei Ascend; and Neuromorphic Neural Network Processing Units such as Intel Loihi or BrainChip Akida), and other processors. For example, the other processors may be embodied as a single or multi-core processor, a microcontroller, or other processor or processing/controlling circuit. In some embodiments, the other processors may be embodied as, include, or be coupled to an FPGA, an ASIC, reconfigurable hardware or hardware circuitry, or other specialized hardware to facilitate the performance of the functions described herein.

ii. Architecture

The computing architecture 1100 includes: (i) a movement controller 1302, (ii) a behavior manager 1350, (iii) a perception system 1420, (iv) a local AI system 1470, (v) a whole body controller 1550, (vi) one or more controllers 1600, and (vii) other subcomponents 1650.

1. Movement Controller

Figures 6, 7:
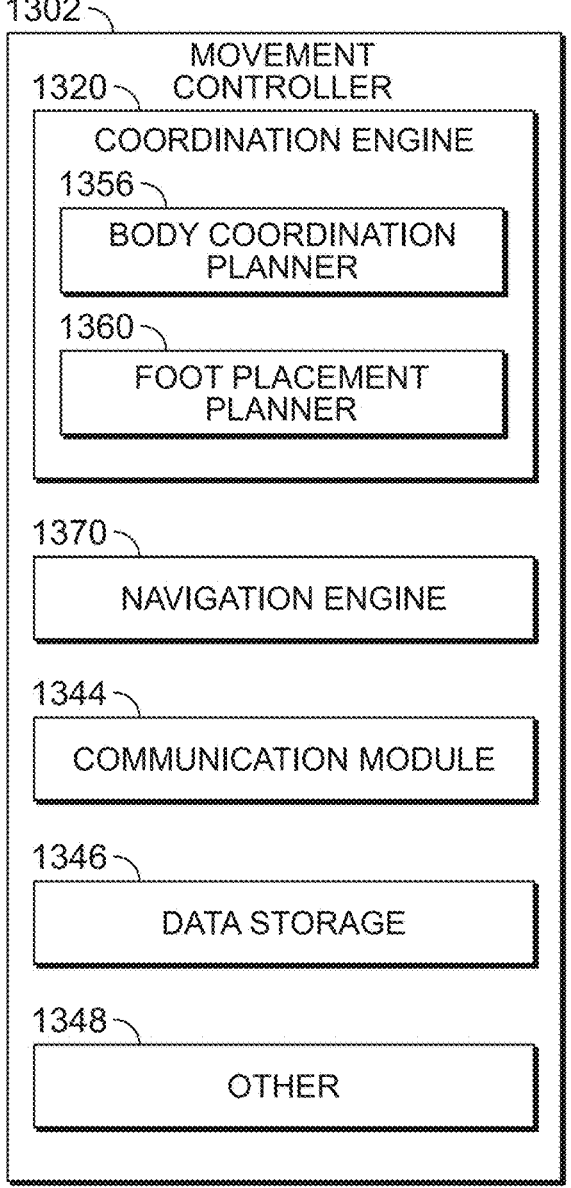
FIG. 6 is a block diagram of a movement controller for the humanoid robot of FIGS. 1-3B.
FIG. 7 is a block diagram of a behavior manager for the humanoid robot of FIGS. 1-3B.

Referring to FIG. 6, the movement controller 1302 may be embodied as any hardware, software, or circuitry to determine a sequence of actions or a path for the humanoid robot 1 to achieve a given goal or complete a given task, in light of a current state, a set of constraints (e.g., the capabilities of the robot 1 and the environment and surroundings of the robot 1), and instructions from another sub-component of the robot 1 or another aspect of the overall architecture 1100. To carry this out, the movement controller 1302 may include a variety of components, such as: (i) a coordination engine 1320, (ii) a navigation engine 1370, (iii) a communication module 1344, (iv) a data storage 1346, and/or (v) other 1348.

The disclosed movement controller 1302 overcomes limitations associated with conventional robotic systems by enabling the robot 1 to: (i) coordinate its body using the body coordination planner 1356 and foot placement planner 1360 based on instructions from the local AI system 1470 and/or remote AI system 2780, (ii) navigate its world by mapping its environment (e.g., SLAM) and predict movement of objects within said environment, and (iii) communicate with its environment. The movement controller 1302 also enables the robot 1 to adapt in real-time to dynamic environments by continuously monitoring the execution of its plans and comparing the expected outcomes with actual results. The movement controller 1302 further solves the technical challenge of efficient resource allocation. By considering the current state of the robot 1, available energy, time constraints, and the relative importance of different goals, the movement controller 1302 optimizes the allocation of the computational and physical resources of the robot 1. Furthermore, the movement controller 1302 can addresses the issue of human-robot collaboration by incorporating models of human behavior and preferences into its decision-making process. This allows the robot 1 to generate plans that are not only efficient from a purely mechanical standpoint but are also intuitive and comfortable for human collaborators.

In an embodiment, the coordination engine 1320 receives task inputs from one or more AI systems 1470, 2780 and provides supplemental information to the whole body controller 1550 regarding the state, configuration, and/or position of the robot 1 within its environment. In particular, the coordination engine 1320 can utilize both the body coordination planner 1356 and the foot placement planner 1360 to control the body placement and foot placement of the humanoid robot 1 based on the inputs from the one or more AI systems 1470, 2780. Specifically, the coordination engine 1320 may break down or override the task inputs from the one or more AI systems 1470 to ensure efficient control of the robot 1 within a space, e.g., during movement such as walking, running, or jumping, to ensure balance, stability, and efficient locomotion of the humanoid robot 1. In other embodiments, the coordination engine 1320 and/or most of the movement controller 1302 may be consumed within the one or more AI systems 1470, 2780.

The navigation engine 1370 may be embodied as any combination of hardware, software, and/or circuitry to map the environment and surroundings based on obtained sensor data (and data that may be obtained from external sources such as other humanoid robots 2700A-X, mapping services, weather services, GPS modules, etc.) and to generate one or more paths. The mapping for the environment by the navigation engine 1370 may then be provided to the one or more AI systems 1470, 2780 to enable said systems to plan the next move or task of the robot 1.

The data storage 1346 may be configured to store navigational data generated by the navigation engine 1370 and/or position data generated by the planners 1356, 1360. This navigational data and/or position data may be then fed back into the one or more AI systems 1470, 2780 to enable said systems to plan the next move or task. This data may be categorized as short-term memory data and/or long-term memory data. For example, the short-term memory data may include said position data, which comprises the positions of the robot 1 over the last predefined amount of time (e.g., 1 minute or 5 seconds, or anytime between). Meanwhile, the long-term memory data may include the navigational data, which comprises maps of every place any robot 1, 2700A-X has ever visited or been. The ability to feed different amounts of short-term memory data and/or long-term memory data into the one or more AI systems 1470, 2780 provides a significant advantage over conventional robots, as it can efficiently limit the data needed to perform the task without requiring unnecessary processing power that could not be performed on a mobile robot 1. It should be understood that the movement controller 1302 may be omitted and/or consumed by one or more models (e.g., RL trained models) that are contained within the local AI system 1470.

2. Behavior Manager

Referring to FIG. 7, the behavior manager 1350 may be embodied as any hardware, software, or circuitry for managing behaviors or actions of the humanoid robot 1 based on a given goal, sensor data, and the environment and surroundings of the humanoid robot 1. To accomplish this, the behavior manager 1350 includes: (i) at least one model predictive control engine 1364, (ii) a mode manager 1390, (iii) an autonomy selector 1352, (iv) a communications module 1414, (v) a data storage 1416, and (vi) other modules or components 1418. The disclosed behavior manager 1350 solves several critical technical issues in the field of robotics. One technical issue solved by the behavior manager 1350 is the integration and coordination of multiple modules within a single robotic system. The behavior manager 1350 also solves the technical issue of ensuring that the behaviors of the robot 1 are executed in the correct order, which prevents conflicts and ensures smooth transitions between different actions or states. For example, the manager 1350 might ensure that a "stand up" behavior is completed before a "walk" behavior is initiated, or that an "object recognition" behavior is performed before an attempt to grasp an object is made.

The model predictive control engine 1364 aids in predicting future states of the humanoid robot 1 based on its current state, and/or making decisions to optimize behavior and performance over a given time period. The MPC engine 1364 may select from one or more predefined or learned actions for the humanoid robot 1 to take in response to various stimuli observed by the humanoid robot 1 (e.g., via sensors 1.2.8) and other factors such as assigned tasks to perform. For example, such MPC engine 1364 may select from or utilize different predefined routines or modes to accomplish path planning, obstacle avoidance, object grasping and manipulation, human-robot interaction, task planning and execution, decision making, coordination with other humanoid robots 2700A-X and machines 2710A-X, and safety and regulatory compliance behaviors. Over time, the MPC engine 1364 may communicate with the local AI system 1470 to enable the MPC engine 1364 to refine its selections based on learning algorithms that identify predefined or learned actions for the humanoid robot 1 based on the given tasks, scenarios, and constraints.

Meanwhile the mode manager 1390 can manage modes of the robot 1. Specifically, the mode manager 1390 is configured to select an appropriate mode or set of modes given a specified task, scenario, or constraint. For example, the mode manager 1390 may select between a power mode, a standby mode, a standing mode, a sitting mode, a movement mode (e.g., running, walking, jumping, hovering, etc.), a falling mode, a learning mode, a diagnostic mode, an emergency mode, etc. Over time, the mode manager 1390 may collaborate with the local AI system 1470 to refine its mode selection based on learning algorithms.

The autonomy selector 1352 may be configured to manage autonomous features of the behavior manager 1350. For example, an operator may, through the autonomy selector 1352, configure a level of autonomy of the humanoid robot 1 (e.g., such that the humanoid robot 1 operates manually, in which the operator may remotely control the operation of the robot 1, semi-autonomously, or fully autonomously). In an embodiment, the operator may, through the autonomy selector 1352, specify certain features to be conducted autonomously and others to, e.g., perform a repetitive task without any form of AI/ML-based behavior or to require some form of manual input for operation.

The communication module 1414 may be embodied as any combination of hardware, software, or circuitry to enable components of the behavior manager 1350 to communicate with one another and with other components of the humanoid robot 1 (such as of the compute 1000). The data storage 1416 may be any data storage device or partition on a data storage device for short-term or long-term storage of behavior controller data (e.g., event logs, movement data, training data, navigation logs, mapped area and path data, etc.). Other components 1418 may pertain to other hardware, software, and/or circuitry not previously discussed above relative to the behavior manager 1350, such as cache data, data aggregation modules, data augmentation modules, body part component health management, or calibration data management. It should be understood that the behavior manager 1350 may be omitted and/or consumed by one or more models (e.g., RL trained models) that are contained within the local AI system 1470.

3. Perception System

The perception system 1420 may be embodied as any hardware, software, or circuitry for obtaining audiovisual data (e.g., from sensors 1.2.8) and providing this data to the local AI system 1470 for executing AI-based vision techniques (e.g., object detection, image classification, segmentation, object tracking, facial recognition, scene understanding, depth estimation, anomaly detection, reinforcement learning etc.) to generate, from the audiovisual data, one or more three-dimensional (3D) images. The images may further be annotated with contextual data (e.g., foreground/background information, object classification data, labeling, etc.) for additional processing by the local AI system 1470 and the behavior manager 1350. It should be understood that the perception system 1420 may be omitted and/or folded into the local AI System 1470.

4. Local AI System

The local AI system 1470 may be embodied as any combination of hardware, software, or circuitry to drive semi- to fully-autonomous perception, learning, and behavior by the humanoid robot 1. The local AI system 1470 may implement various operational configurations wherein: (i) models or architectures run exclusively on the disclosed local AI system 1470, (ii) models or architectures execute with a portion running on the local AI system 1470 and another portion running on the remote AI system 2780, enabling distributed processing capabilities that leverage both edge and cloud computing resources for optimal performance, and (iii) models or architectures run exclusively on the disclosed remote AI system 2780, with the local AI system 1470 serving as an interface for command transmission and data relay. The local AI system 1470 receives detailed description in connection with FIG. 8.

Figure 8:
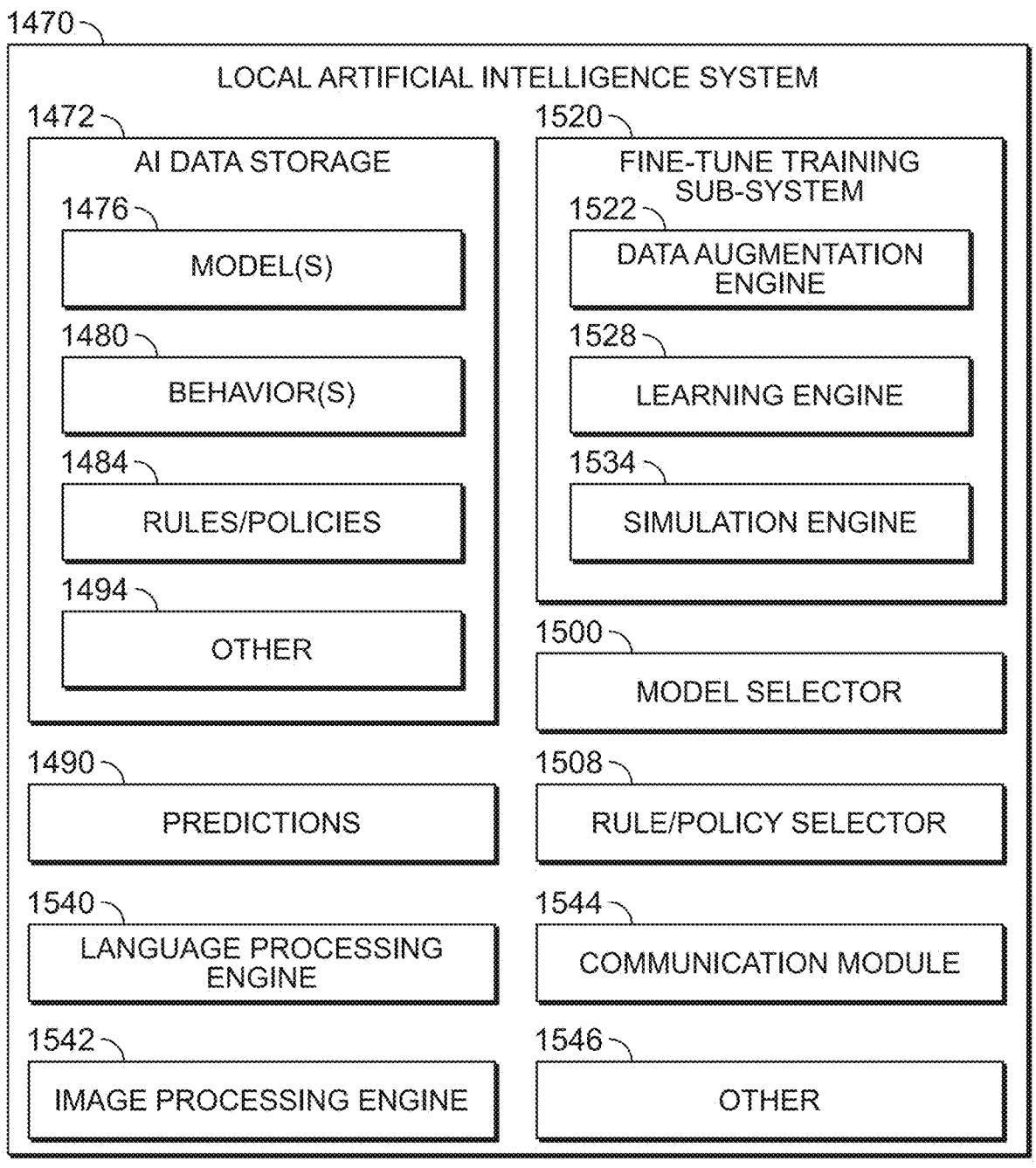
FIG. 8 is a block diagram of an onboard artificial intelligence (AI) system for the humanoid robot of FIGS. 1-3B.

Referring now to FIG. 8, the illustrative local AI system 1470 may include a variety of components, including an AI data storage 1472, predictions 1490, a model selector 1500, a rule and policy selector 1508, a training sub-system 1520, a language processing engine 1540, an image processing engine 1542, and a communication module 1544. However, it should be understood that the local AI system 1470 may interact with and form part of each and every other component (e.g., movement controller 1302, behavior manager 1350, perception 1420, whole body controller 1550, and controllers 1600), establishing bidirectional data flows and control pathways throughout the robotic architecture. In some embodiments, the compute 1000 may only include or primarily include the local AI system 1470, wherein the AI system serves as the central computational hub for all robotic functions. In other words, the local AI system 1470 may not be considered a separate component or system, but instead an integral component of other systems contained within the compute 1000, providing unified intelligence across all subsystems. Thus, a primary technical issue solved by the local AI system 1470 is the challenge of real-time, context-aware decision-making in dynamic environments. Traditional robotic systems often rely on pre-programmed responses or remote processing, which can lead to delays or inappropriate actions in dynamic situations where environmental conditions change rapidly. The local AI system 1470 overcomes this limitation by enabling rapid, localized processing of sensory inputs and the immediate generation of appropriate responses through parallel processing pathways and optimized data structures that minimize latency between perception and action.

Another technical challenge addressed by the local AI system 1470 involves the integration and interpretation of multi-modal sensory data from heterogeneous sources. The humanoid robot 1 employs various sensors, including visual, auditory, tactile, and proprioceptive systems, each operating at different sampling rates and producing data in distinct formats. The AI system 1470 efficiently fuses these diverse data streams in real-time, creating a comprehensive and coherent representation of the state of the robot 1 and its environment through techniques such as temporal alignment, sensor fusion algorithms, and hierarchical data aggregation that reconcile different data modalities into a unified world model. This integrated perception allows for more nuanced and accurate interactions with the physical world and human collaborators, enabling the robot to understand complex scenarios that require simultaneous processing of multiple sensory inputs. The local AI system 1470 also addresses the technical challenge of adaptive learning and continuous improvement in unstructured environments. Unlike static systems, this local AI system 1470 can modify its behavior based on experience and feedback through iterative refinement processes that incorporate both supervised and unsupervised learning paradigms. The system employs advanced machine learning algorithms, potentially including deep reinforcement learning and online learning techniques, to continuously refine its decision-making processes while maintaining stability and safety constraints. This adaptability allows the robot 1 to improve its performance over time, learn new tasks with minimal explicit programming, and adjust to changes in its operational environment or physical capabilities, such as wear on actuators or modifications to its hardware configuration. A further technical challenge resolved by the local AI system 1470 involves the efficient management of the limited computational resources of the robot 1, particularly when operating in autonomous mode without cloud connectivity. The AI system 1470 implements sophisticated task prioritization and resource allocation algorithms, ensuring that time-sensitive processes receive adequate computational power while less urgent tasks are managed efficiently through dynamic scheduling and load balancing mechanisms that adapt to changing computational demands. This dynamic resource management enables the robot 1 to maintain optimal performance across a wide range of operational scenarios, from simple repetitive tasks to complex problem-solving situations that require extensive computational resources.

The AI data storage 1472 may further include one or more models 1476, behaviors 1480, rules and policies 1484, and other data 1494. The models 1476 may comprise one or more AI/ML-based models to perform the functions described herein, such as observing, reasoning, and learning behaviors based on the environment and surroundings and performing simple to complex tasks given the environment and surroundings, e.g., similar to the models 2902 of the remote AI system 2780. These models 1476 may include convolutional neural networks for visual processing, recurrent neural networks for temporal sequence analysis, transformer architectures for multi-modal understanding, and hybrid architectures that combine multiple model types for specialized tasks. The illustrative model selector 1500 selects an appropriate model or set of models 1476 given a specified task, scenario, or constraint, utilizing a meta-learning approach that considers historical performance data and current operational conditions. For example, the model selector 1500 may select a given model based on considerations such as the task complexity, a cost to perform the task including computational and energy costs, performance efficiency metrics including latency and throughput requirements, the environment and surroundings characteristics including lighting conditions and obstacle density, resource management requirements including available memory and processing power, or the current health status of the humanoid robot 1 or its components including battery level and actuator conditions. Over time, the model selector 1500 may be refined based on learning algorithms that identify efficient models 1476 for given tasks, scenarios, and constraints through performance tracking and optimization feedback loops that analyze success rates, resource utilization, and task completion times. In an embodiment, the model may be selected in response to operator input as an alternative to automated selection, providing human oversight when desired. This manual selection capability may be useful, e.g., during the initialization of the humanoid robot 1 or during specialized operational modes such as debugging, maintenance, or experimental task execution.

The illustrative rule and policy selector 1508 may select one or more of the rules and policies 1484 that are stored in the AI data storage 1472 to be enforced during the operation of the humanoid robot 1, e.g., based on operator input given a context, environment, compliance and regulatory jurisdiction, safety considerations, and operational parameters. These rules and policies 1484 may include safety constraints that prevent the robot from entering dangerous states, ethical guidelines that govern interactions with humans, operational boundaries that define acceptable ranges of motion and force application, and task-specific protocols that ensure consistency in execution. In an embodiment, the rule and policy selector 1508 may automatically learn efficient methods for adapting to selected rules and policies over time through reinforcement learning and pattern recognition algorithms that identify successful strategies for satisfying multiple, potentially conflicting constraints.

The language processing engine 1540 may be embodied as any combination of hardware, software, or circuitry for obtaining, parsing, interpreting, and understanding natural language directives and concepts, and also for generating natural language speech that enables bidirectional communication with human operators. For example, the language processing engine 1540 may translate speech-to-text and text-to-speech through acoustic modeling, language modeling, and pronunciation modeling components, utilizing deep learning architectures such as transformer-based models for contextual understanding and sequence-to-sequence models for translation tasks. The language processing engine 1540 may also incorporate semantic parsing capabilities to extract structured representations from unstructured text, enabling the robot to understand complex commands with multiple sub-goals and conditional logic. The image processing engine 1542 may be embodied as any combination of hardware, software, or circuitry for performing object detection, image classification, segmentation, object tracking, facial recognition, scene understanding, depth estimation, anomaly detection, or reinforcement learning on input visual data (e.g., as obtained by sensors such as cameras or in preloaded training data). The image processing engine 1542 may utilize convolutional neural networks, vision transformers, and hybrid architectures that combine local and global feature extraction for comprehensive visual understanding across multiple scales and resolutions.

The training sub-system 1520 may be embodied as any hardware, software, or circuitry configured to refine models 1476 and behaviors 1480 based on observed data and training data, enabling continuous improvement of the robot's capabilities through experience. The training sub-system 1520 may include a data augmentation engine 1522, a learning engine 1528, and a simulation engine 1534. The data augmentation engine 1522 may be embodied as any hardware, software, or circuitry configured to increase the size and diversity of training data through techniques such as rotation, scaling, cropping, and synthetic data generation, similar to the data augmentation engine 2782 of the remote AI system 2780. The data augmentation engine 1522 may also employ advanced techniques such as style transfer to create visually diverse training samples, adversarial examples to improve robustness, and procedural generation to create entirely synthetic training scenarios. The learning engine 1528 may be embodied as any hardware, software, or circuitry for training the AI models 1476, given a set of rules and policies 1484, behaviors 1480, and training data, similar to the training engine 2790 of the remote AI system 2780. The learning engine 1528 may implement various optimization algorithms including stochastic gradient descent, Adam, and second-order methods, along with regularization techniques such as dropout, batch normalization, and weight decay to prevent overfitting. The simulation engine 1534 may be embodied as any hardware, software, or circuitry for executing one or more of the AI models 1476 in a virtualized simulation environment to simulate and analyze aspects of the humanoid robot 1, such as kinematics, sensor behavior, robot 1 behavior, and anomalies, similar to the simulation engine 2800 of the remote AI system 2780. The simulation engine 1534 may incorporate physics engines for accurate dynamics simulation, sensor models for realistic perception simulation, and environmental models for testing the robot's performance under various conditions. Compared to the remote AI system 2780, the AI fine-tuning conducted by the local AI system 1470 may be localized to the specific humanoid robot 1, which can be advantageous in situations such as those where the humanoid robot 1 performs a specific task repeatedly or operates in a consistent environment, allowing for highly specialized optimization that would not generalize well to other robots in the fleet.

The other 1546 may include a communications module that is embodied as any combination of hardware, software, and/or circuitry to enable components of the local AI system 1470 to communicate with one another and with other components of the humanoid robot 1 (such as of the compute 1000). The communications module may implement various protocols including high-speed serial interfaces, shared memory architectures, and message-passing systems to ensure low-latency data transfer between components. It should be understood that the controllers may be omitted and/or consumed by one or more models (e.g., RL trained models) that are contained within the local AI system 1470, providing end-to-end learning capabilities that directly map from sensory inputs to motor commands.

5. Whole Body Controller

The whole body controller 1550 may be embodied as any combination of hardware, software, or circuitry for receiving information from the behavior manager 1350 or the local AI system 1470 and translating high-level commands into coordinated full-body motion. The whole body controller 1550 may thereafter send the information to other components of the compute 1000, ensuring synchronized control across all robot subsystems. For example, the whole body controller 1550 may transmit joint torque data, which represents data pertaining to rotational forces exerted at "joints" of the humanoid robot 1, to the controllers 1600, implementing torque limits and safety margins. The whole body controller 1550 may implement various control strategies including computed torque control, impedance control, and admittance control, selecting the appropriate strategy based on task requirements and environmental interactions, the whole body controller 1550 may be omitted and/or consumed by one or more models (e.g., RL trained models) that are contained within the local AI system 1470, providing end-to-end learned control.

The controllers 1600 may be embodied as any combination of hardware, software, and/or circuitry for transmitting joint torque data to the actuators 1.2.4, e.g., to extend and retract parts (such as arms, hands, fingers of the humanoid robot 1), with precise timing and coordination. The controllers 1600 may also infer joint torque and angle data received from other sensors 1.2.8, such as IMUs mounted on a given "body part," providing redundant sensing for increased reliability. In some embodiments, the joint torque and angle data may be measured using rotary position sensors, optical reflection, or other methods, with sensor fusion algorithms combining multiple measurements for improved accuracy. The whole body controller 1550 may also incorporate advanced control strategies, such as passivity-based control or adaptive control, to ensure stability and robustness in the presence of uncertainties or external disturbances, automatically adjusting control parameters based on detected environmental conditions, the controllers 1600 may be omitted and/or consumed by one or more models (e.g., RL trained models) that are contained within the local AI system 1470, enabling direct neural control of actuators.

6. Other

Other components 1650 of the compute 1000 may include components not discussed above relative to the compute 1000, such as power management modules (e.g., to manage battery pack health, manage power usage profiles, implement predictive power optimization, etc.) and calibration modules (e.g., to ensure that actual kinetic movements of the humanoid robot 1 align with the expected kinetic movements determined based on calculations), maintaining system accuracy over time. The humanoid robot 1 may include other components 1.2.18, which can encompass components that do not necessarily fall within the aforementioned mechanical and electrical architecture 1.2, or compute 1000. For example, the other components 1.2.18 may include safety systems and mechanisms, emergency override systems, or ports for connecting peripheral devices, thermal management systems for heat dissipation, and diagnostic interfaces for maintenance and troubleshooting.

d. Interaction Between Components of the Computing Architecture

Figure 9:
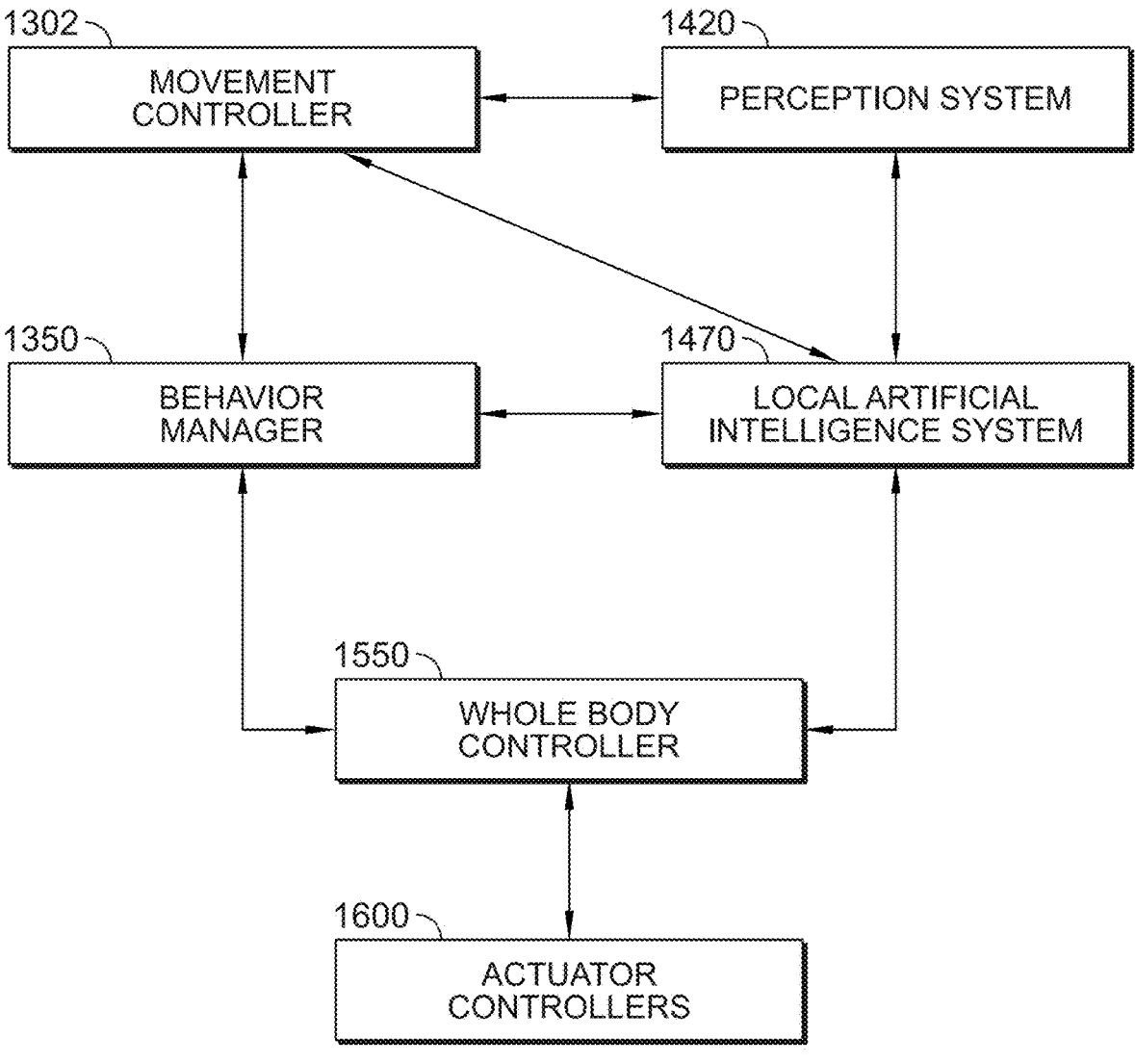
FIG. 9 is a diagram depicting an interaction of components contained within a computing architecture of the humanoid robot of FIGS. 1-3B.

FIG. 9 depicts interactions between components of the humanoid robot 1 during its operation, illustrating the complex information flow and control hierarchy. Upon startup of the humanoid robot 1, the humanoid robot 1 may be in a standby mode or may otherwise remain idle in an initial position (e.g., standing, sitting, lying down, etc.), with all systems performing self-diagnostics and initialization procedures. The robot 1 may initialize and activate its sensors 1.2.8 and obtain data in relation to the environment and surroundings of the robot 1, as well as positional data, audiovisual data, and the like, establishing baseline measurements and calibrating sensor offsets. The movement controller 1302 may obtain data from its environment using the perception system 1420, while understanding the location and position of the robot 1 within said environment through localization algorithms and map building.

The environmental data, along with the robot data, can be fed into: (i) the local AI system 1470 and (ii) the behavior manager 1350, creating parallel processing pathways for different aspects of robot control. The local AI system 1470 can then convert speech to text in order to obtain long-horizon goals, wherein said local AI system 1470 can subdivide these long-horizon goals into one or more sub-goals or tasks through hierarchical task decomposition. The local AI system 1470 can then check with the behavior manager 1350 to confirm that the robot 1 maintains the correct state for performing the first sub-goal or task, ensuring preconditions are met. Once the state of the robot 1 becomes confirmed or the state of the robot 1 changes to be in the right state, the local AI system 1470 can determine the movements and actions to perform for a given specified task, generating motion plans that satisfy kinematic and dynamic constraints.

Each of the interacting components may provide feedback information to each other as the movements or actions are being performed, creating a robust closed-loop control system. For example, the perception system 1420 may relay an indication to the movement controller 1302 that a given task has completed based on audiovisual data received during the performance of an action or movement, enabling task monitoring and verification. As another example, the behavior manager 1350 may be in continuous communication with the whole body controller 1550 to ensure that the movement and positioning of the robot 1 remain as instructed and/or planned by the local AI system 1470, providing real-time corrections for disturbances. As yet another example, the local AI system 1470 may continuously receive data from the perception system 1420, the movement controller 1302, the behavior manager 1350, and the whole body controller 1550 and use the data to refine and optimize the currently executing model given present configurations, conditions, and constraints, implementing online learning and adaptation, the movement controller 1302, behavior manager 1350, perception system 1420, whole body controller 1550, and/or controllers 1600 may be omitted or replaced in alternative embodiments, depending on the specific architectural choices and control paradigms employed.

E. Hierarchical Bipedal Action Model (BAM)

Disclosed herein is a hierarchical architecture for the Bipedal Action Model (BAM) for controlling a robotic system. The architecture is designed to overcome significant limitations inherent in conventional monolithic vision-language-action (VLA) model architectures by distributing the computational workload across a hierarchy of models with varying characteristics. In a monolithic approach, a single, large-scale VLA model is typically responsible for the entire end-to-end process, from initial sensory perception and natural language understanding to the final generation of low-level motor commands. While conceptually simple, this paradigm presents substantial practical challenges. Such monolithic models are computationally intensive, demanding significant processing power and memory resources that often exceed the capacity of the size, weight, and power-constrained computing hardware available on a mobile robotic platform like a humanoid robot. This constraint can lead to performance bottlenecks, thermal management issues, and reduced operational endurance, all of which are detrimental to the robot's utility in real-world environments. Furthermore, monolithic models may struggle with complex, long-horizon tasks, as generating a long sequence of precise motor commands from a single high-level instruction can be prone to error accumulation, where a small initial mistake in motion planning can cascade into a complete task failure. This unitary design also lacks the modularity for efficient skill reuse, adaptation, or the independent upgrading of system components, thereby limiting scalability and resilience.

An alternative approach of offloading the entire computational load to a remote cloud server may introduce unacceptable latency between perception and action, which can be detrimental for tasks that involve real-time interaction with a dynamic environment, such as maintaining balance, avoiding moving obstacles, or performing delicate manipulations. This latency, stemming from network round-trip times and potential congestion, can render the robot slow to react, unsafe in cluttered spaces, and ineffective at tasks that demand fluid, continuous motion. The proposed hierarchical approach directly addresses these deficiencies by enabling the efficient use of distributed computing resources and allowing for a synergistic combination of high-level, deliberative reasoning with low-level, real-time reactive control.

a. BAM Architecture and Models

Figure 10:
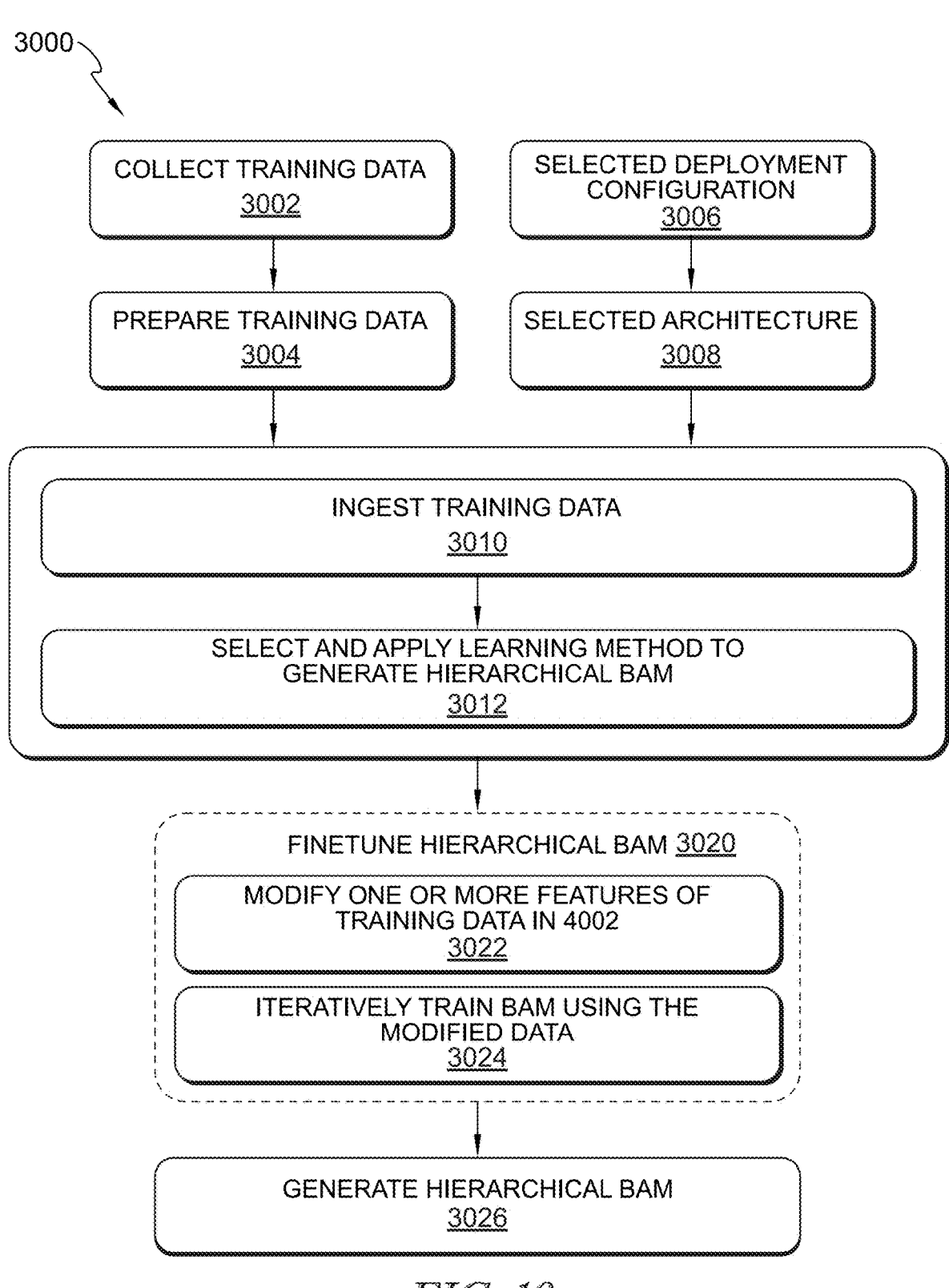
FIG. 10 is a flowchart showing the generation of a BAM.

FIG. 10 illustrates a general process for generating the BAM through iterative optimization and validation cycles that progressively refine model performance. The process may start with collecting training data 3002 and a data preparing step 3004, as illustrated in connection with FIG. 20. Along with the data collection and preprocessing, a selection or development of the deployment configuration and a selection of the architecture may be performed at steps 3006 and 3008, respectively, as illustrated in connection with FIGS. 11-19. Once the training data has been ingested in step 3010, a training methodology can be applied to generate the hierarchical BAM in step 3012, as illustrated in connection with FIG. 21. Following the initial training, the BAM may undergo an iterative process of finetuning 3020 to improve its performance, which involves cycles of evaluation, error analysis, and targeted retraining on new or augmented data to generate the final hierarchical BAM in step 3026.

i. Selection of the BAM's Hierarchical Architecture

The disclosed BAM has a scalable hierarchical architecture. As such, the disclosed hierarchical architecture may comprise a flexible number of n layers, where n ranges from 1 to any number of layers, to accommodate varying levels of task complexity and available computational resources. In an implementation where n=1, the architecture may function in a manner analogous to a conventional monolithic model. In another implementation where n=4, the architecture includes four uniquely configured layers. In further implementations, this Application also contemplates that additional upper layers, e.g., L5, L6, etc., may be incorporated on top of the L4 layer 3008.2.8 to handle higher levels of abstraction, such as fleet-level strategic planning, multi-robot coordination, or super long-term episodic memory that spans weeks or months of operation. Or, it is also contemplated that fewer layers, e.g., L1, or just L1 and L2, etc., may be used to simplify the number of layers and models.

Each of the four distinct layers labeled L1, L2, L3, and L4 may contain one or more models, wherein: (i) each model contained in the L1 layer 3008.2.2 is an Alpha model(s) 3008.2.20A-N, (ii) each model contained in the L2 layer 3008.2.4 is a Beta model(s) 3008.2.22A-N, (iii) each model contained in the L3 layer 3008.2.6 is a Gamma model(s) 3008.2.24A-N, and (iv) each model contained in the L4 layer 3008.2.8 is a Delta model(s) 3008.2.26A-N. Each layer (e.g., L1-L4) may include one or more models that have similar characteristics, wherein characteristics may include: (i) number of parameters, (ii) context windows, (iii) attention heads, (iv) neural network layers, (v) input and output vectors, and/or (vi) any other quality or aspect of a model. It should be understood that a substantial change in a single characteristic of a model and/or its output causes the formation of another layer. For example, the L1 layer 3008.2.2 and the L2 layer 3008.2.4 can be identified by the inclusion of an Alpha model(s) 3008.2.20A-N with 80 million parameters and a Beta model(s) 3008.2.22A-N with 1.3 billion parameters. Furthermore, it should be understood that small changes or deviations between models (e.g., less than 10%, preferably less than 3%) in characteristics such as parameter count or context length may not result in the formation of another layer, as they may represent minor specializations within the same level of abstraction.

The arrangement of these layers can be in a graduated structure that allows the architecture to efficiently allocate computational tasks based on their specific requirements. Here, Alpha or Beta model(s) 3008.2.20A-N, 3008.2.22A-N that may be contained in the lower layers of the hierarchy, such as the models contained in the L1 layer 3008.2.2 or L2 layer 3008.2.4, can include characteristics (e.g., in comparison to the other models contained in the BAM-namely the Delta or Gamma model(s)) such as fewer parameters, requiring less processing time, operating on a shorter context window, and running at a higher frequency. Placing these layers on robot 1 can be a direct consequence of their functional role, as they perform real-time processing for reactive skill execution and action generation, where delays of even a few hundred milliseconds could compromise physical stability or task success. These characteristics may enable the deployment of the Alpha or Beta model(s) 3008.2.20A-N, 3008.2.22A-N on the "tactical edge," which can correspond to the humanoid robot 1 itself, leveraging its onboard computational resources such as its local AI system 1470 and/or one or more onboard GPUs. Conversely, the Delta or Gamma model(s) in the upper layers, such as the L3 layer 3008.2.6 or L4 layer 3008.2.8, may include characteristics (e.g., in comparison to the other models contained in the BAM-namely the Alpha or Beta model(s) 3008.2.20A-N, 3008.2.22A-N) such as more parameters, longer processing times, a longer context window, and/or running at a lower frequency. The upper layers of the BAM, which perform more computationally intensive but less time-sensitive tasks like strategic planning or complex reasoning, may be deployed on powerful off-board resources that are part of the broader distributed environment. The hierarchical architecture 3008.2 may be implemented across a distributed computing environment, such as the exemplary network and/or operational environment of FIG. 1. The environment may include the humanoid robot 1, one or more other humanoid robots 2700A-X, machines 2710A-X, command centers 2750A-X, a remote AI system 2780, and data stores 2900, all potentially interconnected via one or more networks 2999A-X. By integrating the principles of hierarchical control with the physical infrastructure of the edge-cloud continuum, a comprehensive hierarchical architecture, as shown in FIG. 11, can be designed to decompose the complex problem of embodied intelligence into multiple distinct layers, each with a specific function, a corresponding model profile, a defined communication interface, and a designated location within the distributed computing network.

1. L1 Layer

As discussed above, the lowest layer of the BAM, L1, is the only layer that must be present in all configurations. Said L1 layer 3008.2.2 can function as the primary interface between the rest of the hierarchical BAM architecture and the robot's underlying whole-body controller 1550, actuator controllers 1600, motor controllers, or other low-level controllers. The primary function of this lowest layer is to translate: (i) the abstract or latent representations of actions generated by the upper layers into a concrete sequence of robot action sequences, and/or (ii) interpret pre-programmed or scripted actions provided by a user. As such, the L1 layer 3008.2.2 may output: (i) continuous or discrete robot action tokens, (ii) continuous or discrete action chunks, and/or (iii) continuous or discrete bits. Wherein said tokens, chunks, and/or bits are designed to represent actual values and/or Deltas of a joint. Said value or Delta may be: (i) position information (e.g., X, Y, Z), (ii) changes in positions (e.g., $\Delta X$, $\Delta Y$, $\Delta Z$), (iii) changes in location(s) (e.g., $\Delta X$, $\Delta Y$, $\Delta Z$), (iv) rotational position (e.g., A°, B°, C°), (v) rotational locations (e.g., A°, B°, C°), (vi) changes in rotational position (e.g., $\Delta A°$, $\Delta B°$, $\Delta C°$), (vii) changes in rotational location(s) (e.g., $\Delta A°$, $\Delta B°$, $\Delta C°$), (viii) joint-space waypoints, (ix) other motion primitives, (x) actuator torques, (xi) actuator motor currents, (xii) power levels for each robot region or actuator, and/or (xiii) any other value that the actuator controllers 1600, motor controllers, other controllers, and/or whole-body controller 1550 can directly interpret and execute. Further, the above values or Delta may be described within the robot task space for a specific robot, robot task space for a generic robot, a human task space, or any other space.

The above disclosed output of the L1 layer 3008.2.2 may be for and/or used by actuator controllers 1600, motor controllers, other controllers, and/or whole-body controller 1550 to control any number of actuators. Specifically, the number of actuators that can be controlled by the L1 layer 3008.2.2 may range between 1 and 300 actuators, preferably between 10 and 70 actuators, and most preferably between 15 and 50 actuators. In some embodiments, the L1 layer 3008.2.2 may output data in connection with fewer than 40 actuators, fewer than 30 actuators, but more than 10 actuators, and more than 15 actuators. And wherein said actuators may be located in any region (upper region or lower region) of the robot 1, including the torso, arms, end effectors, and the head-mainly the upper body. For instance, a single output from the L1 layer may specify coordinated torques for multiple joints in an arm to achieve a smooth reaching motion. As such, said L1 layer 3008.2.2 empowers the robot 1 to adapt instantly and gracefully to changing environmental conditions through predictive control mechanisms and adaptive response generation that account for sensor noise, modeling uncertainties, and external disturbances.

The L1 layer 3008.2.2 can be deployed on the "tactical edge," which can correspond to the humanoid robot 1 itself, leveraging its onboard computational resources, such as its local AI system 1470 and one or more onboard GPUs. This deployment may mean that the Alpha model(s) 3008.2.20A-N are optimized for and/or include inference pipelines and hardware acceleration, which may include specialized processors such as GPUs, TPUs, or custom ASICs designed for neural network inference.

The optimized Alpha model(s) 3008.2.20A-N in the L1 layer 3008.2.2 may consist of small (relative to the other models disclosed herein) neural networks, state machines, or other deterministic algorithms designed to perform this translation task with minimal computational overhead. Specifically, the Alpha model(s) 3008.2.20A-N of the L1 layer 3008.2.2 may be implemented as a cross-attention encoder-decoder transformer, decoder-only transformers, encoder-only transformers, multimodal transformers, vision transformers (VIT), efficient transformers, sparse attention transformers, linearized attention transformers, mixture-of-experts (MOE) transformers, state space models (SSMS), retrieval-augmented generation (rag) models, hybrid CNN-transformer models, diffusion transformers (DIT), perceiver models, adapter-based transformers, any other transformer based model, any other model disclosed herein, or any other model known in the art.

The disclosed Alpha model(s) 3008.2.20A-N of the L1 layer 3008.2.2 can be a fast, reactive model that translates the upper layer model(s) instructions/output into precise, continuous robot actions at a high frequency of between 1 Hz and 1 kHz, preferably between 50 Hz and 350 Hz, and most preferably between 100 Hz and 350 Hz. In a few embodiments, the Alpha model(s) 3008.2.20A-N may be running at 50 Hz or at 200 Hz. Additionally, the Alpha model(s) 3008.2.20A-N of the L1 layer 3008.2.2 may include between 10,000 and 5 billion parameters, preferably between 20 million and 500 million, and most preferably less than 100 million parameters. In some implementations, the Alpha model(s) 3008.2.20A-N may be a foundation model for robotics, visuomotor policy or a small foundation model, a transformer-based model, a VLA, or a diffusion transformer with parameter sizes of 860 M, 1.34B, or 2.3B, of which an action head/expert module with 300 M or more parameters. The parameters may have been generated using Low-Rank Adaptation (LoRA), Quantized LoRA (QLORA), or model distillation. Further, the Alpha model(s) 3008.2.20A-N of the L1 layer 3008.2.2 has a context window between 100 and 100,000 tokens, chunks, bits, or any other embedding/input type, preferably between 500 and 50,000 tokens, chunks, bits, or any other embedding/input type, and most preferably between 1,000 and 10,000 tokens, chunks, bits, or any other embedding/input type. The Alpha model(s) 3008.2.20A-N may have a context window of up to 2 million tokens. Finally, the Alpha model(s) 3008.2.20A-N may have any number of neural network layers, attention heads, receive any number of inputs, and may be pretrained using any known method (e.g., robot teleoperation data is used in connection with a regression-based loss function to generate a base model that outputs continuous tokens, chunks, bits, or any other embedding/input type).

2. L2 Layer

The L2 layer 3008.2.4 may be responsible for generating primitive, short-horizon tasks. It can act as an executive layer that is designed to provide information from either: (i) the world, or (ii) another layer (e.g., L3 layer 3008.2.6) to the L1 layer 3008.2.2. As such, the L2 layer 3008.2.4 may be the highest layer within the BAM or may be positioned between two layers (e.g., L1 and L3). For example, the L2 layer 3008.2.4 may be designed to translate the mid-level guidance from the L3 layer 3008.2.6 into a sequence of sub-task actions for the L1 layer 3008.2.2. For example, upon receiving guidance to "grasp a handle," the L2 layer 3008.2.4 may generate the appropriate sequence of skill execution steps, such as "reach for handle," "pre-shape gripper," and "close gripper." Thus, the L2 layer 3008.2.4 may output: (i) continuous or discrete robot action tokens, (ii) continuous or discrete action chunks, and/or (iii) continuous or discrete bits. Wherein said tokens, chunks, bits, and/or data may be in the form of or include latent vectors or other abstract commands, and/or any other form of information that the L1 layer 3008.2.2 can directly interpret and/or use. It should be understood that the L2 layer 3008.2.4 is not designed to directly output information to the whole body controller 1550, motor controllers, other controllers, and/or the actuator controllers 1600.

The L2 layer 3008.2.4 can be deployed on the humanoid robot 1 itself, leveraging its onboard computational resources, such as its local AI system 1470 and one or more onboard GPUs. This deployment may mean that the Beta model(s) 3008.2.22A-N are optimized for and/or include inference pipelines and hardware acceleration, which may include specialized processors such as GPUs, TPUs, or custom ASICs designed for neural network inference. Alternatively, the L2 layer 3008.2.4 can be deployed in the same local location as the robot 1. For example, the L2 layer 3008.2.4 may be deployed within the house, building, commercial complex, etc., and connected to the robot 1 via any network disclosed herein. Specifically, the L2 layer 3008.2.4 may be housed within a charger that is positioned within the house of the deployed robot 1, wherein the robot 1 is connected to the L2 layer 3008.2.4 contained in said charger via a Wi-Fi network (and a 5G network as a fallback). This local deployment offers a balance, reducing the computational load on the robot while keeping latency low. Finally, the L2 layer 3008.2.4 may be deployed in a location that is not local to the robot 1 (e.g., a cloud-based server) that is in communication with the robot 1, wherein said connection between the robot 1 and remote (i.e., non-local) location can be connected via any network disclosed herein. In summary, the L2 layer 3008.2.4 may be deployed on the robot 1, in an area that is local (e.g., same house or grounds), and/or in an area that is remote (e.g., substantially different houses or grounds-namely, a cloud-based server).

The Beta model(s) 3008.2.22A-N in the L2 layer 3008.2.4 may be implemented from an internet-pretrained VLM, MLLM, LLM, VLA, any other transformer based model, any other model disclosed herein, or any other model known in the art. Specifically, Beta model(s) 3008.2.22A-N may be based on any type of open-source, open-weight architectures, including LLaVA, Flamingo, BLIP-2, OFA, Gemini, and MiniGPT-4, with model selection based on task requirements and computational constraints.

The disclosed Beta model(s) 3008.2.22A-N of the L2 layer 3008.2.4 can output the above-disclosed information at a frequency of between 1 Hz and 100 Hz, preferably between 100 mHz and 50 Hz, and most preferably between 1 Hz and 50 Hz. The Beta model(s) 3008.2.22A-N may have between 10 million and 2 trillion parameters, preferably between 500 million and 500 billion parameters, most preferably between 1 million and 50 billion parameters, and utmost preferably between 1.25 billion and 3 billion parameters. To optimize these models for deployment on resource-constrained hardware, techniques such as model quantization, pruning, and parameter-efficient fine-tuning (PEFT), such as Low-Rank Adaptation (LoRA), Quantized LoRA (QLORA), or model distillation, may be employed. Furthermore, Beta model(s) 3008.2.22A-N may operate at a lower frequency in comparison to Alpha model(s) 3008.2.20A-N of the L1 layer 3008.2.2 because Beta model(s) 3008.2.22A-N of the L2 layer 3008.2.4 may be responsible for abstract reasoning, scene understanding, and task decomposition. Further, the Beta model(s) 3008.2.22A-N of the L2 layer 3008.2.4 has a context window between 1,000 and 5 million tokens, chunks, bits, or any other embedding/input type, preferably between 5,000 and 2 million tokens, chunks, bits, any other embedding/input type, and most preferably between 50,000 and 1 million tokens, chunks, bits, any other embedding/input type. Finally, the Beta model(s) 3008.2.22A-N may have any number of neural network layers, attention heads, receive any number of inputs, and may be pretrained using any known method (e.g., internet-based data is used in connection with a cross-entropy loss function to generate a base model that outputs discontinuous tokens, chunks, bits, or any other embedding/input type).

3. L3 Layer

Some implementations may include a third layer, the L3 layer 3008.2.6, a supplemental layer that is responsible for command and coordination. It can act as an executive layer that is designed to provide information from either: (i) the world, or (ii) another layer (e.g., L4 layer 3008.2.8) to the L2 layer 3008.2.4. As such, the L3 layer 3008.2.6 may be the highest layer within the BAM or may be positioned between two layers (e.g., L2 and L4). In one example, the L3 layer 3008.2.6 may function as a higher level responsible for semantic and strategic cognition, responsible for understanding complex, abstract, and often user intent. It can perform long-horizon planning, leverages common-sense and deep world knowledge to solve problems, and engages in reasoning processes like chain-of-thought to formulate robust strategies. It can also take a high-level strategic plan from the L4 layer 3008.2.8, such as "clean the kitchen," and decompose it into a sequence of concrete goals that can be executed by the L2 layer 3008.2.4, such as "clear the table," "load the dishwasher," and "wipe the counters." Thus, the L3 layer 3008.2.6 may output: (i) continuous or discrete robot action tokens, (ii) continuous or discrete action chunks, (iii) continuous or discrete bits, and/or (iv) continuous or discrete data. Wherein said tokens, chunks, bits, and/or data may be in the form of or include latent vectors or other abstract commands, and/or any other form of information that the L2 layer 3008.2.4 can directly interpret and/or use. It should be understood that the L3 layer 3008.2.6 is not designed to directly output information to the whole body controller 1550 and/or the actuator controllers 1600.

The L3 layer 3008.2.6 can be deployed on the humanoid robot 1 itself, leveraging its onboard computational resources, such as its local AI system 1470 and one or more onboard GPUs. This deployment may mean that the Gamma model(s) are optimized for and/or include inference pipelines and hardware acceleration, which may include specialized processors such as GPUs, TPUs, or custom ASICs designed for neural network inference. Alternatively, the L3 layer 3008.2.6 can be deployed in the same local location as the robot 1. For example, the L3 layer 3008.2.6 may be deployed within the house, building, commercial complex, etc., and connected to the robot 1 via any network disclosed herein. Specifically, the L3 layer 3008.2.6 may be housed within a charger that is positioned within the house of the deployed robot 1, wherein the robot 1 is connected to the L3 layer 3008.2.6 contained in said charger via a Wi-Fi network (and a 5G network as a fall back). Finally, the L3 layer 3008.2.6 may be deployed in a location that is not local to the robot 1 (e.g., a cloud-based server) that is in communication with the robot 1, wherein said connection between the robot 1 and remote (i.e., non-local) location can be connected via any network disclosed herein. In summary, the L3 layer 3008.2.6 may be deployed on the robot 1, in an area that is local (e.g., same house or grounds), and/or in an area that is remote (e.g., substantially different houses or grounds-namely, a cloud-based server).

The Gamma model(s) in the L3 layer 3008.2.6 may be implemented from an internet-pretrained VLM, MLLM, LLM, VLA, any other transformer based model, any other model disclosed herein, or any other model known in the art. Specifically, Gamma model(s) may be based on any type of open-source, open-weight architectures, including LLaVA, Flamingo, BLIP-2, OFA, Gemini, and GPT, with model selection based on task requirements and computational constraints.

The disclosed Gamma model(s) of the L3 layer 3008.2.6 can output the above-disclosed information at a frequency of between 1 µHz and 100 Hz, preferably between 100 mHz and 50 Hz, and most preferably between 10 Hz and 50 Hz. The Gamma model(s) may have between 10 million and 2 trillion parameters, preferably between 500 million and 500 billion parameters, most preferably between 1 million and 50 billion parameters, and utmost preferably between 1.25 billion and 3 billion parameters. To optimize these models for deployment on resource-constrained hardware, techniques such as model quantization, pruning, and parameter-efficient fine-tuning (PEFT), such as Low-Rank Adaptation (LoRA), Quantized LoRA (QLORA), or model distillation, may be employed. Furthermore, Gamma model(s) may operate at a lower frequency in comparison to Beta or Alpha model(s) 3008.2.20A-N, 3008.2.22A-N of the L2 layer 3008.2.4 and L1 layer 3008.2.2 because Gamma model(s) of the L3 layer 3008.2.6 may be responsible for abstract reasoning, scene understanding, and task decomposition. Further, the Gamma model(s) of the L3 layer 3008.2.6 has a context window between 1,000 and 5 million tokens, chunks, bits, or any other embedding/input type, preferably between 5,000 and 2 million tokens, chunks, bits, any other embedding/input type, and most preferably between 50,000 and 1 million tokens, chunks, bits, any other embedding/input type. Finally, the Gamma model(s) may have any number of neural network layers, attention heads, receive any number of inputs, and may be pretrained using any known method (e.g., internet-based data is used in connection with a cross-entropy loss function to generate a base model that outputs discontinuous tokens, chunks, bits, or any other embedding/input type).

4. L4 Layer

Some implementations may include a fourth layer, the L4 layer 3008.2.8, a supplemental layer that is responsible for strategic reasoning, understanding complex user intent, and performing long-horizon planning. It can act as an executive layer that is designed to provide information from the world and outside actors. As such, the L4 layer 3008.2.8 may be the highest layer within the BAM. In one example, the L4 layer 3008.2.8 may be responsible for semantic and strategic cognition, understanding extremely complex, abstract, and often ambiguous user intent. It can perform long-horizon planning, leverage common-sense and deep world knowledge to solve problems, and engage in reasoning processes like chain-of-thought to formulate robust strategies. For example, if given the instruction "get ready for my party," the L4 layer may reason about what a party entails (e.g., food, drinks, cleaning, ambiance) and generate a comprehensive plan. It can also generate a high-level strategic plan and decompose it into a sequence of concrete goals that can be executed by the L3 layer 3008.2.6. Thus, the L4 layer 3008.2.8 may output: (i) continuous or discrete robot action tokens, (ii) continuous or discrete action chunks, (iii) continuous or discrete bits, and/or (iv) continuous or discrete data. Wherein said tokens, chunks, bits, and/or data may be in the form of or include latent vectors or other abstract commands, and/or any other form of information that the L3 layer 3008.2.6 can directly interpret and/or use. It should be understood that the L4 layer 3008.2.8 is not designed to directly output information to the whole body controller 1550 and/or the actuator controllers 1600.

The L4 layer 3008.2.8 can be deployed in the same local location as the robot 1. For example, the L4 layer 3008.2.8 may be deployed within the house, building, commercial complex, etc., and connected to the robot 1 via any network disclosed herein. Specifically, the L4 layer 3008.2.8 may be housed within a charger that is positioned within the house of the deployed robot 1, wherein the robot 1 is connected to the L4 layer 3008.2.8 contained in said charger via a Wi-Fi network (and a 5G network as a fallback). Finally, the L4 layer 3008.2.8 may be deployed in a location that is not local to the robot 1 (e.g., cloud-based server) that is in communication with the robot 1, wherein said connection between the robot 1 and remote (i.e., non-local) location can be connected via any network disclosed herein. In summary, the L4 layer 3008.2.8 may be deployed in an area that is local (e.g., same house or grounds), and/or in an area that is remote (e.g., substantially different houses or grounds-namely, a cloud-based server). The L4 layer 3008.2.8 is typically not deployed on robot 1 due to its immense computational and memory requirements, but instead at a remote location(s) (e.g., cloud) where such resources are readily available.

The Delta model(s) in the L4 layer 3008.2.8 may be implemented from an internet-pretrained VLM, MLLM, LLM, VLA, any other transformer based model, any other model disclosed herein, or any other model known in the art. Specifically, Delta model(s) may be based on any type of open-source, open-weight architectures, including LLaVA, Flamingo, BLIP-2, OFA, Gemini, and GPT, with model selection based on task requirements and computational constraints.

The disclosed Delta model(s) of the L4 layer 3008.2.8 can output the above-disclosed information at a frequency of between 1 μHz and 100 Hz, preferably between 100 mHz and 50 Hz, and most preferably between 10 Hz and 50 Hz. The Delta model(s) may have between 10 million and 2 trillion parameters, preferably between 500 million and 500 billion parameters, most preferably between 1 million and 50 billion parameters, and utmost preferably between 1.25 billion and 3 billion parameters. To optimize these models for deployment on resource-constrained hardware, techniques such as model quantization, pruning, and parameter-efficient fine-tuning (PEFT), such as Low-Rank Adaptation (LoRA), Quantized LoRA (QLORA), or model distillation, may be employed. Furthermore, Delta model(s) may operate at a lower frequency in comparison to Gamma, Beta, or Alpha model(s) 3008.2.20A-N, 3008.2.22A-N, 3008.2.24A-N of the L3 layer 3008.2.6, L2 layer 3008.2.4, and L1 layer 3008.2.2 because Delta model(s) of the L4 layer 3008.2.8 may be responsible for abstract reasoning, scene understanding, and long-horizon planning. Further, the Delta model(s) of the L4 layer 3008.2.8 has a context window between 1,000 and 5 million tokens, chunks, bits, or any other embedding/input type, preferably between 5,000 and 2 million tokens, chunks, bits, any other embedding/input type, and most preferably between 50,000 and 1 million tokens, chunks, bits, any other embedding/input type. Finally, the Delta model(s) may have any number of neural network layers, attention heads, receive any number of inputs, and may be pretrained using any known method (e.g., internet-based data is used in connection with a cross-entropy loss function to generate a base model that outputs discontinuous tokens, chunks, bits, or any other embedding/input type).

5. Additional Layers

An even higher layer beyond L4 may be contemplated, functioning as a fleet-level meta-controller and learning system. This layer may be composed of models, for example, with parameter counts ranging from over 500 billion to 5 trillion or more, and a context window that may be considered practically unlimited for operational purposes. Such models may be deployed in superscalar data centers, corresponding to the most powerful configurations of the remote AI system 2780 and its associated data stores 2900 with massive computational power of large-scale GPU clusters for model training and inference. The function of this layer transcends the immediate control of a single robot, instead focusing on super long-horizon tasks that unfold over timescales of days, weeks, months, or even years. Its responsibilities may include managing the entire fleet of other humanoid robots 2700A-X, optimizing system-wide power distribution, coordinating large-scale data acquisition campaigns for continuous learning, and orchestrating the training and fine-tuning of new models. For instance, it could analyze data from all robots to identify a common failure mode in a specific task and then initiate a data collection and retraining campaign to address the issue across the entire fleet. This layer may act as the engine for continuous improvement, analyzing aggregated data from the entire fleet to generate and push updated models and software revisions to lower-layer AI systems, data stores, robots, machines, and command centers, thereby facilitating the long-term evolution and adaptation of the entire robotic ecosystem.

ii. Parallel Models in a Layer

Figure 12:
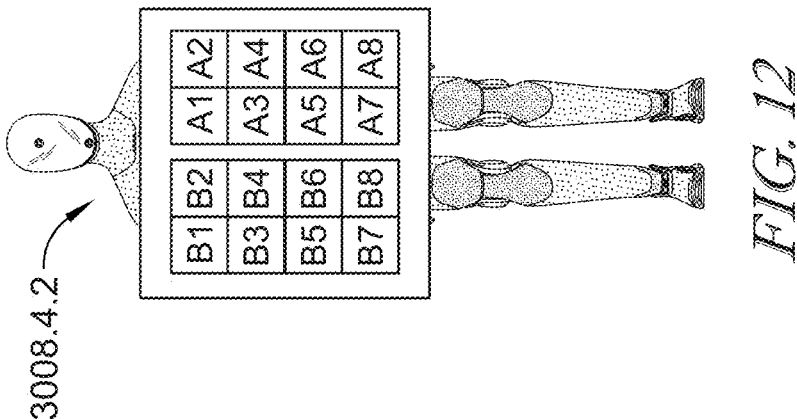
FIG. 12 illustrates that each level within the hierarchical architecture may include a plurality of models.

In the hierarchical architecture 3008.2 shown in FIG. 11, any layer from L1 to the n$^{th}$ layer (Ln) may comprise one or more models in parallel to process information and contribute to the decision-making process. For example and as shown in FIGS. 12, the L1 layer 3008.2.2 may include a plurality of Alpha models 3008.2.20A-N and the L2 layer 3008.2.4 may include a plurality of Beta models 3008.2.22A-N, and so on. This parallel structure allows for the use of specialized models that can handle different aspects of a task concurrently, enhancing the overall capability and robustness of the system. For example, one model may be used for locomotion, and another model for manipulation. This separation allows each model to be highly optimized for its specific domain without the compromise of a single generalist model. Alternatively, different models may be used for different types of locomotion (one for stairs, another for general locomotion, a further for running), while different models may be used for different types of manipulation (e.g., rough—for example, within 20 cm of accuracy, fine—for example, within 5 cm of accuracy, and ultra fine—for example, within 0.01 cm of accuracy).

Figure 13:
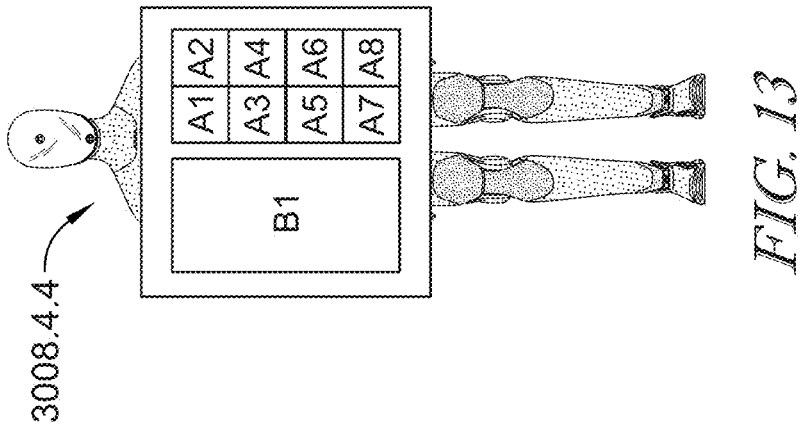
FIG. 13 illustrates that one level within the hierarchical architecture may include a plurality of models, while another level within the hierarchical architecture may include a single model.

In another example 3008.4.4 and as shown in FIG. 13, the L1 layer 3008.2.2 may include a plurality of Alpha models 3008.2.20A-N and the L2 layer 3008.2.4 may include a single Beta model 3008.2.22A. The use of a single Beta model 3008.2.22A may be desirable because all tasks may be deposed in a similar manner regardless of whether they are related to locomotion or manipulation. However, it may be desirable to use multiple Alpha models 3008.2.20A-N because the locomotion, manipulation, or other tasks may require specialized models that cannot be combined into a single model due to their accuracy, speed, or other known reasons. In this embodiment, the Beta model(s) 3008.2.22A-N may be configured with a context window ranging from approximately four thousand to one million tokens, a parameter count ranging from approximately five billion to two trillion parameters, and a processing speed ranging from approximately one microhertz to ten hertz. Each of the plurality of Alpha model(s) 3008.2.20A-N may be configured with a context window ranging from approximately one hundred to five thousand tokens, a parameter count ranging from approximately ten thousand to five billion parameters, and a processing speed ranging from approximately one hertz to ten kilohertz. In this configuration, the Beta model(s) 3008.2.22A-N determines general positions and rotations based on long-horizon goals, while each of the plurality of Alpha model(s) 3008.2.20A-N is assigned to a specific actuator group or individual actuator, generating specific control signals including currents, torques, positions, and rotations for their respective actuators. Enhanced versions of this architecture may implement dynamic model spawning wherein the number of Alpha model(s) 3008.2.20A-N varies based on task complexity and available computational resources. The system may further incorporate model pooling strategies where Alpha model(s) 3008.2.20A-N are dynamically allocated from a shared pool to different actuator groups based on current operational requirements, enabling more efficient resource utilization.

iii. First Exemplary Architecture

Figure 14:
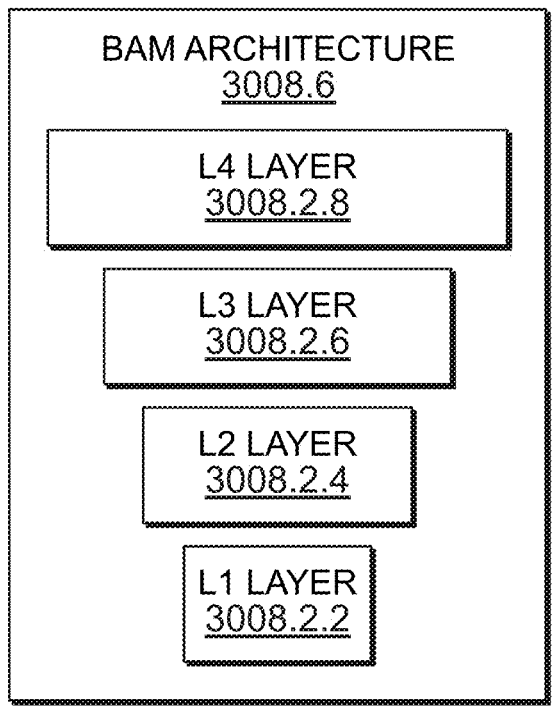
FIG. 14 is a block diagram of a first example hierarchical architecture of a BAM.

Referring now to FIGS. 14, a specific instance of a layered hierarchical BAM architecture 3008.6 is presented as a non-limiting example that demonstrates the practical implementation of multi-tiered cognitive processing. This architecture can be understood as a concrete implementation of the general layered concept depicted in architecture 3008.2, wherein n=4 for the architecture in FIG. 11, creating a four-layer hierarchy. The BAM architecture 3008.6 comprises four distinct functional layers: an L4 layer with a Delta model(s) 3008.2.26, an L3 layer with a Gamma model(s) 3008.2.24, an L2 layer with a Beta model(s) 3008.2.22A-N, and an L1 layer with Alpha model(s) 3008.2.20A-N. Each layer, from top to bottom, may operate at a progressively faster timescale and a lower level of abstraction, and each can be tightly coupled with a specific tier of a cognitively inspired memory system, creating a "planning cascade" that is continuously informed by past experience and current context through temporal integration and memory consolidation mechanisms that mirror biological cognitive architectures.

To illustrate this intricate interplay, consider a home setting wherein the robot 1 receives a task: "I'm having guests over tonight, can you help me get ready?" The Delta model(s) 3008.2.26, functioning as the highest planner with a very large parameter count (e.g., greater than 200 billion parameters) and a low running frequency (e.g., less than 1 Hz), may initiate the process by accessing a long-term memory (LTM) that stores comprehensive knowledge accumulated over extended periods. The length of the model's context window may be mapped to the temporal scale of this memory; for the Delta model(s) 3008.2.26, a very large context length (e.g., 1-1000 million tokens), allows it to reason over a vast amount of information corresponding to the LTM. The LTM represents a vast, persistent repository of the accumulated world knowledge of robot 1, which may be logically divided into three components, each serving distinct cognitive functions. First, the model can query a consolidated episodic memory, a "life log" implemented as a large-scale multimodal vector database, to retrieve past experiences related to "having guests." This retrieval process may employ similarity metrics in high-dimensional embedding spaces to identify relevant memories. This might surface a memory from a week prior: an image of the user enjoying a specific type of cheese with a text annotation noting their positive comment, demonstrating the system's ability to learn user preferences from past interactions.

Second, the model can consult a semantic memory, or "world model," which may be implemented as a knowledge graph (KG) of general facts (e.g., "cheese platters are appetizers," "guests appreciate a tidy space"), providing ontological relationships and common-sense reasoning capabilities. Third, the model may access a procedural memory, such as a "skill library" of high-level action sequences (e.g., the steps for "tidying a room"), which encodes learned motor programs and action primitives. By synthesizing information from these three LTM components, e.g., through a retrieval-augmented process that combines vector similarity search with graph traversal algorithms, the Delta model(s) 3008.2.26 may formulate a highly personalized, context-aware, and actionable strategic plan: (1) "Tidy the living room," (2) "Prepare a cheddar cheese platter," (3) "Dim the lights." Periodically, a memory consolidation process may analyze new experiences and transfer them from lower-layer contexts into this permanent LTM, enabling lifelong learning for the humanoid robot 1 through experience replay and memory prioritization mechanisms.

The Gamma model(s) 3008.2.24 may then receive a strategic objective, such as "Prepare a cheddar cheese platter," from the Delta model(s) 3008.2.26. This tactical planner, which may be a medium-sized model with 1 to 500 billion parameters operating at a medium frequency of 1 to 10 Hz, has a primary function that may involve maintaining task coherence over a medium timescale (minutes to hours), a role dependent on medium-term memory (MTM). The context length of the Gamma model(s) 3008.2.24 may be between 500K-20 M tokens, sufficient to hold the history of a multi-step task, mapping to the temporal scale of MTM. The MTM can be implemented as a session-specific "episodic buffer," e.g., a temporary vector database for retrieval-augmented generation (RAG) that maintains contextual information. As the robot 1 begins the task by retrieving the cheddar, this event can be stored in the MTM context window, e.g., with associated metadata including timestamps, object states, and success indicators. When the time arrives for the next step, the model may query this buffer to recall that "cheddar has been retrieved," ensuring that the model proceeds logically to the next step, such as to "retrieve crackers," thereby maintaining task continuity. This mechanism can help prevent the "lost in the middle" problem that can affect models relying solely on a finite context window for long, multi-step tasks, particularly when interruptions or unexpected events occur.

The Beta model(s) 3008.2.22A-N, the short-horizon visuomotor planner, may receive a single, concrete instruction like "Retrieve crackers from the pantry." This model, which may be a smaller model with 100 million-10 billion parameters operating at a high frequency of 10 to 100 Hz, may rely on short-term memory (STM), also known as working memory. The short context window of the Beta model(s) 3008.2.22A-N can be analogous to the capacity of STM, holding a finite history of the most recent sensor data, for example, the most recent (e.g. 2-84) camera frames and corresponding joint encoder readings. STM can be implemented as a volatile, low-capacity, high-speed buffer that holds a finite history of the most recent sensor data, providing temporal context for motion generation. This brief but dense history, held within the model's context, allows the Beta model(s) 3008.2.22A-N to perceive the immediate dynamics of the environment, such as the speed and direction of its own hand moving toward the cracker box, enabling predictive control. By processing this sequence of observations, the model can generate a smooth, predictive trajectory of end-effector poses that anticipates the immediate future, rather than just reacting to the present, incorporating forward models of object dynamics and robot kinematics. This enables fluid and precise short-horizon behaviors like aligning the gripper with the box's orientation, adjusting approach velocity based on distance, and pre-shaping the hand for optimal grasping configuration.

Finally, the Alpha model(s) 3008.2.20A-N, comprising the lowest and fastest reactive layer running at a very high frequency, e.g., 150-400 Hz, execute the trajectory from the Beta model(s) 3008.2.22A-N with millisecond-level precision. The Alpha model(s) 3008.2.20A-N represent the ultimate consumers of STM, operating in a tight, high-frequency control loop by constantly referencing the most immediate proprioceptive and visual feedback stored in the STM, implementing feedback control algorithms that maintain stability and accuracy. Its operational context can be instantaneous, allowing the robot 1 to exhibit micro-level reactivity. For instance, if a tactile sensor in the fingertip registers unexpected contact with the edge of the shelf while reaching for the crackers, the Alpha model(s) 3008.2.20A-N can instantaneously adjust the arm's torque profile to avoid a collision, a reflexive action that occurs too fast for the higher-level planners but is fundamental for safe and robust physical interaction, demonstrating the value of hierarchical control with appropriate time-scale separation.

Figure 15:
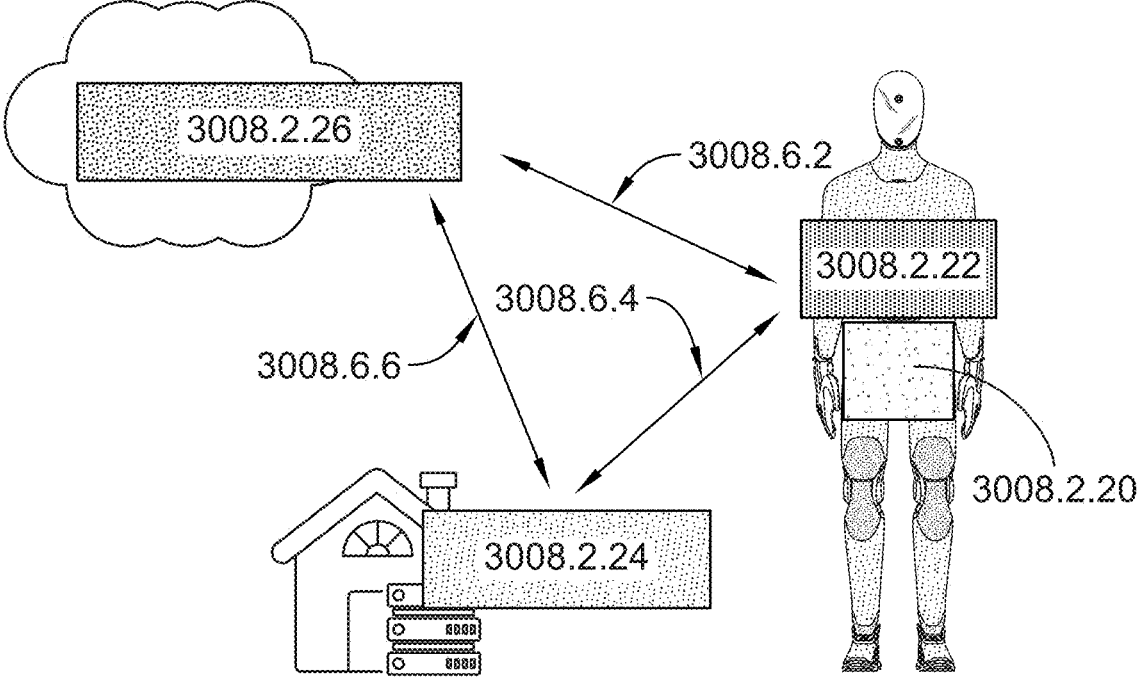
FIG. 15 is a diagram depicting an example deployment configuration of the first example hierarchical architecture of FIG. 14.

As shown in FIG. 15, the practical deployment and dynamic interactions of the BAM architecture 3008.6 are further illustrated by how distributed computing resources can be leveraged effectively. This hybrid cloud-edge strategy strategically distributes the cognitive and memory loads to optimize the system's overall performance, balancing factors such as latency, computational power, bandwidth utilization, and data privacy. The interaction begins when the robot, operating in the kitchen, receives the ambiguous voice command "I'm having guests over tonight, can you help me get ready?" Its onboard Beta model(s) 3008.2.22A-N may recognize the speech and determine that the command entails long-horizon planning beyond its own capabilities. The model can initiate a first instance of interaction 3008.6.2, a request to the Delta model(s) 3008.2.26. This request may contain the transcribed text along with a compressed video stream of the robot's current first-person view, utilizing efficient video codecs to minimize bandwidth. The cloud-hosted Delta model(s) 3008.2.26 may leverage its co-located LTM, and after its retrieval-augmented reasoning that may involve multiple database queries and inference steps, formulates a suggested strategy. Before proceeding, to ensure user alignment and safety, the model may initiate a second instance of interaction 3008.6.2, this time sending a confirmation query back to the robot 1. The robot's onboard system receives this, synthesizes the text to speech using neural text-to-speech models and awaits the user's verbal response. Upon hearing "Yes, that sounds great," the robot 1 may transmit this confirmation back to the Delta model(s) 3008.2.26 via a third instance of interaction 3008.6.2, completing the confirmation loop. Only upon receiving this explicit user approval does the Delta model(s) 3008.2.26 finalize its plan and initiate interaction 3008.6.6. A high-level directive may be sent to the Gamma model(s) 3008.2.24 on the home server or robot charger, including the now-confirmed task along with relevant context and constraints.

The Gamma model(s) 3008.2.24A-N on the home server may receive this strategic command through a secure, low-latency connection. The model queries its local, privacy-preserving knowledge graph of the home to find the locations of the items, utilizing spatial indexing and semantic search capabilities. The model(s) 3008.2.24A-N may then begin to populate its medium-term memory buffer with the overall task goal, creating a persistent task context that survives across multiple action cycles. The model can formulate the first concrete, actionable step and initiate interaction 3008.6.4, sending a command to the robot's Beta model(s) 3008.2.22A-N through an optimized protocol that may include compression and error correction. The robot's onboard Beta model(s) 3008.2.22A-N and Alpha model(s) 3008.2.20A-N can then take over, using their shared short-term memory to execute this specific, grounded instruction with real-time sensor feedback and adaptive control. Once the cheese is successfully retrieved, the Beta model 3008.2.22A-N can send a confirmation message back to the home server via Interaction 3008.6.4, including status information and any relevant observations. The Gamma model(s) 3008.2.24 may update its MTM to reflect that this step has finished and proceed to formulate and send the next command (e.g., to retrieve the crackers), continuing this loop until the entire "cheese platter" task becomes complete, demonstrating effective task decomposition and execution monitoring. This distributed, message-passing protocol allows each layer of the hierarchy to operate at its optimal timescale, leveraging the appropriate memory system to achieve a task that would be intractable for any single monolithic model, while maintaining coherent behavior through structured communication.

Note that this described configuration represents a non-limiting exemplary embodiment that can be adapted to various deployment scenarios. The principles of the invention allow for numerous alternative deployment strategies tailored to specific operational requirements, hardware capabilities, and privacy considerations, enabling flexible system configuration. For instance, in a cloud-centric implementation optimized for simplicity of end-user hardware, the Gamma model(s) 3008.2.24 and its associated medium-term memory could be co-located with the Delta model(s) 3008.2.26 in the cloud, effectively eliminating the need for a dedicated home server and reducing local infrastructure. In this case, interaction 3008.6.6 becomes an internal, ultra-low-latency function call within the cloud data center, while interaction 3008.6.4 becomes a direct, higher-frequency communication from the cloud to the robot 1, sending tactical commands across the internet with appropriate quality-of-service guarantees. Conversely, a privacy-focused implementation might see the Delta model(s) 3008.2.26 and its long-term memory reside on a powerful home server alongside the Gamma model(s) 3008.2.24, ensuring data sovereignty and compliance with privacy regulations. This configuration would maximize data security, as the vast majority of personal and environmental data would never leave the user's local network, with the cloud only being used for non-real-time, anonymized model training that preserves user privacy through differential privacy techniques.

Another alternative, driven by advances in edge computing, involves an enhanced autonomy model, wherein an exceptionally powerful onboard system-on-a-chip (SoC) allows the Gamma model(s) 3008.2.24 and MTM to be hosted directly on the robot 1, leveraging hardware acceleration and optimized memory management. This would grant the robot the ability to complete complex, multi-step tasks entirely offline, relying on the cloud only for the most abstract strategic planning or periodic model updates. Furthermore, the nature of the models themselves remains mutable; the Alpha model(s) 3008.2.20A-N, instead of being a learned neural network, could be implemented as a classical, model-based controller such as a model predictive controller (MPC), which would receive goals from the Beta model(s) 3008.2.22A-N and calculate optimal torques based on a physical model of the robot's dynamics, providing guaranteed stability properties and interpretable control behavior. The advantage of the model hierarchy lies not in any single fixed arrangement, but in the synergistic co-design of a hierarchical cognitive AI architecture with a corresponding multi-tiered memory system, and the strategic, flexible distribution of these integrated layers across a hybrid computational infrastructure to optimize for competing demands of performance, privacy, and lifelong learning, enabling systems that can adapt to diverse operational requirements while maintaining consistent high-level behavior.

iv. Second Exemplary Architecture

Figure 16A:
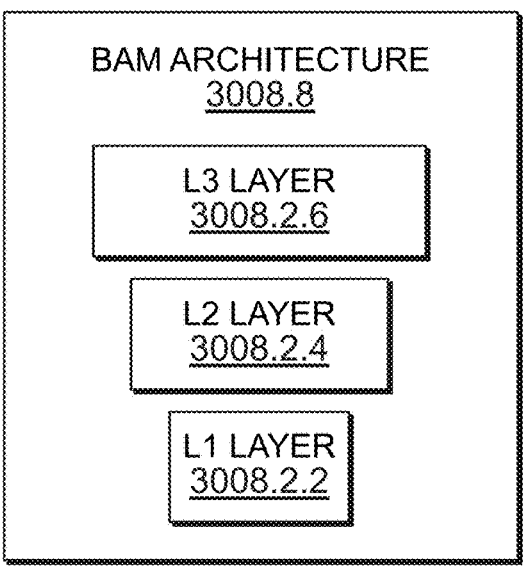
FIG. 16A is a block diagram of a second example hierarchical architecture of a BAM.

Referring now to FIG. 16A, an alternative instance of a hierarchical model architecture 3008.8 illustrates the flexibility of the disclosed framework through a streamlined three-layer configuration. This architecture features a more streamlined three-layer hierarchy, comprising a Gamma model(s) 3008.2.24, a Beta model(s) 3008.2.22A-N, and one or more Alpha model(s) 3008.2.20A-N. This architecture can be understood as another implementation of the general hierarchical BAM architecture 3008.2, wherein n=3 in FIG. 11. This configuration differs from the BAM architecture 3008.6 by creating a more direct link between the tactical planner and the action generation layer, reducing the number of abstraction levels and potentially decreasing overall system latency. This design may be well-suited for tasks that entail less fine-grained visuomotor planning and can be decomposed into a sequence of more direct motor skills, such as repetitive assembly tasks or structured interactions with known objects.

To illustrate this architecture, consider a scenario where a user requests, "Can you guide me through a 15-minute yoga routine?" The Gamma model(s) 3008.2.24, acting as the strategic planner with a large model size, e.g., greater than 20 billion parameters, and a low running frequency, e.g., 1-10 Hz, may be triggered to process this high-level request. The model's large context length, e.g., greater than one million tokens, may be able to map to its use of a cloud-based long-term memory to formulate a personalized plan. From its episodic memory, the model might retrieve records of the user's previous workout sessions, noting a preference for vinyasa-style flows and identifying any physical limitations or areas of focus. From its semantic memory, the model can access a knowledge graph detailing the anatomical benefits and correct forms of various yoga poses, including contraindications and modifications for different skill levels. From its procedural memory, the model may retrieve entire sequences or "sub-routines" for common flows like Sun Salutations, including timing, breathing patterns, and transition movements. The Gamma model(s) 3008.2.24 may synthesize this information to create a high-level plan, such as: "Start with a 5-minute warm-up including Cat-Cow poses, followed by three rounds of Sun Salutation A, and conclude with a 2-minute Savasana," incorporating appropriate difficulty progression and rest periods.

This high-level plan can then be passed to the Beta model(s) 3008.2.22A-N, which manages the real-time execution of the routine. This model, which may have 1 to 20 billion parameters and run at 10-100 Hz, can function as the real-time session manager or "yoga instructor," maintaining awareness of elapsed time, pose transitions, and user fatigue levels. Its primary responsibility may include maintaining the coherence and timing of the routine, a task managed by its medium-term memory, which is supported by its medium context length (e.g., 512K tokens). The medium-term memory can act as an episodic buffer for the current session, tracking which poses have been completed, the duration of holds, and the number of repetitions performed, ensuring smooth progression through the routine. Upon receiving the plan, the model can initiate the first step, sending a command to the low-level execution layer.

The Alpha model(s) 3008.2.20A-N may then receive a discrete command from the L2 model 3008.2.22, such as "demonstrate Downward-Facing Dog." The Alpha model(s) 3008.2.20A-N, which are small models (e.g., less than 100 million parameters) with a high running frequency (e.g., 150-350 Hz), function as highly optimized visuomotor policies, directly translating this command into a series of joint position and/or torque commands to move the robot's body into the correct pose through inverse kinematic calculations. The actions of the Alpha model(s) 3008.2.20A-N are informed by their short-term memory, enabled by a short context window (e.g., less than 100K tokens) holding a continuous buffer of recent proprioceptive data that allows the models to execute the motion smoothly and maintain balance through dynamic stability control. The Alpha model(s) 3008.2.20A-N may hold the pose for the duration specified by the Beta model(s) 3008.2.22A-N, potentially making micro-adjustments based on balance feedback, then await the next command, such as "transition to Plank pose." This direct coupling allows for a highly responsive and fluid execution of pre-defined motor skills, with minimal computational overhead between planning and execution layers.

Figure 16B:
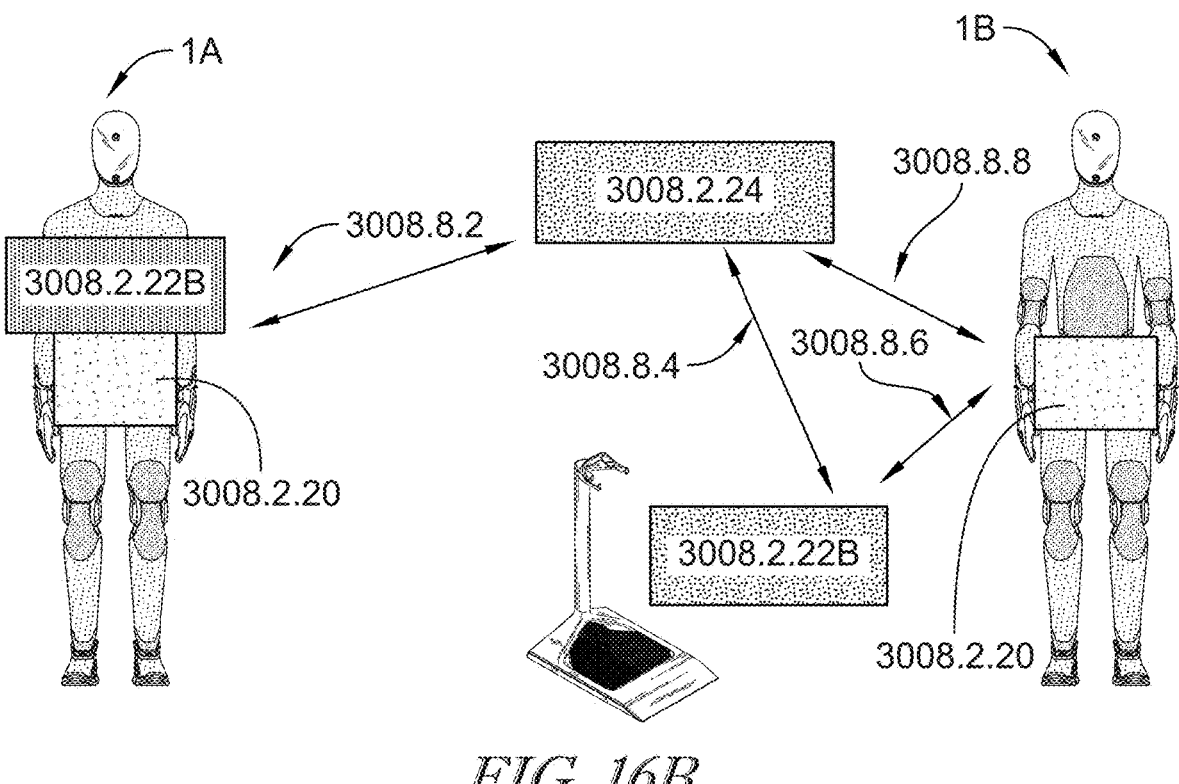
FIG. 16B is a diagram depicting example deployment configurations of the second example hierarchical architecture of FIG. 16A.

Two distinct yet viable deployment configurations for the BAM architecture 3008.8 are illustrated in FIG. 16B, highlighting the adaptability of the framework to different hardware and connectivity constraints while maintaining functional equivalence. The first deployment option, represented by the robot 1A on the left, exemplifies an enhanced autonomy model that maximizes onboard processing capabilities. In this configuration, the Beta model(s) 3008.2.22A may be co-located with the Alpha model(s) 3008.2.20A on a powerful onboard computer, potentially utilizing specialized neural processing units for efficient inference. The initial interaction 3041A occurs when the robot sends the user's request for a yoga routine to the cloud-hosted large Gamma model(s) 3008.2.24, using compressed communication protocols to minimize bandwidth. The Gamma model(s) 3008.2.24 may perform its planning and, in a subsequent instance of interaction 3041A, sends the entire 15-minute yoga plan back down to the robot, including all poses, timings, and transition instructions. From that point forward, the robot can execute the full routine autonomously without network dependency. The onboard Beta model(s) 3008.2.22A may sequence through the poses using its local medium-term memory, and the Alpha model(s) 3008.2.20A perform the movements, with no further need for communication with the cloud unless the user interrupts with a new, complex request that requires replanning, demonstrating robust offline operation capability. This configuration may be suitable for scenarios where network connectivity may be unstable or where extended periods of offline operation are desirable, such as in remote locations or during network outages.

The second deployment option, represented by the robot 1B on the right, illustrates a distributed intelligence model that leverages local network infrastructure. Here, the Beta model(s) 3008.2.22B reside on a local home server or robot charger, while only the small Alpha model(s) 3008.2.20B run on the robot 1 itself, which may have less powerful onboard computing hardware, reducing robot cost and power consumption. The process begins with interaction 3041B, where the robot relays the user's request to the Gamma model(s) 3008.2.24 through an optimized routing protocol. The Gamma model(s) 3008.2.24, after formulating the workout plan using its comprehensive knowledge base, may send the plan to the home server via interaction 3043, utilizing the local network's higher bandwidth. The home server's Beta model(s) 3008.2.22B may then manage the session, sending one command at a time to the robot via interaction 3045, maintaining fine-grained control over execution. For example, the model would first send the "demonstrate Cat-Cow" command with specific parameters for speed and range of motion. The robot's Alpha model(s) 3008.2.20B would execute the pose, and upon completion, send a status update back to the home server via another instance of interaction 3045, including performance metrics and any detected anomalies. The home server would then update its medium-term memory and send the next command in the sequence, ensuring smooth progression through the sequence. This approach reduces the computational burden on the robot but increases reliance on the local network, making it suitable for home environments with reliable Wi-Fi infrastructure. Both configurations effectively implement the same hierarchical cognitive architecture, demonstrating the capacity of the BAM architecture to adapt to varying hardware ecosystems while maintaining its core functional principles of hierarchical planning and execution.

The two deployment options presented for the BAM architecture merely illustrate a broader spectrum of possible configurations that can be tailored to specific use cases and constraints. A privacy-centric model, for instance, could deploy the large L3 model 3008.2.24 and its long-term memory on the home server, co-locating it with the Beta model(s) 3008.2.22B, ensuring all personal data remains within the user's control. In this arrangement, all strategic and tactical planning, along with access to the robot's life-log, occurs entirely within the user's local network, significantly enhancing data security and compliance with privacy regulations such as GDPR. A thin-client robot model could be realized by hosting the Alpha model(s) 3008.2.20B on the home server alongside the Beta model(s) 3008.2.22B, effectively turning the robot into a sensor-actuator shell that streams proprioceptive data and receives high-frequency motor commands over the local network, requiring minimal onboard processing but demanding exceptional network performance. This may simplify the robot's hardware but demands an exceptionally robust and low-latency Wi-Fi connection, potentially utilizing dedicated wireless channels or 5G technology. Such variations underscore that the fundamental hierarchical structure of the models and their corresponding memory systems provides a highly flexible framework, allowing for deployments that can be precisely tailored to the specific constraints and priorities of a given application, whether they be maximizing onboard autonomy, ensuring data privacy, or minimizing the hardware cost of the robot itself, while maintaining consistent behavioral capabilities across different configurations.

v. Third Exemplary Architecture

Figures 17A, 17B, 17C, 17D:
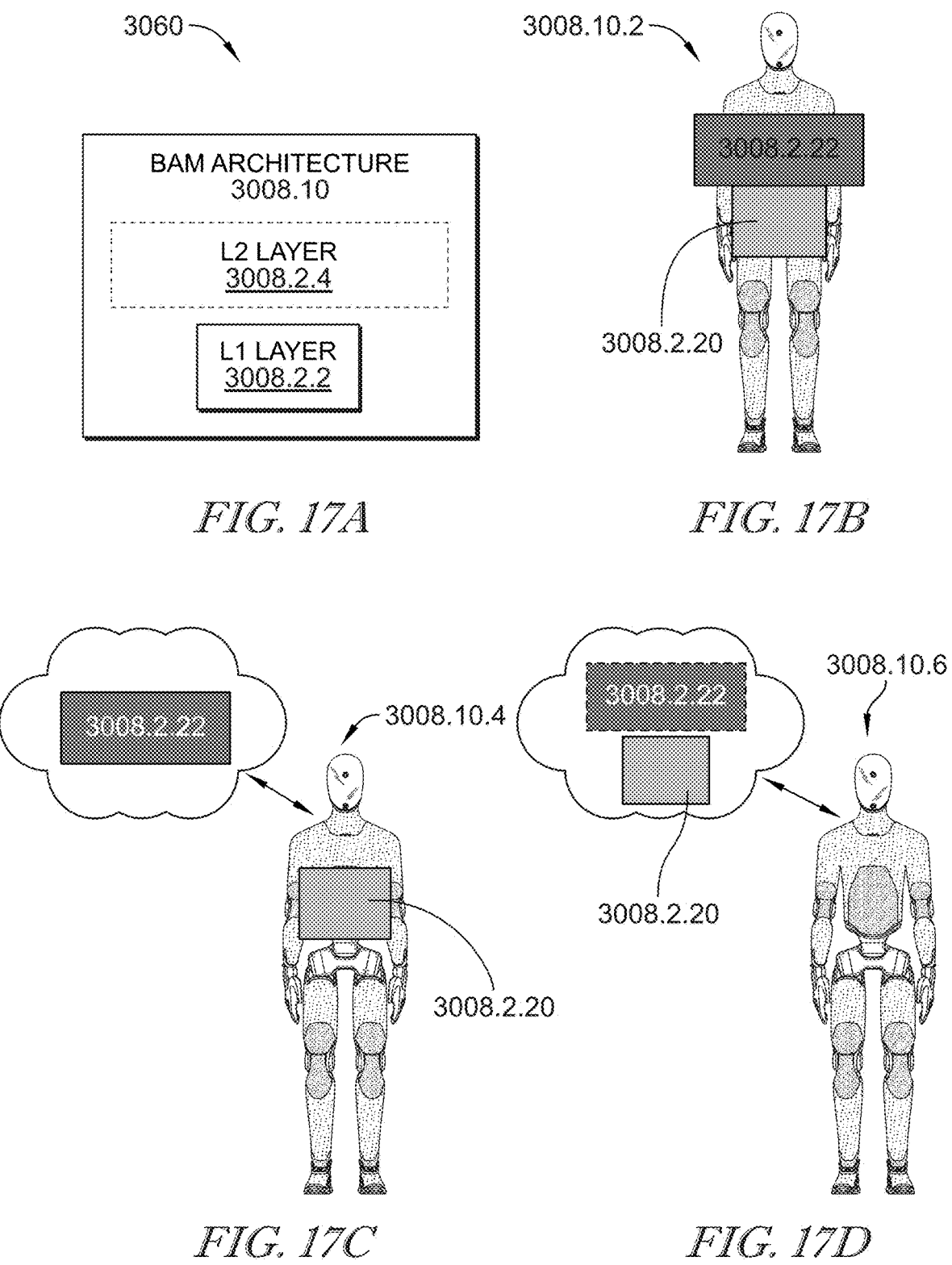
FIG. 17A is a block diagram of a third example hierarchical architecture of a BAM.
FIGS. 17B-17D are diagrams depicting example deployment configurations of the third example hierarchical architecture of FIG. 17A.

Referring now to FIG. 17A, a third instance of a hierarchical model architecture 3060 presents the most streamlined version of the hierarchy, comprising an optional Beta model(s) 3008.2.22A and one or more Alpha model(s) 3008.2.20A-N. This two-layer architecture achieves maximum efficiency in tasks that are either highly procedural or can be directly addressed by a sophisticated, multi-skilled action model without an intermediate tactical planning layer, reducing system complexity and response latency. The Beta model(s) 3008.2.22A remains optional, allowing the AI system to scale down to a purely reactive, L1-driven mode for simpler, well-defined tasks where high-level planning would add unnecessary overhead. The Beta model(s) 3008.2.22A-N comprises a large-scale model architecture, while the Alpha model(s) 3008.2.20A-N comprises a smaller-scale architecture relative to the Beta model(s) 3008.2.22A-N. The relative size comparison between models may be determined based upon one or more of the following parameters: number of model parameters, context window size, number of attention heads, number of neural network layers, dimensionality of input and output vectors, and computational complexity metrics.

To illustrate this architecture, consider a common household chore: sorting laundry. A user gives the command, "Please sort the laundry pile." If the optional Beta model(s) 3008.2.22A is utilized, which may be a large model (e.g., 100 M-20B parameters) with a long context length (1-5 million tokens) and operating at speed ranging from approximately one microhertz to ten hertz, it can act as a high-level task initiator that provides context and constraints for the sorting task. The model can leverage its long-term memory, specifically its semantic knowledge, to understand that "sorting laundry" typically means separating clothes by color (e.g., whites, darks, colors), fabric type, or washing requirements. The model may also access episodic memory to recall the user's specific sorting preferences, if any have been learned over time, such as separating delicates or sorting by family member. The role of the Beta model(s) 3008.2.22A may not involve generating a detailed plan, but rather providing an initial, contextually grounded command to the action layer, such as specifying sorting criteria and identifying the locations of sorted piles. The model may simply send a simple, high-level directive, such as "initiate color-based laundry sort," to the Alpha model(s) 3008.2.20A-N, along with any relevant parameters or constraints.

In this embodiment, the Alpha model(s) 3008.2.20A-N can be powerful, self-contained visuomotor policies that have been extensively trained on the specific skill of sorting laundry through thousands of examples in simulation and real-world scenarios. The Alpha model(s) 3008.2.20A-N, which may be smaller models with less than 1 billion parameters and a high running frequency of 100-350 Hz, may receive the high-level command from the Beta model(s) 3008.2.22A and take full ownership of the task, demonstrating autonomous execution capability. For instance, using onboard vision encoders, the Alpha model(s) 3008.2.20A-N can perceive the pile of clothes, identifying individual items through segmentation algorithms. The Alpha model(s) 3008.2.20A-N can maintain the state of the task in their medium-term memory, which in this streamlined case might be a simple internal state machine or counter tracking the number of items sorted into each pile (whites, darks, colors), providing task progress awareness. The context length of the Alpha model(s) 3008.2.20A-N (e.g., 500K-2 M tokens) may be sufficient to support this medium-term task tracking. For each piece of clothing, the Alpha model(s) 3008.2.20A-N can use their short-term memory, also enabled by the context window holding a buffer of the last few camera frames (e.g., between 2 and 32), to visually classify the item's color. Based on this classification, the Alpha model(s) 3008.2.20A-N may generate a series of action chunks: a sequence of motor commands to approach the item, grasp it with appropriate force based on fabric detection, move it to the correct destination pile following an optimized trajectory, and release it with proper placement. The Alpha model(s) 3008.2.20A-N can continue this perception-action loop until the laundry pile becomes empty, at which point the Alpha model(s) 3008.2.20A-N signal task completion, demonstrating end-to-end task execution without high-level intervention.

Furthermore, the architecture 3008.10 can support a mode of operation where the L2 model 3008.2.22 is bypassed entirely, enabling direct task execution for well-learned behaviors. A user could give a more direct command like, "Sort these clothes." A sophisticated L1 model, equipped with its own integrated vision and text encoders, can be trained to recognize this command directly through multimodal processing. The L1 model can map the visual input of the laundry pile and the textual command directly to the initiation of its internal sorting behavior, demonstrating zero-shot task understanding. This L1 model-only mode relies on the knowledge being implicitly "baked into" the neural network's weights through extensive prior training on diverse sorting scenarios. This allows for a highly reactive and efficient system that can perform familiar, well-trained tasks without the latency of consulting a large, external model, achieving response times suitable for real-time human-robot interaction.

A spectrum of deployment configurations for the architecture 3008.10 appears in FIGS. 17B, 17C, and 17D, illustrating its adaptability from fully autonomous to fully cloud-connected operation, covering the full range of deployment scenarios. FIG. 17B depicts a fully local deployment 3008.10.2, representing the highest degree of computing with the responsiveness of edge execution, providing an optimal trade-off for many applications. Here, the L2 model 3008.2.22 and its extensive long-term memory reside in the cloud, while the L1 model 3008.2.20 runs locally on the robot, leveraging both cloud/home server intelligence and edge responsiveness. The communication between these tiers may utilize adaptive protocols that can handle varying network conditions. For instance, the robot would send the initial "sort the laundry" request and a snapshot of the scene to the cloud, potentially using image compression and semantic extraction to minimize data transfer. The L2 model 3008.2.22 would process this and send back the initiating command with task parameters. The robot's L1 model 3008.2.20 would then execute the entire sorting task locally, potentially sending progress updates or requests for help back to the cloud model if an anomaly is encountered, such as an unrecognized item or an ambiguous sorting decision.

FIG. 17D shows a fully remote (e.g., in-home server, robot charger, or cloud) deployment 3008.10.6, also known as a thin-client model, maximizing the use of cloud resources while minimizing robot hardware requirements. In this configuration, both the L2 model 3008.2.22 and the L1 model 3008.2.20 are hosted in the cloud, leveraging virtually unlimited computational resources. The robot itself primarily functions as a remote telepresence system, streaming its sensor data (vision, proprioception) to the cloud/home server. The cloud-based L2 model 3008.2.22 (optional) and the L1 model 3008.2.20 process this data and stream low-level motor commands back to the robot's actuators, achieving remote real-time control. This configuration allows the robot to benefit from massive computational resources, enabling the use of the most powerful possible Alpha model(s) 3008.2.20A-N with billions of parameters, but the configuration remains entirely dependent on a persistent, high-bandwidth, and low-latency network connection for basic functionality, making it suitable for controlled environments with guaranteed network infrastructure.

vi. Fourth Exemplary Architecture

In certain embodiments, the hierarchical BAM architecture may have the configuration or a portion of the configurations contained in the table below. However, it should be understood that this is only one embodiment and is not a summary of the entire disclosure contained herein.

| Layer | Model Type | Parameters | Frequency | Context Window | Location |
|---|---|---|---|---|---|
| L4 | Delta | 50B-2T | <1 Hz | 1-5M tokens | Cloud/Local |
| L3 | Gamma | 1-50B | 1-10 Hz | 500K-20M | Edge/Local/Cloud |
| L2 | Beta | 100M-10B | 100 mHz-50 Hz | 1K-50K | Edge/Local/Cloud |
| L1 | Alpha | 10K-5B | 50-350 Hz | 100-10K | Edge/Local | autonomy and data privacy, suitable for applications with complete independence from external infrastructure. In this configuration, both the optional L2 model 3008.2.22 and the Alpha model(s) 3008.2.20A-N are executed on a powerful onboard computer, potentially utilizing edge AI accelerators for optimal performance. This robot can perform the entire laundry sorting task without any network connection, making the robot robust to connectivity outages and ensuring that all sensor data remains on the device, addressing privacy concerns and regulatory requirements.

FIG. 17C illustrates a hybrid cloud-local deployment 3008.10.4, which balances the power of cloud/home server vii. Further Exemplary Architecture In alternative embodiments, the hierarchical BAM architecture comprises a three-layer model system including a first model operating as the Gamma model(s), a second model operating as the Beta model(s) 3008.2.22A-N, and a third model operating as the Alpha model(s) 3008.2.20A-N. The Gamma model(s) comprises the largest computational architecture, the Beta model(s) 3008.2.22A-N comprises an intermediate computational architecture, and the Alpha model(s) 3008.2.20A-N comprises the smallest computational architecture. The Gamma model(s) may be configured with a context window ranging from approximately eight thousand to five million tokens, a parameter count ranging from approximately fifty billion to two trillion parameters, and a processing speed ranging from approximately one hundred microhertz to one hundred millihertz. The Beta model(s) 3008.2.22A-N may be configured with a context window ranging from approximately one thousand to fifty thousand tokens, a parameter count ranging from approximately five billion to fifty billion parameters, and a processing speed ranging from approximately one hundred millihertz to ten hertz. The Alpha model(s) 3008.2.20A-N may be configured with a context window ranging from approximately one hundred to five thousand tokens, a parameter count ranging from approximately fifty thousand to five billion parameters, and a processing speed ranging from approximately one hertz to ten kilohertz.

In this three-layer configuration, the Gamma model(s) generates system-level control outputs for the entire robotic platform, the Beta model(s) 3008.2.22A-N generates regional control outputs for defined regions of the robot such as an upper body region or a lower body region, and the Alpha model(s) 3008.2.20A-N generates actuator-specific control outputs for individual actuators within said regions. Variations of this architecture may implement hierarchical attention mechanisms wherein each layer maintains selective attention to outputs from adjacent layers, enabling more efficient information flow and reduced computational overhead. The three-layer system may also incorporate layer-skipping connections that allow direct communication between non-adjacent levels during certain operations or emergency responses, bypassing intermediate processing when rapid action is indicated.

In certain embodiments, the hierarchical BAM architecture incorporates a Multimodal Large Language Model as the highest-layer model in conjunction with a plurality of specialized models at the lowest layer. The Multimodal Large Language Model may be configured with a context window ranging from approximately four thousand to one million tokens, a parameter count ranging from approximately five billion to two trillion parameters, and a processing speed ranging from approximately one microhertz to ten hertz. Each of the specialized models may be configured with a context window ranging from approximately one hundred to five thousand tokens, a parameter count ranging from approximately ten thousand to five billion parameters, and a processing speed ranging from approximately one hertz to ten kilohertz. The Multimodal Large Language Model processes long-horizon goals and decomposes them into specific sequential steps for goal achievement. Each specialized model is assigned to specific actuator groups or individual actuators, generating precise control outputs including currents, torques, positions, and rotations. Advanced implementations may incorporate continuous learning mechanisms wherein the Multimodal Large Language Model updates its internal representations based on successful task completions and failures, enabling improved performance over time. The architecture may also feature multimodal fusion layers that combine visual, auditory, tactile, and proprioceptive inputs at various stages of processing, enhancing environmental awareness and decision-making capabilities.

In additional embodiments, the hierarchical BAM architecture comprises a hybrid system incorporating a Multimodal Large Language Model as the Gamma model(s) at L3, a Large Language Model as a Beta model(s) 3008.2.22A-N at L2, and one or more specialized Alpha models at the L1 level. In alternative configurations, the positional hierarchy of the Multimodal Large Language Model and Large Language Model may be reversed. The Multimodal Large Language Model may be configured with a context window ranging from approximately four thousand to one million tokens, a parameter count ranging from approximately five billion to two trillion parameters, and a processing speed ranging from approximately one microhertz to ten hertz. The Large Language Model may be configured with a context window ranging from approximately one thousand to fifty thousand tokens, a parameter count ranging from approximately five billion to fifty billion parameters, and a processing speed ranging from approximately one hundred millihertz to one hundred hertz. The specialized models may be configured with a context window ranging from approximately one hundred to five thousand tokens, a parameter count ranging from approximately ten thousand to five billion parameters, and a processing speed ranging from approximately one hertz to ten kilohertz.

In this configuration, the Multimodal Large Language Model processes visual and multimodal inputs to detect environmental objects and determine complex long-horizon goals. The Large Language Model performs natural language processing tasks including speech-to-text conversion. The specialized models generate rapid actuator-specific control signals responsive to environmental conditions. Modified versions may implement cross-modal attention mechanisms that enable the Large Language Model to directly influence the Multimodal Large Language Model's visual processing based on linguistic context, and vice versa, creating a more integrated cognitive architecture. The system may further comprise alternative hierarchical configurations including various combinations of Multimodal Large Language Models and specialized models. One variation comprises a large Multimodal Large Language Model, a medium Multimodal Large Language Model, and one or more specialized models, wherein the Multimodal Large Language Models process multimodal inputs at different levels of abstraction. Another variation comprises a large Multimodal Large Language Model, a medium Multimodal Large Language Model, a small Multimodal Large Language Model, and one or more specialized models, providing four-tier multimodal processing. Additional configurations may comprise multiple layered Multimodal Large Language Models of uniform or varying sizes, coupled with one or more specialized models, enabling parallel multimodal processing pathways. Further variations may comprise multiple layered Vision-Language Models of uniform or varying sizes, coupled with one or more specialized models, optimized for visual-linguistic task decomposition. Each architectural variation is configurable based on specific robotic control requirements, computational constraints, and real-time processing demands of the target application.

In various embodiments, the hierarchical architectures described herein may incorporate dynamic reconfiguration capabilities that allow real-time modification of the model hierarchy based on operational conditions. The system may implement automatic tier insertion or removal, wherein intermediate processing layers are dynamically added or removed based on task complexity assessment. For instance, when encountering novel or complex scenarios, the system may automatically insert additional processing tiers between existing levels to provide more granular control decomposition. The architectures may further incorporate adaptive model sizing mechanisms that dynamically adjust model parameters, context windows, and processing speeds based on available computational resources and task requirements. This may include model compression techniques such as quantization, pruning, or knowledge distillation applied selectively to different tiers based on performance requirements. The system may also implement hot-swapping capabilities, allowing individual models within the hierarchy to be replaced or updated without interrupting ongoing operations, enabling continuous system improvement and maintenance.

In another embodiment or in any of the embodiments disclosed above, the L1 layer 3008.2.2 may include: (i) a first Alpha model(s) 3008.2.20A-N can be used to determine actions performed by a left arm of the humanoid robot 1, (ii) a second Alpha model(s) 3008.2.20A-N can be used to determine actions performed by a right arm of the humanoid robot 1, (iii) a third Alpha model(s) 3008.2.20A-N can be used to determine actions performed by a left leg, (iv) a fourth Alpha model(s) 3008.2.20A-N can be used to determine actions performed by a right leg, (v) a fifth Alpha model(s) 3008.2.20A-N can be used to determine actions performed by a torso, and (vi) a sixth Alpha model(s) 3008.2.20A-N can be used to determine actions performed by a head of the humanoid robot 1, etc., with each specialized model optimized for the specific kinematics and dynamics of its assigned body part.

Alternative embodiments may implement the hierarchical architectures in distributed or federated configurations across multiple physical or virtual computing platforms. In such implementations, different tiers of the hierarchy may be distributed across cloud servers, edge computing devices, and local robotic processors, with sophisticated synchronization and communication protocols ensuring coherent operation. The system may implement consensus mechanisms between distributed model instances to ensure consistent decision-making across the distributed hierarchy. Federated learning approaches may be employed wherein multiple robotic systems share learned parameters and experiences while maintaining operational independence. This may include privacy-preserving techniques such as differential privacy or secure multi-party computation to protect sensitive operational data while enabling collective learning. The distributed architecture may also implement redundant model instances at certain tiers, providing failover capabilities and ensuring continuous operation even in the event of individual component failures.

The hierarchical architectures may be adapted for specific robotic domains through specialized model configurations and training procedures. For industrial robotics applications, the hierarchy may emphasize precision and repeatability, with specialized models trained on manufacturing-specific datasets and optimized for deterministic behavior. For service robotics, the architecture may prioritize human interaction capabilities, with enhanced natural language processing and social behavior modeling integrated throughout the hierarchy. In medical or surgical robotics applications, the system may implement additional safety layers and verification mechanisms between hierarchical tiers, ensuring that all control outputs meet stringent safety requirements. For autonomous vehicle applications, the hierarchy may incorporate specialized models for traffic prediction, path planning, and collision avoidance, with real-time sensor fusion capabilities integrated at multiple levels. Agricultural robotics implementations may feature models specialized for crop recognition, soil analysis, and weather adaptation, with seasonal learning mechanisms that adjust behavior based on environmental cycles.

Various embodiments may implement hardware-specific optimizations tailored to the computational platforms available on the robotic system. For systems equipped with specialized neural processing units or tensor processing units, the model hierarchy may be optimized to leverage these accelerators, with specific layers or operations mapped to hardware-accelerated functions. The architecture may implement mixed-precision computing strategies, utilizing different numerical precisions at different tiers based on accuracy considerations and hardware capabilities. For resource-constrained robotic platforms, the system may implement aggressive model compression techniques including binary or ternary quantization for lower-tier models while maintaining higher precision for high-level decision-making models. The architecture may also feature hardware-aware neural architecture search capabilities that automatically optimize model structures based on the specific computational resources available on the target platform.

The hierarchical architectures may incorporate various learning and optimization mechanisms that enable continuous improvement of system performance. This may include online learning capabilities wherein models at different tiers adapt their parameters based on real-time feedback, with learning rates and update frequencies tailored to each tier's operational characteristics. The system may implement curriculum learning strategies, gradually increasing task complexity as the hierarchy develops competency in simpler operations. Meta-learning approaches may be employed to enable rapid adaptation to new tasks or environments, with higher-layer models learning to generate effective initialization parameters for lower-layer models when encountering novel situations. The architecture may also feature automated hyperparameter optimization mechanisms that continuously tune model configurations based on performance metrics, ensuring optimal operation across varying conditions.

b. Components of the BAM

As discussed in detail, the disclosed BAM may have any number of layers (e.g., L1-L4), and each layer may have any number of models (e.g., Alpha, Beta, Delta, Gamma). The following sections describe the models and the training data that may be used to train the BAM.

i. Models for Use in Any Layer

The models (e.g., Alpha, Beta, Delta, Gamma, etc.) may be of any type, including any type of artificial intelligence models, machine learning models, neural network-based models, deep learning models, or generative artificial intelligence models. In addition to these general model types, the model(s) may be classified as one, more than one, or a combination of large language models (LLMs), VLMs, multimodal large language models (MLLMs), audio models, video models, graph models, any combination thereof, and/or any other known model.

Further, while certain models and implementations are discussed above, it should be understood that any model disclosed herein may be implemented as and/or including: (i) transformer family architectures (e.g., decoder-only with causal masking; encoder-only (BERT) with bidirectional attention; cross-attention encoder-decoder (T5) with separated encoding and decoding; ViT/DeiT for image patches, Swin with hierarchical windows; Longformer with sparse attention, BigBird with random and global tokens, Reformer with locality-sensitive hashing, Linformer with linear complexity, Performer with kernel-based attention; Transformer-XL with segment-level recurrence, Memorizing Transformer with explicit memory; Cross-Modal Bridges for multi-modal fusion, Q-Former for query-based extraction; Perceiver/Perceiver-IO with latent bottlenecks; Graph Transformers for structured data), (ii) state-space/long-sequence & recurrence models (e.g., S4/S5 with structured matrices; Mamba/Mamba-2 with selective state spaces; Ret-Net with retention mechanisms; Liquid Models with continuous-time dynamics; Hyena/Long Convolutions with implicit parameterization; Linear-Attention Kernels with softmax alternatives), (iii) recurrent neural networks (e.g., LSTM/GRU/SRU with gating mechanisms; RWKV with linear complexity; RNN-T for sequence transduction), (iv) convolutional neural network architectures (e.g., ResNet/EfficientNet/ConvNeXt with modern design principles; U-Net for dense prediction; Sparse/3D CNNs (Minkowski) for point clouds), (v) graph neural network & geometric architectures (e.g., GCN/GAT/GIN with message passing; GraphSAGE with sampling; EGNN with equivariance; SE(3)—Transformers with group theory; E(n)—Equivariant CNNs preserving symmetries), (vi) spiking neural networks (e.g., Event-Driven SNNs with temporal coding), (vii) MLP-Style Vision architectures (e.g., MLP-Mixer with token mixing; gMLP with gating; MetaFormer-Style Variants abstracting transformer components), (viii) audio-centric backbones (e.g., Conformer combining convolution and attention; TasNet/Conv-TasNet for source separation; wav2vec/HuBERT for self-supervised speech; Diffusion Vocoders for waveform generation), (ix) sets/point clouds/3D representations (e.g., DeepSets/Set Transformer with permutation invariance; PointNet/PointNet++ with hierarchical features; Point Transformer adapting attention; KPConv with kernel convolutions; Minkowski networks for sparse voxels), (x) implicit neural representations/neural fields (e.g., SIREN with periodic activations; NeRF Family Including Mip-NeRF with anti-aliasing, Instant-NGP with hash encoding; DeepSDF for shape representation; 3D Gaussian Splatting for fast rendering), (xi) autoregressive models (e.g., Token/Patch/Audio AR with sequential generation; PixelCNN/RNN for images; AR Transformers with causal masking), (xii) variational autoencoder & latent-variable models (e.g., B-VAE with disentanglement; Hierarchical VAEs with multiple scales), (xiii) diffusion/score-based models (e.g., LDMs in latent space; DiT with transformers; Video Diffusion with temporal consistency; Vocoders for audio synthesis), (xiv) normalizing flows (e.g., RealNVP with coupling layers; Glow with invertible convolutions; Neural ODE Flows with continuous dynamics; FFJORD with free-form Jacobians), (xv) generative adversarial networks (e.g., StyleGAN with style modulation; BigGAN with class conditioning), (xvi) energy-based models (e.g., Including Boltzmann/RBMs with stochastic units), (xvii) masked/denoising objectives (e.g., BERT-Style MLM for language; MAE for images; Denoising AEs with corruption), (xviii) contrastive/self-distillation methods (e.g., CLIP for vision-language; SimCLR for visual representations; MoCo with momentum encoding; DINO/iDINO with self-distillation), (xix) tokenization/latent tokenizers (e.g., VQ-VAE/VQ-GAN with discrete codes; Tokenizer-Decoder Stacks for compression), (xx) preference/RL fine-tuning (e.g., RLHF/RLAIF with human feedback; DPO for direct optimization), (xxi) mixture-of-experts (MoE) systems (e.g., Switch with routing; GShard with sharding; DeepSeek-MoE with sparse activation), (xxii) retrieval & external memory (e.g., RAG for knowledge grounding; kNN-LM with nearest neighbors; NTM with differentiable memory; DNC with addressing mechanisms), (xxiii) world/dynamics models (e.g., PlaNet/RSSM/Dreamer with latent dynamics; MuZero-Style with planning; Latent ODE Dynamics with continuous time; Diffusion World Models for stochastic environments), (xxiv) multimodal fusion strategies (e.g., Cross-Attention Bridges between modalities; FiLM-Style Conditioning with affine transformations; Gated Fusion with learnable weights; Q-Former/Perceiver Latents for bottleneck processing), any combination thereof through hybrid architectures, and/or any other type that advances the state of the art based on this disclosure.

Additionally, this Application contemplates that the Alpha model(s) 3008.2.20A-N and the Beta model(s) 3008.2.22A-N could use or include any model type disclosed in any one of the following papers: Radford, Alec, et al. "Learning transferable visual models from natural language supervision." *International conference on machine learning.* PMLR, 2021, Li, Yangguang, et al. "Supervision exists everywhere: A data efficient contrastive language-image pre-training paradigm." *arXiv preprint arXiv: 2110.05208* (2021), Yao, Lewei, et al. "Filip: Fine-grained interactive language-image pre-training." *arXiv preprint arXiv: 2111.07783* (2021), Rombach, Robin, et al. "High-resolution image synthesis with latent diffusion models." *Proceedings of the IEEE CVF conference on computer vision and pattern recognition.* 2022, Li, Junnan, et al. "Blip: Bootstrapping language-image pre-training for unified vision-language understanding and generation." *International conference on machine learning.* PMLR, 2022, Zhang, Renrui, et al. "Llama-adapter: Efficient fine-tuning of language models with zero-init attention." *arXiv preprint arXiv: 2303.16199* (2023), Liu, Haotian, et al. "Visual instruction tuning." *Advances in neural information processing systems* 36 (2024), Liu, Haotian, et al. "Improved baselines with visual instruction tuning." *Proceedings of the IEEE CVF Conference on Computer Vision and Pattern Recognition.* 2024, Lin, Ji, et al. "Vila: On pre-training for visual language models." *Proceedings of the IEEE CVF Conference on Computer Vision and Pattern Recognition.* 2024, Jin, Yang, et al. "Unified Language-Vision Pretraining in LLM with Dynamic Discrete Visual Tokenization. arXiv 2024." *arXiv preprint arXiv: 2309.04669*, Maniparambil, Mayug, et al. "Do Vision and Language Encoders Represent the World Similarly?." *Proceedings of the IEEE CVF Conference on Computer Vision and Pattern Recognition.* 2024, Liu, Daizong, et al. "A Survey of Attacks on Large Vision-Language Models: Resources, Advances, and Future Trends." *arXiv preprint arXiv: 2407.07403* (2024), Chang, Yupeng, et al. "A survey on evaluation of large language models." *ACM Transactions on Intelligent Systems and Technology* 15.3 (2024): 1-45, Yin, Shukang, et al. "A survey on multimodal large language models." *arXiv preprint arXiv: 2306.13549* (2023), Zhang, Duzhen, et al. "Mm-llms: Recent advances in multimodal large language models." *arXiv preprint arXiv: 2401.13601* (2024), Vaswani, A. "Attention is all you need." *Advances in Neural Information Processing Systems* (2017), Radford, A. "Improving language understanding by generative pre-training." (2018), Wang, Wei, et al. "Structbert: Incorporating language structures into pre-training for deep language understanding." *arXiv preprint arXiv: 1908.04577* (2019), Radford, Alec, et al. "Language models are unsupervised multitask learners." *OpenAI blog* 1.8 (2019): 9, Liu, Yinhan. "Roberta: A robustly optimized bert pretraining approach." *arXiv preprint arXiv: 1907.11692* (2019), Sanh, V. "Distil-BERT, A Distilled Version of BERT: Smaller, Faster, Cheaper and Lighter." *arXiv preprint arXiv: 1910.01108* (2019), Raffel, Colin, et al. "Exploring the limits of transfer learning with a unified text-to-text transformer." *Journal of machine learning research* 21.140 (2020): 1-67, Brown, Tom B. "Language models are few-shot learners." *arXiv preprint arXiv: 2005.14165* (2020), Touvron, Hugo, et al. "Llama 2: Open foundation and fine-tuned chat models." *arXiv preprint arXiv: 2307.09288* (2023), Schulman, John, et al. "Proximal policy optimization algorithms." *arXiv preprint arXiv:* 1707.06347 (2017), Radford, Alec, et al. "Learning transferable visual models from natural language supervision." *International conference on machine learning.* PMLR, 2021, Li, Yangguang, et al. "Supervision exists everywhere: A data efficient contrastive language-image pre-training paradigm." *arXiv preprint arXiv:* 2110.05208 (2021), Chen, Zhe, et al. "Internvl: Scaling up vision foundation models and aligning for generic visual-linguistic tasks." *Proceedings of the IEEE CVF Conference on Computer Vision and Pattern Recognition.* 2024, all of which are incorporated herein by reference and in their entirety for any purpose.

Figure 19:
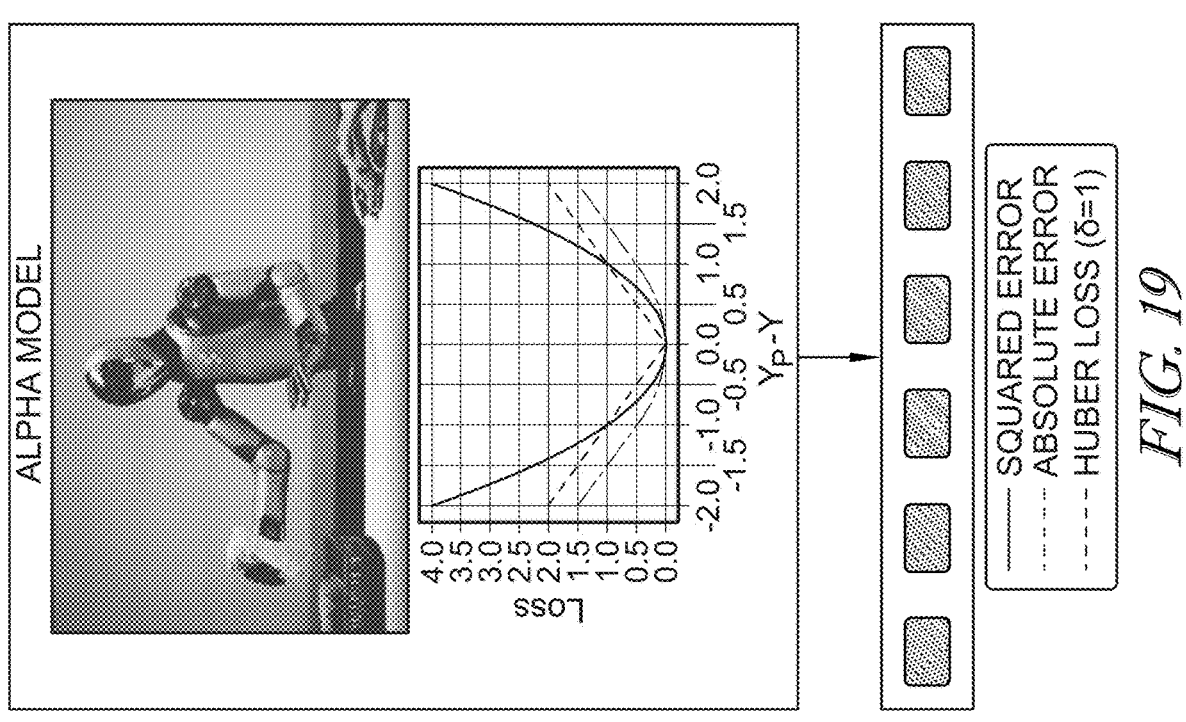
FIG. 19 is a diagram illustrating an example Alpha model of FIGS. 11-17D, wherein said Alpha model is an AI model that has been pretrained with a regression loss function and outputs continuous data.
Figure 18:
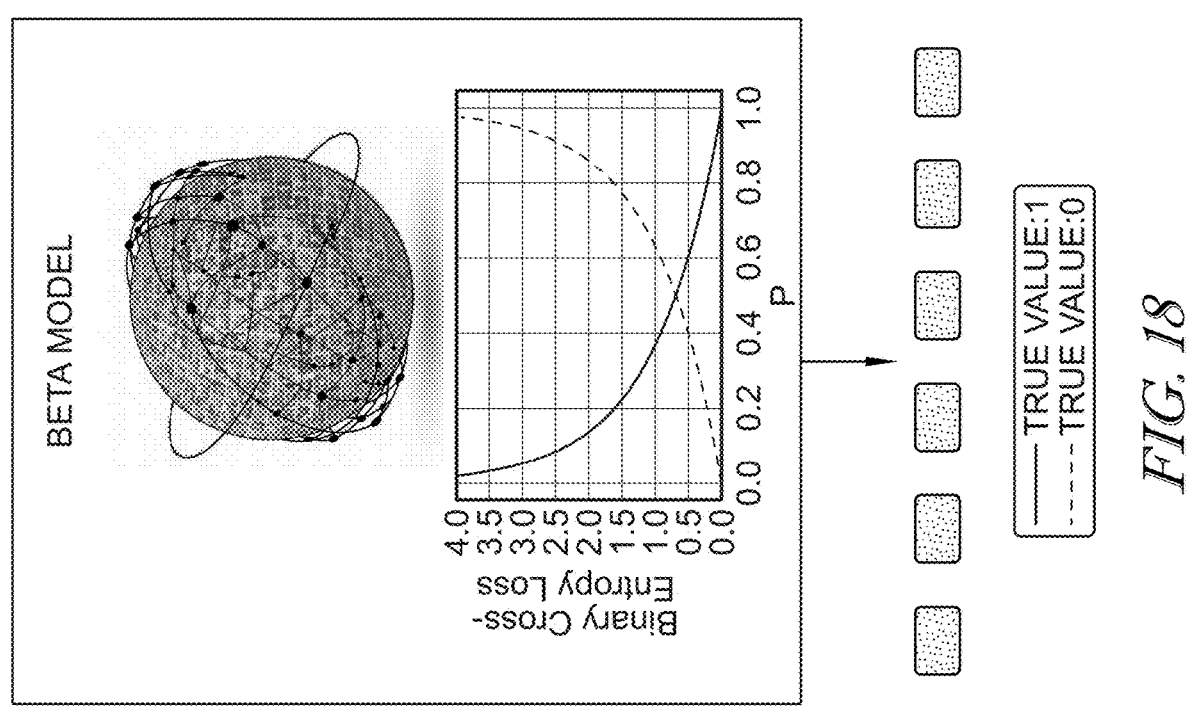
FIG. 18 is a diagram illustrating an example Beta model of FIGS. 11-17D, wherein said Beta model is an AI model that has been pretrained with a cross-entropy loss function and outputs discrete data.

As shown in FIGS. 18 and 19, the Beta model(s) 3008.2.22A-N may be a vision-language model (VLM) that was trained using internet-scale data comprising billions of image-text pairs with a cross-entropy loss function to output discrete data, whereas the Alpha model 3008.2.20A-N is a cross-attention encoder-decoder transformer trained on robot data including teleoperation demonstrations and simulated trajectories using a regression loss function to output continuous data as floating-point action vectors. The selection of an open-weight pre-trained vision-language model is beneficial because it simplifies the training pipeline to provide the model with context awareness through learned representations, reduces data requirements through transfer learning, and enables zero-shot generalization to novel scenarios. Using a robot-trained cross-attention encoder-decoder transformer that outputs continuous data is also beneficial, as the model weights are tailored to the robot's kinematics through embodiment-specific training, offering high precision due to the model's ability to directly predict the floating-point values for each action dimension without quantization artifacts, and avoids discretization errors that arise from binning continuous spaces. The selection of these models represents a significant leap forward over conventional solutions that generate clunky movements with temporal inconsistencies, as these conventional solutions split the continuous action dimension into a finite number of bins resulting in discretization artifacts when predicting the appropriate bin for each degree of freedom.

Moreover, the models may incorporate techniques such as Low-Rank Adaptation (LoRA) with rank decomposition, Quantized LoRA (QLoRA) combining quantization and adaptation, Adaptive LoRA (AdaLoRA) with importance-based allocation, Decomposed LoRA (DoRA) separating magnitude and direction, Kronecker/Hadamard Low-Rank Adapters (LoKr/LoHa) with structured matrices, Sparse LoRA with selective updates, Adapter-Based Fine-Tuning (Houlsby Adapters) with bottleneck layers, Pfeiffer Adapters with sequential processing, Parallel Adapters with concurrent paths, Compacter (Parameter-Sharing Adapters) with hypercomplex numbers, MAD-X (Modular Adapter Exchange) for task switching, AdapterFusion combining multiple adapters, AdapterDrop for efficient inference, Uni-PELT (Unified Parameter-Efficient Tuning) integrating methods, Prefix-Tuning with virtual tokens, Prompt Tuning (Soft Prompts) with learnable embeddings, P-Tuning v2 with deep prompt encoding, Deep Prompt Tuning across layers, Visual Prompt Tuning (VPT) for vision models, BitFit (Bias-Only Fine-Tuning) updating only biases, $IA^3$ (Input-Attention-Activation Multiplicative Adapters) with element-wise scaling, Side-Tuning with parallel networks, Ladder Side-Tuning with hierarchical connections, Knowledge Distillation (Logit Matching) transferring predictions, Feature/Intermediate-Layer Distillation preserving representations, Self-Distillation (Born-Again Networks) with self-teaching, Sequence-Level Distillation for generation tasks, Multi-Teacher/Ensemble Distillation combining knowledge sources, Online Distillation with co-training, Policy Distillation for reinforcement learning, Data-Free Distillation without training data, Post-Training Quantization (PTQ) reducing precision, Quantization-Aware Training (QAT) with simulated quantization, 8-Bit Optimizers for memory efficiency, NF4/FP4 Low-Precision Training with novel formats, GPTQ with Hessian-based quantization, AWQ with activation-aware quantization, SmoothQuant balancing weights and activations, Structured/Unstructured/Movement Pruning removing parameters, N: M Sparsity with hardware acceleration, Low-Rank SVD Adapters decomposing weight matrices, DreamBooth for subject-driven generation, Textual Inversion learning new concepts, HyperNetworks generating weights, Diffusion-LoRA for generative models, any combination thereof implementing hybrid strategies, any technique disclosed in a paper that is incorporated herein by reference advancing the field, and/or any other technique that enhances model efficiency and adaptation based on this disclosure.

The above models and incorporated techniques may have been generated using any one or combination of the following loss functions: cross-entropy loss (with label smoothing), negative log-likelihood (token-level NLL/perplexity), regression losses (MSE/12, MAE/11, huber/smooth-11), kullback-leibler (kl) divergence, connectionist temporal classification (CTC) loss, rnn-t loss, infonce/NT-XENT (contrastive) loss, focal loss, dice/IOU (jaccard) loss, perceptual/quality losses (feature-space/VGG, SSIM, LPIPS), adversarial GAN losses (non-saturating/logistic, hinge, WGAN-GP), exact log-likelihood/bits-per-dim (normalizing flows), diffusion objectives ($\varepsilon$-prediction MSE, v-parameterization, $x_o$-prediction, variational lower bound), VAE evidence lower bound (ELBO) including $\beta$-VAE, autoregressive maximum-likelihood (teacher-forcing NLL), spectral/audio losses (STFT/multi-resolution STFT, SI-SDR/SI-snr with pit), 3D/NERF/point-cloud losses (photometric L1/L2, chamfer distance, earth mover's distance, eikonal regularization), tokenizer/codebook losses (VQ commitment/codebook/ema), multimodal alignment/matching losses (image-text/audio-text contrastive and ITM), distillation objectives (temperature-scaled cross-entropy, KL to teacher, feature/attention transfer), and/or reinforcement-learning fine-tuning objectives (PPO-clip with value/entropy and KL regularization to a reference, direct preference optimization (DPO)).

It should also be understood that the models may be pretrained using any of the following data: (i) image data (e.g., raw image data, annotated image data, synthetic data comprising computer-generated images used to augment real image datasets such as in instances where usable data is scarce, etc.), (ii) video data (e.g., raw video data, annotated video data, synthetic data comprising simulated video data used to train models on dynamic scenarios and interactions, etc.), (iii) text data (e.g., natural language instructions, dialogue data, machine readable instructions, natural language mapping data, etc.), (iv) depth data (e.g., map data, point cloud data from LiDAR or structured light sensors, etc.), (v) robot joint trajectories, (vi) robot joint locations, (vii) robot joint location data (e.g., obtained from teleoperation of a robot), (viii) robot joint rotations data (e.g., obtained from teleoperation of a robot), (ix) other robot sensor data (e.g., inertial measurement unit (IMU) data, force and torque data, proximity sensor data, etc.), (x) simulation data, (xi) human demonstration data (e.g., images or videos of humans performing the task), (xii) robot demonstration data (e.g., images or videos of other robots performing the task), (xiii) any combination of the above data, and/or (xiv) any other known data type. It should be understood that the data may be labeled or unlabeled.

ii. Training Data

Figure 20:
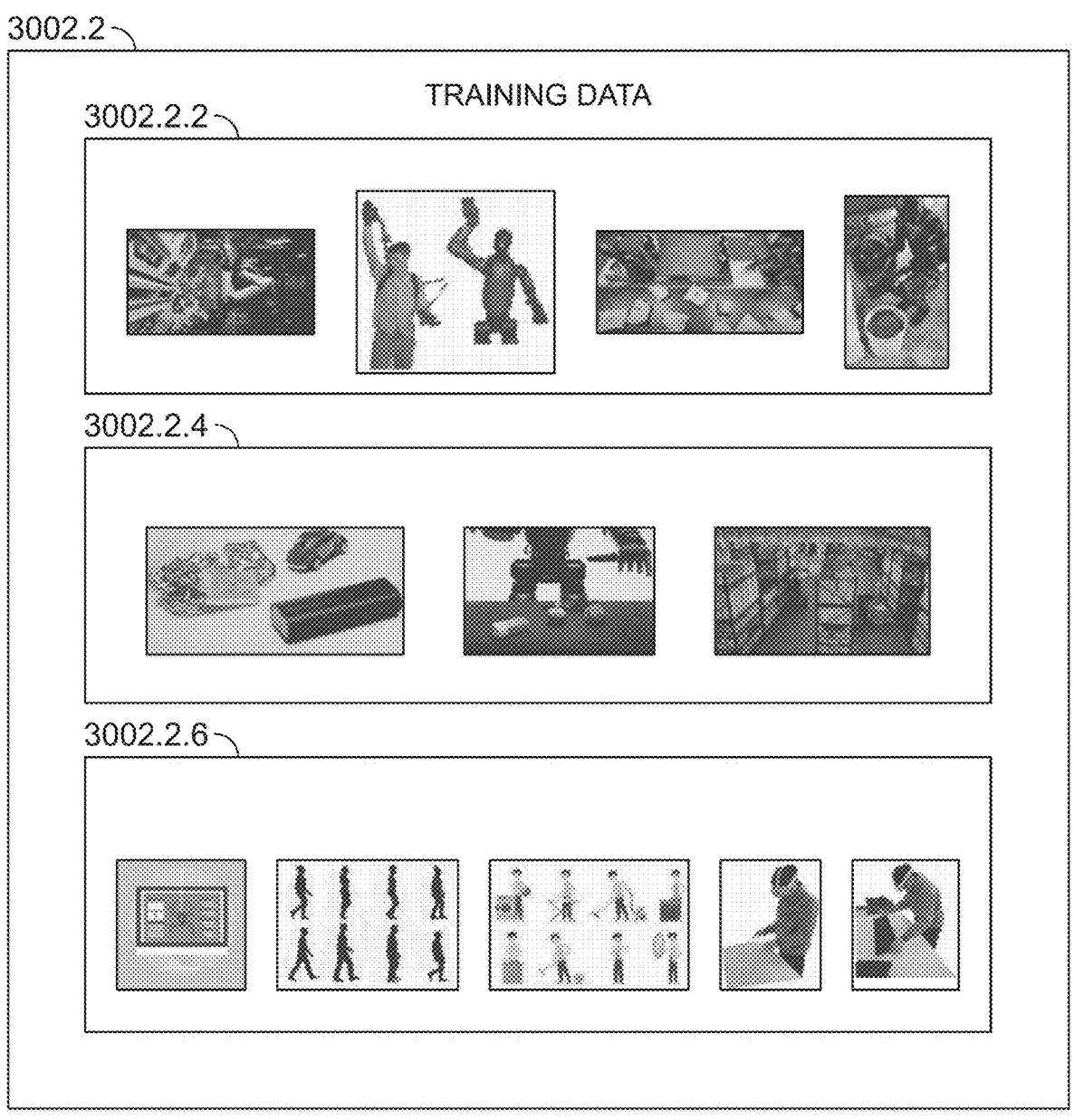
FIG. 20 is a block diagram depicting a collection of training data that may be used in generating the BAM.

The training data 3002 for the BAM can be structured in a layered or pyramidal configuration, as illustrated in FIG. 20, and may include any data type that is disclosed herein. This approach is designed to address the challenge of data scarcity in robotics, where high-quality, embodied data is often costly and time-consuming to acquire at scale. By organizing heterogeneous data sources by their scale and specificity, this structure allows the model to first learn broad visual and behavioral priors from vast, general datasets before being grounded in the specifics of embodied, real-robot execution. The quantity of data generally decreases, while the embodiment-specificity and relevance increase, from the bottom layer to the top layer of the structure. This layered strategy enables the development of a generalist model that is both knowledgeable about the world and proficient in physical interaction.

The foundational layer of the data structure 3002.2.6 is composed of vast quantities of Internet data and human videos. This layer can provide the largest volume of data and allow for instilling the model with a broad, common-sense understanding of objects, language, and the physical world. The Internet data may include billions of text documents, images, and video clips, which helps the model learn rich semantic representations and the relationships between visual concepts and linguistic descriptions. This is supplemented by large-scale human video datasets, such as egocentric videos of people performing everyday activities. These datasets capture a wide range of real-world human behaviors, including grasping, tool use, cooking, assembly, and other task-oriented activities, providing the model with extensive examples of human-object interactions, affordances, and natural motion patterns.

A notable component of this foundational layer can include robot-free data collection, which allows for the rapid acquisition of human motion data without a physical robot. In this method, a human operator may use a commercially available virtual reality (VR) or augmented reality (AR) headset to perform various manipulation tasks. The AR/VR system may capture a first-person video stream from the headset's camera at 24-90 fps, synchronized with the three-dimensional position and orientation of the operator's head and hands. This technique can be highly scalable with parallel data collection across multiple operators and cost-effective with consumer-grade hardware, as it decouples data collection from the availability of physical robots and reduces hardware wear through eliminating mechanical stress. It allows for the safe collection of data in diverse environments including homes, offices, and industrial settings, and for a wide array of tasks spanning hundreds of activity categories, such as performing household chores with natural variations or demonstrating complex bimanual manipulations with tool use, thereby generating a large and varied dataset of natural human movements with rich annotations that can be used for initial model training through behavior cloning and trajectory learning.

The middle layer of the data structure 3002.2.4 comprises simulation and synthetic data generated through physics engines and neural rendering. This layer serves to bridge the gap between the abstract knowledge gained from internet data providing semantic understanding and the specific requirements of robotic embodiment including dynamics and control. In simulated virtual environments powered by engines like MuJoCo, Bullet, or Isaac Gym, it is possible to generate millions of perfectly annotated trajectories for a wide range of tasks with deterministic repeatability. These simulations can feature diverse objects with varying geometries and material properties, backgrounds with different visual complexities, lighting conditions including shadows and reflections, and physics-based interactions modeling contact, friction, and deformation, allowing for systematic training across a vast parameter space with controlled variations. Techniques such as domain randomization, where the visual and physical properties of the simulation are varied during training across specified distributions, can help the model learn to generalize to real-world conditions through robust feature extraction. This layer provides a scalable method for generating task-specific data that would be impractical to collect in the real world.

In addition to physics-based simulation with analytical models, this middle layer may be augmented with neural-generated synthetic data using generative models. For instance, this process can involve fine-tuning large-scale video generation models such as video diffusion models or autoregressive video transformers on a smaller set of real-world robot trajectories comprising thousands of demonstrations. Once fine-tuned through techniques like LoRA or full fine-tuning, these models can generate a significantly larger volume of novel, high-fidelity video data exceeding millions of samples depicting the robot performing counterfactual scenarios with realistic appearance, such as interacting with new objects with different geometries, executing tasks in different sequences with varied ordering, or recovering from perturbations with adaptive responses. This synthetic data generation effectively multiplies the amount of available training data by creating plausible variations of existing demonstrations through learned priors, which can be used to improve the model's robustness through exposure to edge cases and ability to generalize to unseen situations through interpolation in learned spaces.

The top layer of the data structure 3002.2.2 comprises the highest-fidelity, most embodiment-specific data: real-world humanoid data collected from physical robots. While this dataset is the smallest in terms of volume, typically containing thousands to tens of thousands of trajectories, it provides fundamental grounding for the model's learned knowledge in the dynamics and constraints of the physical world including gravity, inertia, and actuator limitations. This data can be primarily collected through teleoperation with various control interfaces, where a human operator controls a humanoid robot to perform a variety of tasks using haptic feedback. The teleoperation system may involve wearable suits with motion capture markers, sensor gloves with force feedback, or VR controllers with spatial tracking to capture the operator's movements with high precision, which can then be translated into control commands for the robot through inverse kinematics and retargeting algorithms. This process generates a rich, time-synchronized dataset containing video from the robot's onboard cameras at multiple viewpoints, the robot's complete state data (e.g., joint positions with encoder readings, velocities from differentiation, and torques from motor currents), proprioceptive signals from IMUs and force sensors, and the operator's motion data serving as supervision signals.

The tasks performed during real-world data collection can be designed to cover a wide range of applications with varying complexity levels, from industrial settings with precision to domestic environments demanding adaptability. This may include autonomous factory work with repetitive precision, such as sorting items on a production line with quality control, as well as common home chores requiring dexterity and planning like loading laundry into a washing machine with fabric handling, folding clothes with bimanual coordination, loading a dishwasher with object arrangement, or tidying a room with scene understanding. These demonstrations provide the model with direct experience of physical interaction including contact establishment and maintenance, contact dynamics with force modulation, friction effects on grasping, compliance for safe interaction, and the specific kinematics of the robot's body through joint limit awareness. This real-world data proves invaluable for fine-tuning the model through supervised learning, bridging the sim-to-real gap through domain adaptation, and ensuring that the final BAM can be safe through collision avoidance, effective through task completion, and reliable through consistent performance when deployed on the physical humanoid robot in unstructured environments.

c. Training of the BAM

As discussed above in connection with FIG. 10, the process may start with the selection or generation of the deployment configuration determining computational resource allocation, the architecture defining model connectivity and information flow, and the model types specifying inductive biases and learning paradigms in step 3008.2.22. An example of the selections and/or generations that may be performed may include: (i) selecting a deployment configuration where an Alpha model(s) 3008.2.20A-N runs on a first GPU installed within the robot's torso 1, 2700A-X, and a Beta model(s) 3008.2.22A-N runs on a second GPU installed within the robot's torso 1, 2700A-x (as shown in FIG. 17B), (ii) identifying a two-model architecture with hierarchical processing, wherein a single Alpha model 3008.2.20A-N is connected to a single Beta model 3008.2.22A-N via a latent vector (as shown in FIG. 17B), and (iii) obtaining a VLM that was trained on internet data using a cross-entropy loss function and outputs discrete data (as shown in FIG. 18), along with generating a cross-attention encoder-decoder transformer that was trained on robot teleoperation demonstrations using a regression loss function and outputs continuous floating-point numbers representing control signals (as shown in FIG. 19).

In addition to the selection or generation of these foundational elements, a designer may process, refine, structure, and enrich the collected training data through comprehensive preprocessing pipelines in step 3004. This preprocessing stage may involve annotation and labeling with semi-automated tools (e.g., utilizing an AM model as described in Ser. No. 19/351,294, which is hereby incorporated by reference), where video data is segmented into distinct, meaningful segments using shot detection algorithms, with each segment marked by timestamps that are aligned across various sensors to ensure temporal consistency. These segments can then be assigned detailed natural language descriptions, generated by vision-language models, that explain the actions and interactions occurring within them, including object states, contact events, and indicators of task progress. The entire task trajectory may also be labeled with its final outcome through automated evaluation, such as "success" based on task completion metrics or "failure" with accompanying diagnostic information. This outcome labeling permits the model to learn from both positive and negative examples through contrastive learning, which helps it to distinguish between effective and ineffective action sequences. Other preprocessing techniques may include random sampling with stratification to create manageable training sequences from long demonstrations while preserving task diversity, and trajectory filtering, which uses quality metrics to remove low-quality or irrelevant data, such as trajectories with significant occlusions detected through visibility analysis or noisy sensor readings identified via statistical outlier detection.

Other processing, refining, or structuring of the training data may include or exclude: (i) event-triggered slicing of multi-sensor streams (contact/fault/state-change) with precise temporal alignment, (ii) calibration handling (intrinsic/extrinsic updates with distortion correction, drift compensation through sensor fusion), (iii) quality control and curation (de-duplication using perceptual hashing, outlier removal with statistical methods, missing-data imputation through interpolation, checksum validation for data integrity), (iv) signal cleanup (denoising/smoothing with Kalman filtering, detrending removing systematic biases, artifact suppression eliminating sensor glitches), (v) event/binning at byte or packet level (burst or keyframe-grouped bins) for efficient storage, (vi) kinematic reconstruction (forward/inverse kinematics solving joint configurations, twist/wrench computation for velocity and force), (vii) derived signals (contact state from force thresholds, center-of-pressure from force distribution, occupancy/height maps from depth sensors, SDFs from point clouds, cost/reward traces from task objectives), (viii) sequence/trajectory assembly with teacher-forcing or rollout annotations for supervised learning, (ix) self-supervised target generation (masking/denoising targets for reconstruction, contrastive pairs/triplets for metric learning, next-step prediction for dynamics modeling, temporal order/reversal for sequence understanding), (x) weak/explicit labeling (heuristics from domain knowledge, simulation providing perfect labels, programmatic rules encoding priors, human annotation for ground truth), (xi) data augmentation and domain randomization (spatial/photometric/temporal/viewpoint/dynamics variations; noise injection, cutout/mixup for robustness), (xii) balancing and sampling strategies (class/scene balance addressing skew, curriculum sampling with increasing difficulty, hard-negative mining focusing on errors), (xiii) compression and quantized feature caches (e.g., NF4/FP8/INT8) for storage/throughput optimization, (xiv) privacy/security filtering (anonymization removing identifiers, PII/PHI redaction for compliance, access-control tagging for permissions), (xv) metadata/provenance attachment (sensor IDs for tracking, calibration versions for reproducibility, environment/task/policy tags for organization), (xvi) retrieval indices and memory tables for RAG-style conditioning enabling knowledge grounding, (xvii) teacher/assistant signal preparation for distillation (logits as soft targets, intermediate features for matching, attention maps for structure transfer), (xviii) dataset partitioning (train/val/test with no leakage, temporal/domain/robot splits for generalization evaluation), (xix) online/streaming ingestion with back-pressure and late-bound labeling for continuous learning, (xxi) any combination thereof creating comprehensive pipelines, (xxii) any processing, refining, or structuring disclosed in a paper that is incorporated herein by reference advancing best practices, and/or (xxiii) any processing, refining, or structuring that is obvious to one of skill in the art.

Data augmentation may also be employed to enhance the dataset with temporal and sensory context. This can include creating a vision memory by providing the model with a sequence of recent video frames, rather than a single frame, to improve its understanding of dynamic scenes and motion. Similarly, a state history, comprising a temporal window of past robot or human tracking states, can be used to provide context for generating smoother and more reactive motions that are informed by recent velocity and acceleration. The input observations may also be augmented by integrating force feedback data from tactile or force sensors, providing the policy with a sense of touch to better modulate its physical interactions and handle delicate objects. Furthermore, when training with mixed datasets of human and robot data, data alignment techniques may be used to bridge the embodiment gap. This can involve removing robot-specific state information or randomly masking sensor data fields that are not present in human data, which forces the model to learn from the shared data streams, such as camera images, and improves its ability to generalize behaviors across different physical forms.

The core process of creating the BAM begins with the ingestion of training data in step 3010. Said ingestion may focus on data modifications that alter the prepared training data into information that can be consumed in the process of training the BAM, wherein said data modifications include: (i) tokenization/discretization into discrete IDs (e.g., BPE/WordPiece/Unigram for text; vector-quantized codes via VQ-VAE/RVQ, product/k-means codes for images/audio/features); (ii) patchification/tiling of images or video (fixed-size patches/tubelets) and linear projection to embedding dimension; (iii) framing/windowing of time-series or audio with fixed hop sizes; (iv) padding/truncation and bucketing to normalize sequence lengths, with optional special markers (CLS/SEP/BOS/EOS); (v) feature scaling/normalization (per-channel mean-std, min-max, whitening, log scaling, clipping to valid ranges); (vi) rate conversion/resampling and time alignment/interpolation to common sampling grids; (vii) precision casting/quantization of inputs (e.g., float32→bfloat16/float16 or INT8) for compute compatibility; (viii) embedding/projection layers that map continuous inputs (pixels, forces, IMU, tabular fields) to fixed-width vectors; (ix) positional/temporal encodings (sinusoidal/learned, rotary/relative) appended or fused with inputs; (x) coordinate-frame canonicalization (e.g., transforming sensor/EE frames to a world frame; centering/orienting 3D data; unit-cube/sphere normalization); (xi) serialization to tensor layouts for the backbone (e.g., (B,T,D), (B,C,H,W), contiguous memory; ragged/sparse tensors as needed); (xii) graph construction for GNNs (node-feature matrices, edge index/adjacency in COO/CSR; batching with graph IDs); (xiii) 3D representation building (voxel/TSDF grids, occupancy/SDF fields, ray bundles for NeRF, point-cloud subsampling/quantization, mesh→point/graph conversion, normal maps); (xiv) audio representations (STFT/mel spectrograms, MFCCs, magnitude/phase splits) normalized to model-specific ranges; (xv) label/target encoding into model-readable forms (class indices, one-hot/multi-hot, normalized boxes/segments, heatmaps/keypoints, regression tensors); (xvi) masking/corruption transforms that generate masked inputs for masked-modeling objectives (e.g., MLM/MAE span masks) while preserving model-expected shapes; (xvii) multimodal fusion prep (time-locking modalities, length-matching via padding/resampling, channel/time concatenation, or projection into a shared embedding space); (xviii) sparsity formats (structured/unstructured indices) for sparse backbones or memory-efficient loaders; (xix) value/unit harmonization (unit conversions, bias/offset removal) to match learned scaling; (xx) sample/chunk packaging into fixed, indexed records (shards/TFRecord/WebDataset/LMDB) that present tensors and metadata in the exact shapes and types the network expects; and/or (xxi) any combination thereof, any method of ingestion that is disclosed in papers that are incorporated herein by reference, and/or any other method that is obvious to one of skill in the art based on this disclosure.

Once the training data has been ingested in step 3010, a training methodology can be applied to generate the BAM in step 3012. Said training methodology includes a learning method and a loss function/reward. The learning methods may include: (i) supervised learning techniques (e.g., classification, regression, behavior cloning, etc.), (ii) unsupervised learning (e.g., clustering, dimensionality reduction, anomaly detection, etc.), (iii) transfer learning (e.g., by leveraging pre-trained models), (iv) reinforcement learning (e.g., model-free methods, model-based methods), (v) semi-supervised learning (e.g., training with labeled and unlabeled data), (vi) any combination thereof, and/or (vii) any method that is disclosed in papers that are incorporated herein by reference, and/or any other method that is obvious to one of skill in the art based on this disclosure.

After a general learning method is selected, the designer can then select a loss function or develop a reward function. Examples of loss functions that may be selected can include: (i) cross-entropy (with label smoothing) and BCE-with-logits, (ii) negative log-likelihood (token-level NLL, perplexity), (iii) focal loss and Hinge/Max-margin, (iv) regression losses (MSE/L2, MAE/L1, Huber/Smooth-L1, Charbonnier, Log-cosh), (v) segmentation/detection losses (Dice, IoU/Jaccard, Tversky/Focal-Tversky, Lovász-Softmax; box L1/GIoU/DIoU/CIoU), (vi) metric/contrastive losses (Triplet, Contrastive, N-pair, Circle, Center; Cosine-similarity; ArcFace/AAM-Softmax, CosFace), (vii) self-supervised objectives (InfoNCE/NT-Xent, BYOL/Barlow Twins/DINO; masked-modeling MLM/MAE reconstruction), (viii) autoregressive maximum-likelihood (teacher-forcing NLL, sequence-level risk), (ix) VAE objectives (ELBO, B-VAE, KL annealing/free-bits), (x) GAN losses (non-saturating/logistic, Hinge, LS-GAN, WGAN-GP, Relativistic GAN), (xi) normalizing-flow likelihood (exact log-likelihood/bits-per-dim, FFJORD), (xii) diffusion/score matching ($\varepsilon$-prediction MSE, v-param, $x_o$-prediction, VLB, consistency/distillation), (xiii) audio/speech losses (STFT/multi-res STFT, spectral convergence, SI-SDR/SI-SNR with PIT, CTC, RNN-T), (xiv) 3D/geometry losses (Chamfer, EMD, point-to-surface, normal consistency, Eikonal/SDF, occupancy BCE), (xv) Perceptual/quality losses (feature/VGG, LPIPS, SSIM/MS-SSIM, total variation), (xvi) tokenizer/codebook losses (VQ commitment/codebook/EMA, Gumbel-Softmax straight-through), (xvii) distillation losses (temperature-scaled CE, KL to teacher, intermediate feature/attention transfer), (xviii) regularization terms (weight decay/L2, L1/Group-Lasso, dropout, spectral norm, orthogonality, gradient penalty, Jacobian/contractive, entropy/confidence penalties), (xix) RL policy losses (REINFORCE, PPO-Clip with value and entropy, TRPO, $A_2C$/$A_3C$), (xx) RL value/Q losses (TD error for DQN/Double-DQN, critic losses for DDPG/TD3, SAC entropy-regularized objective), (xxi) imitation learning losses (behavior cloning CE, GAIL discriminator, inverse RL), (xxii) any combination thereof, any method disclosed in papers that are incorporated herein by reference, or any method that is obvious to one of skill in the art based on this disclosure.

In a first example, the designer of a BAM that outputs actions in a discretized action space (e.g., discrete bins) may use a cross-entropy loss function or a negative log-likelihood (NLL) function to measure the difference between the predicted probability distribution over the action bins and the true action. In another example, the designer of the BAM that outputs actions in a continuous space may use a regression-based loss function such as mean absolute error (MAE or L1 loss) or mean squared error (MSE or L2 loss).

Additionally/alternatively, the following list of reward functions may be utilized: (i) task success and progress (sparse success, dense shaping, time penalties), (ii) safety and constraints (collisions and limit violations), (iii) control costs (action L2, energy/torque use, smoothness/jerk penalties), (iv) environment/resource rewards (throughput, latency, energy/battery, cost/revenue, risk/CVaR), (v) exploration and intrinsic motivation (entropy bonus, novelty counts, curiosity/prediction error, empowerment, information gain), (vi) preference-based/human-feedback rewards (pairwise preference models, rule-based shaping), (vii) imitation-derived rewards (inverse RL, GAIL/AIRL discriminator scores), (viii) metric-based rewards for perception/ NLP (BLEU/ROUGE/CIDEr, WER, F1, PSNR/SSIM), (ix) multi-objective composition (weighted sums, lexicographic ordering, constrained/Lagrangian optimization), (x) any combination thereof, and/or (xi) any method that is disclosed in papers that are incorporated herein by reference, and/or any other method that is obvious to one of skill in the art based on this disclosure.

Figure 21:
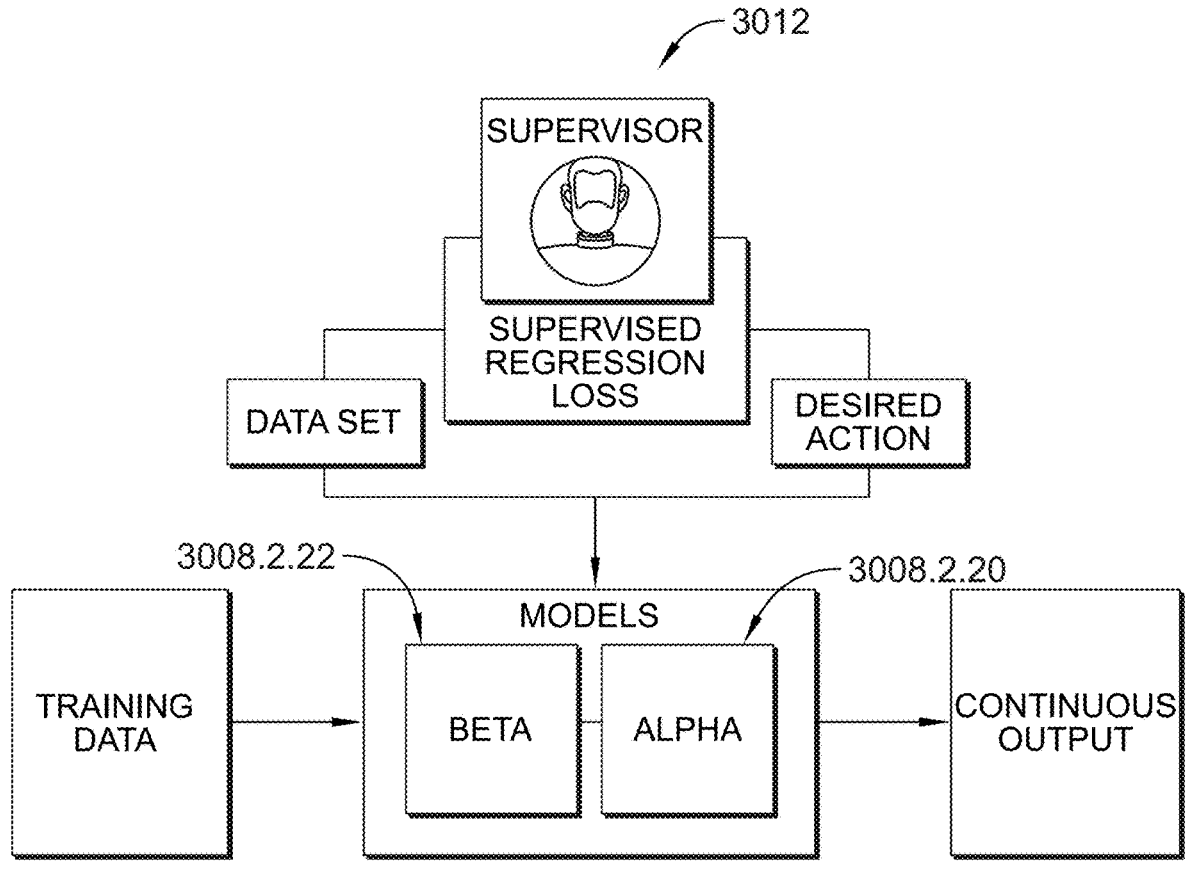
FIG. 21 is a diagram illustrating a training methodology that may be used in the generation of the BAM.

As shown in FIG. 21, The designer can then use the selected training methodology in connection with the previously obtained/generated components of the BAM to generate said BAM. For example, the designer may utilize supervised learning in order to modify the internal parameters of components (e.g., both the Alpha and Beta model(s) 3008.2.20A-N, 3008.2.22A-N) of the BAM in order to minimize the error between robot action predictions and the actual robot actions provided in the training data, thereby refining its ability to generate accurate and contextually relevant text and robot actions based on human commands, images, and other visual cues. Specifically, to train both the Alpha model 3008.2.20A and the Beta model 3008.2.22A end-to-end (e.g., from input of the Beta model 3008.2.22A, through the latent vector 3008.10.36, and to the output of the Alpha model 3008.2.20A), a batch of ingested training data is sampled from the preprocessed training dataset and fed to said Alpha and Beta models 3008.2.20A, 3008.2.22A at different frequencies. The observation or "data set," derived from the training data, may include a sequence of historical video frames, other sensor data, and the robot's state. The action or "desired action," also from the training data, may be represented by an action chunk, which is a sequence of target actions for the robot that extends over a future time horizon. The observation data from the batch is ingested by the network, and the BAM uses the resulting observations to predict an output action chunk. In various embodiments, observation data may be time-aligned to the action chunk using timestamps and interpolation, sensor inputs may be normalized to a fixed scale, and missing fields may be masked so that the BAM conditions on valid channels. The Beta model(s) 3008.2.22A may provide a token sequence indicative of task intent, which is embedded as a continuous (or discontinuous) latent vector that can capture visual token embeddings, task text tokens, and state features, and the Alpha model(s) 3008.2.20A-N may incorporate this latent vector through cross-attention to produce control trajectories. The models may process sequences with positional encodings, a defined context length, and a control rate that matches the robot controller update period, so that each element of the action chunk maps to a specific future step on the horizon.

The selected loss function can then be used to calculate the loss between the action chunk output by the Alpha model(s) 3008.2.20A-N and the expert action chunk from the demonstration data, which serves as the ground truth action. This calculated loss value quantifies the model's error for a given batch and is then backpropagated through the network. Specifically, the gradients of the loss with respect to the model parameters descend from the output of the Alpha model(s) 3008.2.20A-N back to its transformer network and then through the latent vector connection into the Beta model(s) 3008.2.22A-N. An optimization algorithm, such as Adam, is used to update the network weights in the direction that reduces the error. This training loop continues for many iterations, processing numerous batches of data until a convergence criterion is met, such as the training loss plateauing or after a predetermined number of epochs. The output of this process is a trained model capable of generating action chunks based on visual inputs.

In certain embodiments, the loss may combine a regression term on joint targets or task-space poses with a temporal smoothness penalty across the action chunk to encourage fluid motions, and may include a consistency term that aligns Beta outputs with Alpha-derived latent plans. The system may apply gradient clipping to prevent exploding gradients, weight decay as a form of regularization, and a learning-rate schedule with warmup and cosine decay to stabilize training. It may also use mixed precision for improved throughput on compatible hardware. Convergence may be assessed on a validation split using sequence-level metrics such as horizon-integrated error, collision flags computed by a kinematic model, and satisfaction of joint and velocity limits. The batch size, horizon length, and update frequency may be selected as hyperparameters to balance memory use and the stability of the BAM on long sequences.

In addition to supervised learning, unsupervised learning techniques can be employed to further enhance the BAM. These techniques do not rely on labeled robot actions provided in the training data but instead focus on identifying patterns and structures within the data itself, allowing the model to build a richer internal representation of the world. For example, the model can be trained using unsupervised methods such as clustering or self-supervised learning, where it learns to group: (i) similar human commands, (ii) similar visual and textual features, and (iii) predict missing parts of robot actions, images, or text. For instance, teleoperation data may be collected for a subset of waypoints for a given task or movement. The unsupervised learning techniques can then determine the missing waypoints for the given tasks or movements. This process helps the model develop a deeper understanding of the underlying relationships between robot actions and visual and textual information, making it more robust and adaptable to new, unseen data. In one approach, masked sequence modeling may be used over video tokens, state sequences, and action tokens so that the model reconstructs withheld segments. Additionally, contrastive objectives may align command text with visual clips and state descriptors. Latent dynamics models may also predict future state embeddings from observations, which may improve action inference when labels are sparse.

Transfer learning is another method that may be used to train the BAM. In this approach, the model is first pre-trained on a large, general-purpose dataset (e.g., web-scale text and images) and then fine-tuned on a smaller, domain-specific robotics dataset. This allows the model to leverage the vast knowledge acquired during pre-training, such as an understanding of objects and language, and apply it to more specialized robotics tasks, significantly reducing the amount of data and computational resources for training from scratch. Reinforcement learning can also be applied to fine-tune or train the BAM, particularly in scenarios where the model interacts with its environment and receives feedback on its performance. In this method, the model is trained to make decisions based on inputs, with the goal of maximizing a cumulative reward signal. This can involve methods like Q-learning, which learns the value of taking actions in particular states, or policy gradient methods like proximal policy optimization (PPO), which directly optimize the policy's parameters. A hybrid approach, reinforcement learning from human feedback (RLHF), can also be used, where human preferences shape the reward function, guiding the model towards more desirable and nuanced behaviors without needing a manually specified reward function. Over time, the model learns to generate robot actions that not only accurately move the robot to the desired position but also minimize the cost (e.g., battery consumption, avoiding singularities) in doing so.

Finally, semi-supervised learning techniques can be utilized to fine-tune or train the BAM when only a limited amount of labeled robot actions is available. In this approach, the BAM is trained on a combination of labeled robot actions and unlabeled input data, allowing it to learn from the labeled data while also extracting useful information and structure from the unlabeled data. This method can improve the model's generalization capabilities and reduce the reliance on large, annotated datasets, making it more efficient and scalable. In various embodiments, the reward may include penalties for torque, jerk, and proximity to joint limits, along with task completion bonuses and safety margins based on distance fields. On-policy rollouts may occur in simulation with domain randomization over textures, lighting, mass, and friction, and off-policy updates may draw from a replay buffer seeded with teleoperation trajectories. Human feedback for RLHF may be gathered as pairwise preferences over short clips of behavior, with an aggregation process that yields a learned reward model used to fine-tune the policy. Additionally, it should be understood that the designer may freeze certain layers, features, portions, or models during training. For example, the designer may freeze the Alpha model(s) 3008.2.20A-N after a predefined time/number of training cycles, while continuing to train the Beta model(s) 3008.2.22A-N. Likewise, the designer may freeze the Beta model(s) 3008.2.22A-N after a predefined time/number of training cycles, while continuing to train the Alpha model(s) 3008.2.20A-N.

Following the initial training, the BAM may undergo an iterative process of testing and evaluation to validate and improve its performance. The BAM may be deployed on a physical or simulated humanoid robot, which is then monitored as it attempts to perform a manipulation task autonomously. If the task is performed successfully, the BAM is considered validated for the encountered states. If the robot fails to complete the task, a process for collecting corrective demonstrations may be initiated. In this process, an operator may take control of the robot from the failure state and provide a new, expert demonstration showing the correct sequence of actions to recover and complete the task. This new corrective demonstration is then added to the original training dataset, and the model is retrained on this enriched dataset. This iterative loop of testing, collecting corrective data from failure states, and retraining allows the BAM to be progressively improved, making it more robust and capable of handling a wider range of situations. Evaluation may track success rate, path efficiency, contact forces, and time to completion, and logs may include synchronized video, proprioception, and controller signals for audit and replay. The system may stage deployments from simulation to a lab mockup and then to target environments, with versioned BAM artifacts and rollback plans, and dataset aggregation may bias sampling toward states that produced prior errors to speed correction.

Following the validation process, the BAM can be further refined through an optional fine-tuning process. Optionally, one or more features of the received training data may be modified, for example, by using a simulation engine to alter backgrounds, objects, or environmental characteristics in the training images. The BAM can be iteratively trained using this modified data, a technique often referred to as simulation-to-real (sim-to-real) transfer. This iterative training can involve a variety of fine-tuning strategies to adapt the general-purpose pretrained model to specific tasks, environments, or embodiments. In one configuration, the simulation engine may vary camera pose, lens parameters, illumination, object placement, textures, and physics coefficients within set ranges to generate domain-randomized scenes. This exposure to a wide variety of synthetic data helps the model become more robust to real-world variations while preserving action labels through pose retargeting. Data augmentation may include geometric transforms, cutout masks, and paraphrasing of text commands, and the system may rebalance class frequency to expose the BAM to rare but operationally relevant states. Sensor calibration and time offset correction may be applied so that observation aligns with desired action across all synthetic and real sequences.

One effective strategy for fine-tuning is co-finetuning, where the model is trained on a mixture of its original, large-scale pretraining data (e.g., internet-scale image and text data) and the smaller, domain-specific robotics dataset. This approach may help prevent catastrophic forgetting, where the model loses its general knowledge while specializing on new data, thereby enhancing its ability to generalize to novel situations by retaining a broad foundation of understanding. For large models, full fine-tuning of all parameters can be computationally prohibitive. In such cases, parameter-efficient fine-tuning (PEFT) methods may be employed. Techniques such as low-rank adaptation (LoRA) introduce a small number of trainable parameters in the form of low-rank matrices into the model, allowing for efficient adaptation without updating the entire set of original model weights, which remain frozen. Other efficiency-focused techniques include model quantization, which reduces the precision of the model's weights (e.g., from 32-bit to 8-bit or 4-bit integers) to decrease its memory footprint and accelerate inference speed. Mixture sampling for co-finetuning may use a fixed ratio or a curriculum that increases the share of domain data over time, and replay of pretraining examples may be chosen based on similarity to current tasks. LoRA ranks may be set per layer and targeted to attention and feedforward blocks, while the base weights remain frozen so that the deployment footprint stays stable. Quantization may use per-channel scaling with 8-bit or 4-bit weights and calibrated activation ranges, and knowledge distillation from a larger teacher model may align logits or intermediate features.

This optional iterative fine-tuning process can also be used to teach the BAM to generalize tasks and actions from specific instances to broader skills. For instance, a model initially trained to pick up a specific cup can be further trained on a diverse set of objects of varying shapes, sizes, and materials to learn a general "pick up" skill applicable to objects it has never seen before. This may involve training on a task-oriented subset of data or using corrective demonstrations collected from task failures to progressively improve the BAM. Finally, the fine-tuned BAM can be returned, ready for deployment on a humanoid robot. In various embodiments, skills may be encoded as goal-conditioned policies that accept object descriptors, pose targets, or language goals as input, and the action chunk may incorporate gripper control, force setpoints, and end-effector velocities. The deployment artifact may include the BAM, configuration files, normalization statistics for observation 4006 and desired action 4008, safety envelopes based on reachable workspace and load limits, and interface shims for common robot controllers, so that integration with existing control stacks proceeds with consistent reference numbers and terminology.

d. Deployment of BAM

After the comprehensive training and optional fine-tuning processes are complete, the resulting BAM or a portion thereof can be transferred and installed onto the robot 1, 2700A-X for evaluation, testing, and runtime execution. This deployment phase represents the transition from model development to practical application, enabling the robot 1, 2700A-X to leverage the learned policies to perceive its environment, understand commands, and perform tasks autonomously in the physical world. Taking an example BAM with architecture 3008.10 (as shown in FIG. 17A), once deployed, the Beta model 3008.2.22A-N may be configured to run on a first GPU located within the robot's torso, while the Alpha model 3008.2.20A-N may be configured to run on a second GPU that is also located within the robot's torso. This onboard, edge execution of both the Alpha and Beta models 3008.2.20A-N, 3008.2.22A-N facilitates the low-latency, real-time inference that supports fluid and responsive physical interaction, which is a key attribute for operating safely and effectively around humans or in dynamic environments. This configuration represents a significant departure from conventional systems that rely on offboard processing and offers a solution to the technological challenge of equipping robots with generalized reasoning capabilities without introducing performance-degrading latency.

Figure 22:
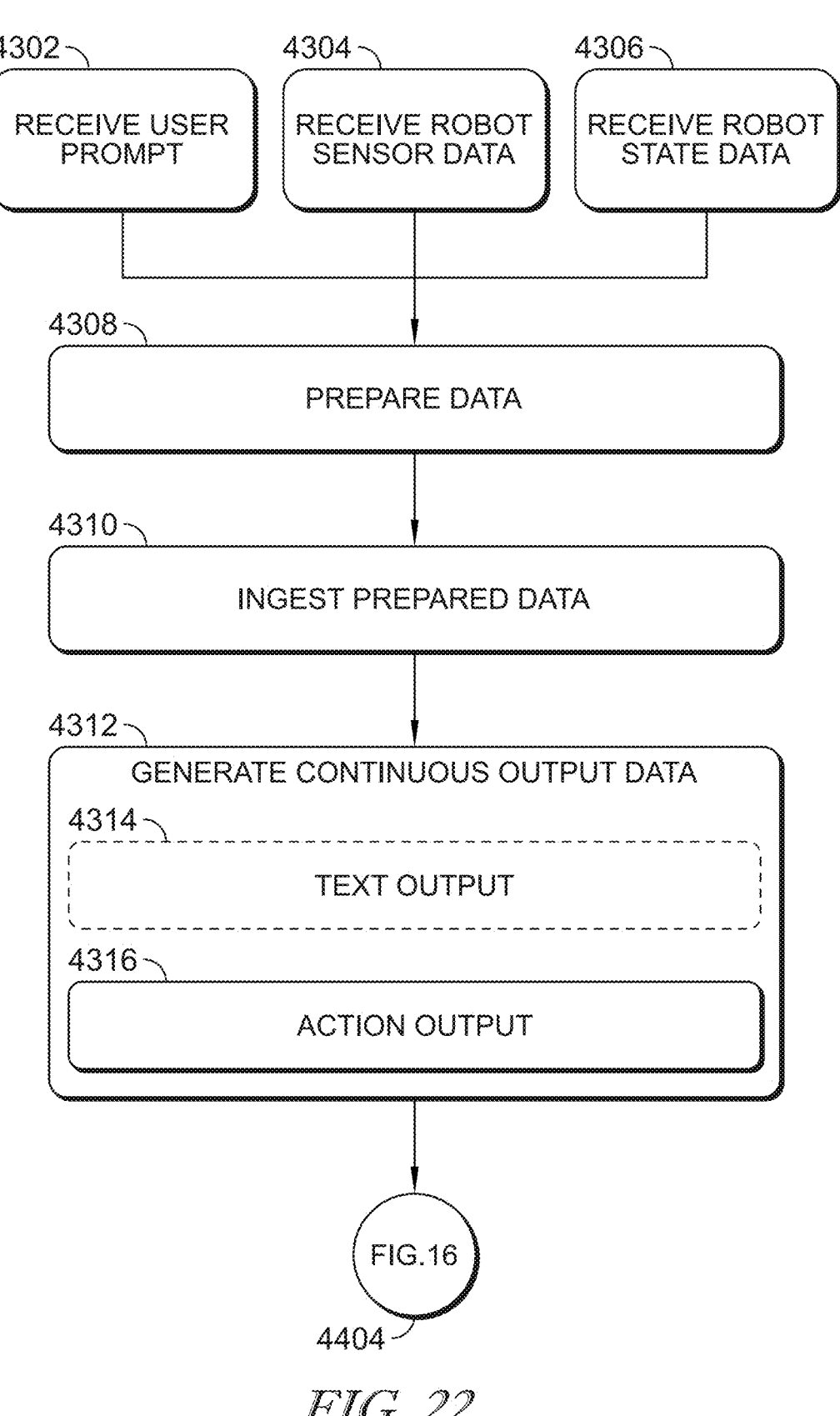

FIGS. 22-23 show flowcharts of a robot action-determining process for generating humanoid controls using a trained BAM during its runtime operation. This process is designed as a continuous, closed-loop system that may be performed to determine and provide an initial position or rotational change for the humanoid robot, and then iteratively feed the robot's subsequent state back into the BAM along with additional robot sensor data and prompt data to determine the next sequence of actions. At the start of each cycle in the process, the robot 1, 2700A-X receives multiple streams of data from its surroundings and internal state. For example, the robot 1, 2700A-X may receive a user prompt (as shown in block 4302 of FIG. 22), which can be a high-level task, such as a spoken or natural language command from a human operator (e.g., "please pick up the red block and place it in the box"). Simultaneously, it may receive a stream of robot sensor data (as shown in block 4304 of FIG. 22) from the robot's various onboard sensors 1.2.8, such as cameras and IMUs, providing a real-time perception of the external environment. In addition to generating or obtaining the prompt and sensor data, the robot 1, 2700A-X also generates robot state data (as shown in block 4306 of FIG. 22), which may include detailed proprioceptive information about the robot's current physical configuration, such as joint angles and end-effector positions, and may also include historical state data from previous timesteps.

At step 4308, the diverse, multimodal data can be prepared using any aspect of the above-described methods for preparing training data. After preparation, the data can be ingested by the BAM at step 4310. This ingestion may include any aspect of the above-described methods for ingesting training data. In an example, text-based prompts can be converted into a sequence of language embeddings, while visual data from the robot's cameras may be processed through a vision model, such as a CNN or ViT, to generate a corresponding set of image embeddings. Similarly, the robot's numerical state data can also be encoded into a vector representation, e.g., by an MLP. The BAM may then employ sophisticated mechanisms, such as cross-attention, to align and fuse these different token streams. This allows the model to form a unified, context-rich understanding of the task, enabling it to effectively understand and react to the complex relationships between the linguistic command, the visual scene, and the robot's physical state.

Upon ingesting and processing the input data, the BAM generates continuous output data (as shown in block 4312 of FIG. 22). This continuous output data may be multifaceted and may include text data (as shown in block 4314 of FIG. 22), which could be transformed into a spoken response to the user for clarification or confirmation (e.g., "Do you mean the small red block on the left?"), and/or a detailed action output (as shown in block 4316 of FIG. 22), which contains the motor commands for the robot. The motor commands may include: (i) position information (e.g., the position of each Degree of Freedom (DoF) in a 62 DoF system-X, Y, Z), (ii) location(s), (e.g., action space location for each of the 62 DoFs), (iii) actuator or motor current(s) (e.g., current for each actuator or motor that controls an extent of the 62 DoFs), (iv) actuator or motor torque(s) (e.g., torque for each actuator or motor that controls an extent of the 62 DoFs), (v) actuator encoder value(s) (e.g., encoder value for each actuator or motor that controls an extent of the 62 DoFs), (vi) changes in position information (e.g., changes for each of the 62 DoFs—$\Delta X$, $\Delta Y$, $\Delta Z$), (vii) changes in location(s) (e.g., changes in the action space locations for each of the 62 DoFs), (viii) changes in actuator or motor current(s) (e.g., changes in current for each actuator or motor that controls an extent of the 62 DoFs), (ix) changes in actuator or motor torque(s) (e.g., changes in torque for each actuator or motor that controls an extent of the 62 DoFs), (x) changes in actuator encoder value(s) (e.g., changes in encoder value for each actuator or motor that controls an extent of the 62 DoFs), (xi) rotational position information (e.g., rotational position of 62 DoFs—$A°$, $B°$, $C°$), (xii) rotational location(s) (e.g., action space rotational locations for each of the 62 DoFs), (xiii) changes in rotational position information (e.g., position of each of the 62 DoFs—$\Delta A°$, $\Delta B°$, $\Delta C°$), (xiv) changes in rotational location(s) (e.g., changes in rotational action space locations for 62 DoFs), (xv) any combination of the above, or (xvi) any value or metric that is obvious to one of skill in the art based on the above disclosure. In other words, the BAM(s) can: (i) receive: (a) input data from a human user (e.g., speech), (b) sensor data from the robot, and (c) state data (e.g., proprioception); (ii) process the received data; and (iii) output: (a) speech, and/or (b) actions or positional changes for the robot 1, 2700A-X to execute to accomplish a given task.

It should be understood that the outputs may be any numerical value, including any positive or negative floating-point number. Further, it should be understood that the BAM may be modified to output any number of arrays, wherein each array can be used to control a DoF. For example, if the BAM provides 62 arrays for the 62 DoFs of the robot, and each array includes 6 values (e.g., for position and rotation), then the BAM is generating 372 values per timestep. In other embodiments, the BAM may generate only a single array that includes 7 values for a single end-effector. Furthermore, the BAM may generate fewer than 15 arrays that can control 62 DoFs, wherein the WBC 1550 can use inverse kinematics to generate the missing values for the full-body pose. For example, the robot may not need the position and rotation of J3 or J5 from the BAM if the BAM has provided values for J1, J2, J4, and J6. In other words, the number of arrays populated by the BAM's outputs may be less than the total number of DoFs in the robot 1, 2700A-X, while the BAM is still able to control the robot 1, 2700A-X.

Optionally, this continuous output may be further processed by applying an action chunking algorithm (as shown in block 4404 of FIG. 23). This technique groups the continuous output into a sequence of actions that span a future time horizon, which helps to ensure that the robot's resulting movements are smooth, coherent, and temporally consistent, rather than being a series of disjointed, reactive movements.

At step 4406, a set of low-level humanoid controls is generated based on the continuous output or the processed action chunk. This translation from high-level actions (the 'what') to low-level motor commands (the 'how') may be handled by the whole body controller 1550, which can apply sophisticated waypoint algorithms, cost functions, and kinematic constraints, such as joint limitations, to ensure that the robot moves in a manner that is both efficient and physically plausible. In other embodiments, the step that may be performed by the whole body controller 1550 may be omitted, and the BAM may be trained to directly output the low-level humanoid controls.

Before these controls are sent to the robot's hardware, the controller may also perform a series of rigorous safety checks on the generated controls (as shown in block 4408 of FIG. 23). These optional checks act as a final validation gate and are designed to validate the feasibility and stability of the planned movements. This includes confirming that the robot is physically capable of moving according to the specified controls without exceeding its joint limits or kinematic constraints (as shown in block 4410 of FIG. 23), and also verifying that the planned trajectory will not result in a collision with other objects in the environment or with the robot's own body through self-collision checking (as shown in block 4412 of FIG. 23). If any of these checks fail, an error can be signaled, and the entire action-determining process may be repeated with updated sensor data to generate a new, stable, and valid plan.

Once the generated humanoid controls have been thoroughly validated, they are executed to cause the robot to move accordingly (as shown in block 4414 of FIG. 23). This final step involves converting the validated controls into precise electrical signals that are sent to the robot's actuators, thereby producing the desired physical movements. As the robot performs the current action, its new state, along with fresh sensor data from its environment, is continuously captured and returned to the computing system for further processing (as shown in block 4416 of FIG. 23). This information then feeds back into the start of the control loop (as shown in block 4306 of FIG. 22), initiating the next cycle of the action-determining process. This iterative, closed-loop process of receiving multimodal inputs, determining the next best action, and executing the corresponding controls allows the robot to seamlessly perform complex, long-horizon tasks while dynamically adapting its movements in real-time in response to changes in its environment or unexpected events.

i. An Example Hierarchical BAM

Figure 24:
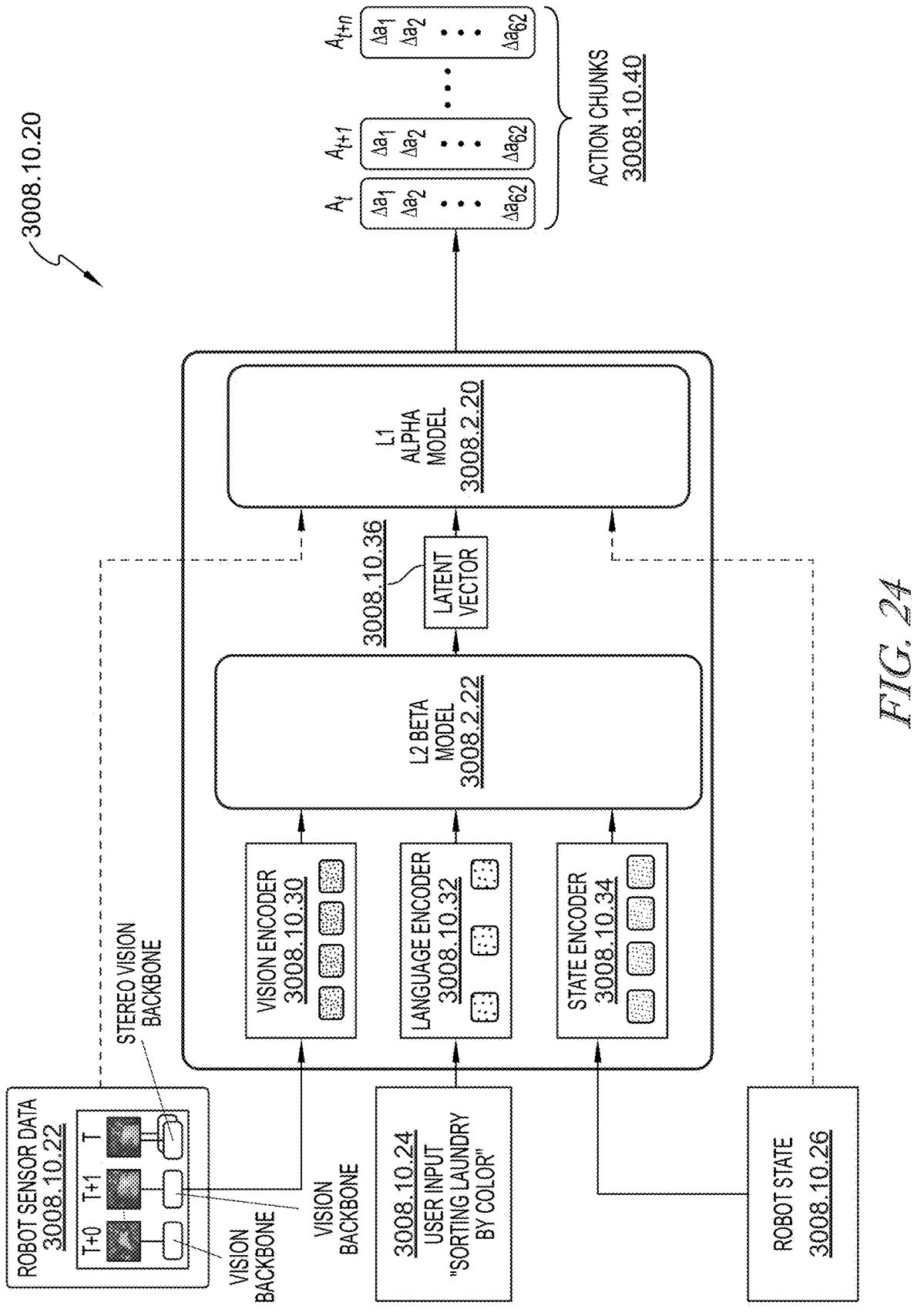
FIG. 24 is a graphical diagram illustrating the process of using the BAM to output robot actions, as described by the flowcharts in FIGS. 22-23.

FIG. 24 illustrates a deployed two-layer hierarchical Bipedal Action Model (BAM) 3008.10.20. This exemplary embodiment showcases a layered architecture where a Beta model 3008.2.22A-N performs high-level semantic reasoning and planning, while an Alpha model 3008.2.20A-N executes fast, reactive control. The system 3008.10.20 continuously receives multimodal inputs, including robot sensor data 3008.10.22, which may comprise a history of recent image frames from onboard cameras, and proprioceptive robot state information 3008.10.26, such as joint angles and end-effector poses. Concurrently, a user input 3008.10.24, such as a natural language command, is also received. This raw sensory and command data is processed by a set of encoders. A vision encoder 3008.10.30 processes the robot sensor data 3008.10.22, a language encoder 3008.10.32 processes the user input 3008.10.24, and a state encoder 3008.10.34 processes the robot state 3008.10.26. These three streams of encoded information are then fed into the Beta model(s) 3008.2.22A-N of the deployed BAM 3108.

The Beta model 3008.2.22A-N may be a large Vision-Language Model (VLM) with a substantial parameter count, for example, a model with between 500 million and 200 billion parameters, built upon an open-source backbone pretrained on internet-scale data. This model 3008.2.22 may be configured to operate at a relatively low frequency, for example, between 0.1 and 20 Hz, allowing it to perform complex scene understanding and language comprehension, an operation analogous to "thinking slow." The Beta model 3008.2.22A-N takes as input the tokenized streams from the vision encoder 3008.10.30, language encoder 3008.10.32, and state encoder 3008.10.34. It processes these multimodal inputs to distill all task-relevant semantic information into a token sequence that can be embedded as a single, continuous latent vector 3008.10.36. This latent vector 3008.10.36 encapsulates the high-level behavioral intent derived from the user's command and the current state of the world, serving as a compressed, abstract representation of the desired action. This latent vector 3008.10.36 is then passed to the Alpha model(s) 3008.2.20A-N to condition its low-level actions, acting as the primary communication channel between the two hierarchical layers.

The Alpha model 3008.2.20A-N may be a fast, reactive visuomotor policy, for instance, a smaller autoregressive transformer network, such as a cross-attention encoder-decoder transformer with between 10 million and 350 million parameters. This model is designed to operate at a very high frequency, for example, 50-200 Hz, or to "think fast," translating the latent semantic representations from the Beta model 3008.2.22A-N into precise, continuous robot actions. The Alpha model 3008.2.20A-N may optionally receive the same image and state inputs as the Beta model 3008.2.22A-N, but it may process them at this much higher frequency to enable responsive, closed-loop control for dynamic corrections. The latent vector 3008.10.36 from the Beta model 3008.2.22A-N is projected into the Alpha model's token space and concatenated with the visual features from the Alpha model's own vision backbone. The output of the Alpha model 3008.2.20A-N is a series of parallel-generated action chunks 3008.10.40, which may represent a sequence of future actions from $A_t$ to $A_{t+n}$. An action $A_t$ may be a matrix $(\Delta a_1, \ldots, \Delta a_{35})$, where each row $\Delta a_i$ corresponds to the desired change for a specific degree of freedom of the robot, such as a vector representing changes in position and orientation $(\delta x, \delta y, \delta z, \delta\theta_x, \delta\theta_y, \delta\theta_z)$ for a joint.

The full matrix $A$, may have a row dimension of 62, corresponding to all 62 degrees of freedom of the robot. For upper body control, this matrix may cover 35 degrees of freedom, including wrist poses, finger flexion, and torso orientation. Further, this matrix may correspond to any number of actuators contained in the robot 1, 2700A-X. This sequence of action chunks 3008.10.40 may cover a short future time horizon, for example, the next 1 milliseconds to 1 second (preferably between 50 and 150 or 200 milliseconds), and is sent to the robot's low-level controllers for execution. This action chunking technique allows the model to predict a sequence of future actions in a single inference step, reframing the learning problem from low-level mimicry to high-level trajectory generation.

In some implementations, the Beta model 3008.2.22A-N and the Alpha model 3008.2.20A-N may be trained end-to-end. In this training paradigm, data from a variety of tasks is utilized to train the entire hierarchical system jointly, rather than training each component in isolation. A standard regression loss may be used, mapping from raw pixels and text commands to continuous actions. For a given user command, for example "sorting laundry by color," the Beta model 3008.2.22A-N may leverage its large scale and pre-trained knowledge to perform complex reasoning, potentially through a chain-of-thought (CoT) process, to fully understand the command's intent. For example, the Beta model 3008.2.22A-N may reason that the task involves not just sorting, but sorting based on the specific visual attribute of color, and then plans the high-level actions accordingly. This reasoned intent is encoded into the latent vector 3008.10.36. During end-to-end training, the gradients from the Alpha model's output can be backpropagated through the Alpha model 3008.2.20A-N and continue all the way back into the Beta model 3008.2.22A-N. This allows for the joint optimization of both components, enabling the Beta model 3008.2.22A-N to learn how to generate latent representations that most effectively condition the Alpha model's behavior, thereby creating a tightly coupled system where high-level reasoning directly informs low-level physical execution. To better align training conditions with real-world deployment, a temporal offset may be introduced between the inputs to the Alpha and Beta model(s) 3008.2.20A-N, 3008.2.22A-N during training, calibrated to match the difference in their inference latencies when deployed.

ii. Action Chunking

Action chunking represents a technique where an Alpha model 3008.2.20A-N predicts and executes a sequence of multiple future actions in a single inference step, rather than generating one action at a time. The Alpha model 3008.2.20A-N can make a single, complex decision to predict a sequence, or "chunk," of k future actions. This chunk typically represents the target robot states (e.g., joint positions), or changes from current states for the next k timesteps. The robot then executes this sequence of actions, either fully or partially, before the Alpha model 3008.2.20A-N is queried again for the next chunk. This method reframes the learning problem from low-level mimicry of individual waypoints to high-level trajectory generation, which is well-suited for sequence modeling architectures like the transformer that excel at handling sequential data.

The use of action chunking may provide several key benefits for robotic control. A primary advantage is the mitigation of compounding errors, a common problem in imitation learning where small, independent prediction errors accumulate over successive timesteps, causing the robot to significantly deviate from the desired trajectory. By predicting a sequence of k actions at once, the BAM makes k times fewer independent decisions, which reduces the opportunities for these errors to compound and effectively shortens the temporal horizon of the task from the model's perspective. Action chunking can also help handle non-Markovian behaviors often present in human demonstration data, such as pauses or anticipatory movements, by allowing the BAM to implicitly model temporal information and context within the action sequence itself. Furthermore, it can enable high-frequency robot control (e.g., 500 Hz) with low-frequency inference from large, computationally intensive models. The BAM can operate at a reduced frequency (e.g., 10 Hz) and at each step output a chunk of actions, while a low-level controller can execute them at a much higher frequency to ensure smooth and stable motion. Action chunking may also introduce a trade-off between temporal consistency and short-term reactivity. Longer action chunks result in smoother, more consistent motion but make the system less responsive to unexpected environmental changes that occur mid-chunk. Conversely, shorter action chunks allow for more frequent replanning and greater reactivity, but can increase the risk of compounding errors. The optimal chunk size, therefore, may depend on both the specific task and the latency of the model, thus requiring careful adjustments.

Figure 25:
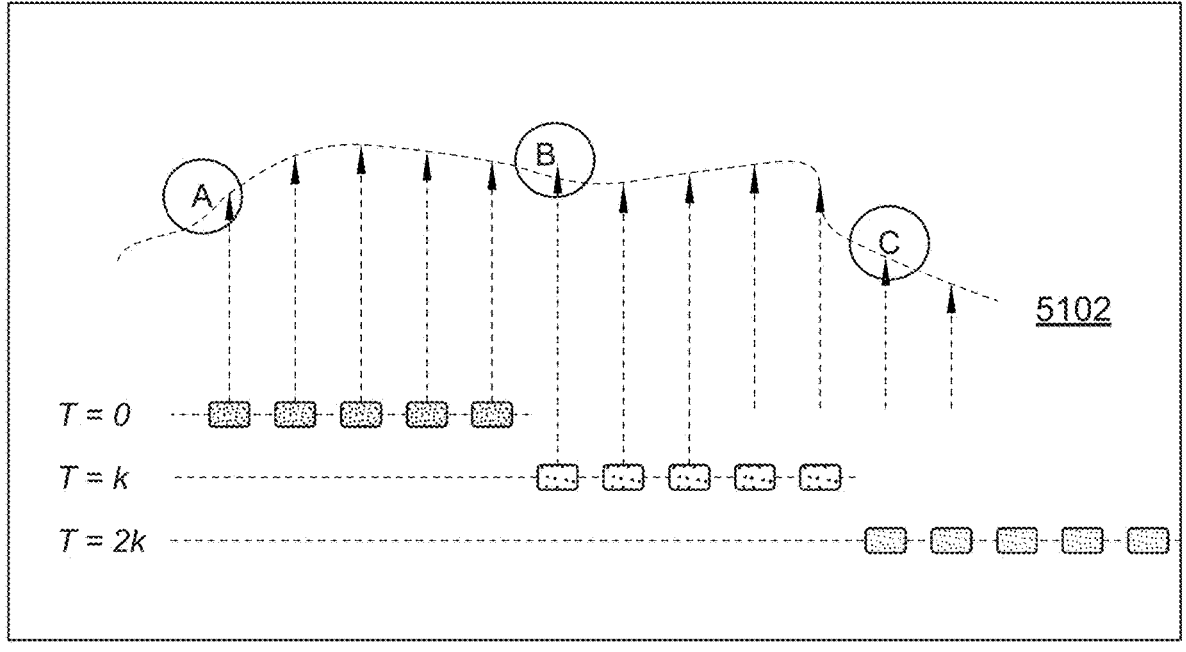
FIG. 25 is a diagram depicting a first action chunking technique that can be employed to generate robot motion.
Figure 26:
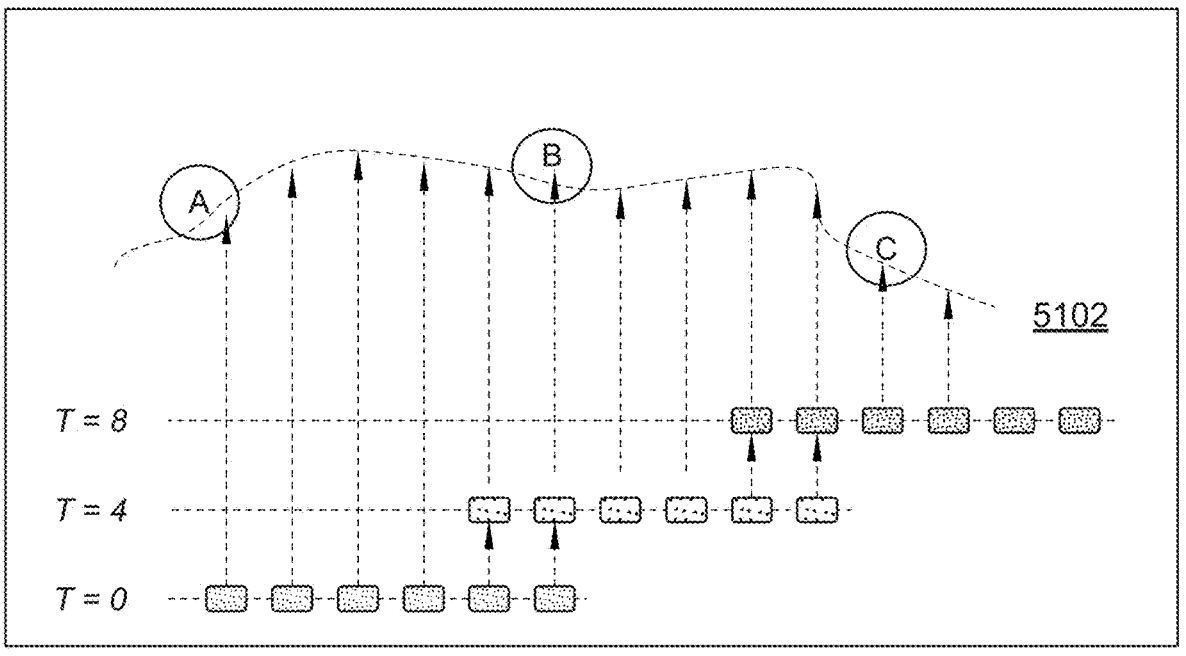
FIG. 26 is a diagram depicting a second action chunking technique that can be employed to generate robot motion.
Figure 27:
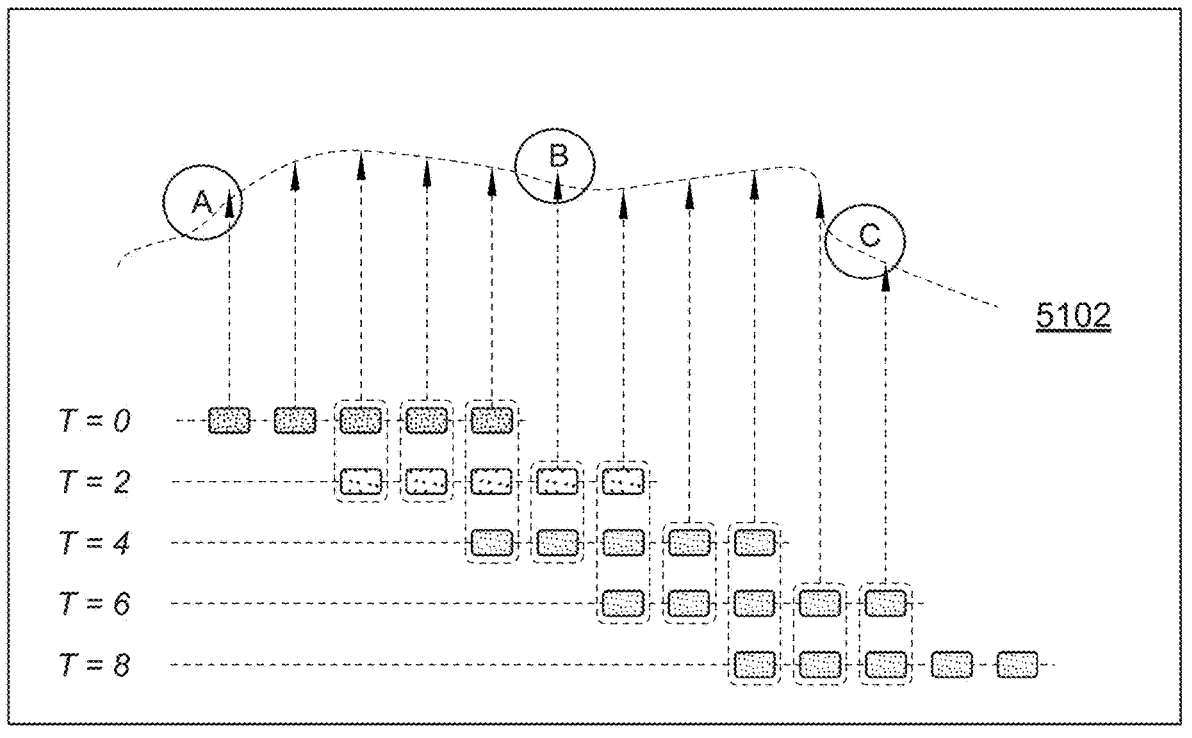
FIG. 27 is a diagram depicting a third action chunking technique that can be employed to generate robot motion.

As the robot moves along a trajectory 5102 from point A to point C, as shown in FIGS. 25-27, different action chunking techniques can be employed to generate the motion. FIG. 25 illustrates a sequential chunking method. At time T=0, the model predicts a chunk of actions, and the robot executes this entire chunk to move along the trajectory. After a fixed interval of k timesteps, at time T=k, the robot takes a new observation and predicts the next chunk of actions. This process repeats at intervals of 2k, 3k, and so on. It should be understood that k may be any value/range that extends from 2 to 10,000. For example, the action chuck can span between 4 and 64 future timesteps. This synchronous method is straightforward to implement, but it may introduce noticeable pauses between the execution of each chunk while the model performs inference. These pauses can lead to jerky, non-fluid motion and can reduce the overall throughput of the task, as the robot must wait for the next set of commands before continuing its movement.

Figure 28:
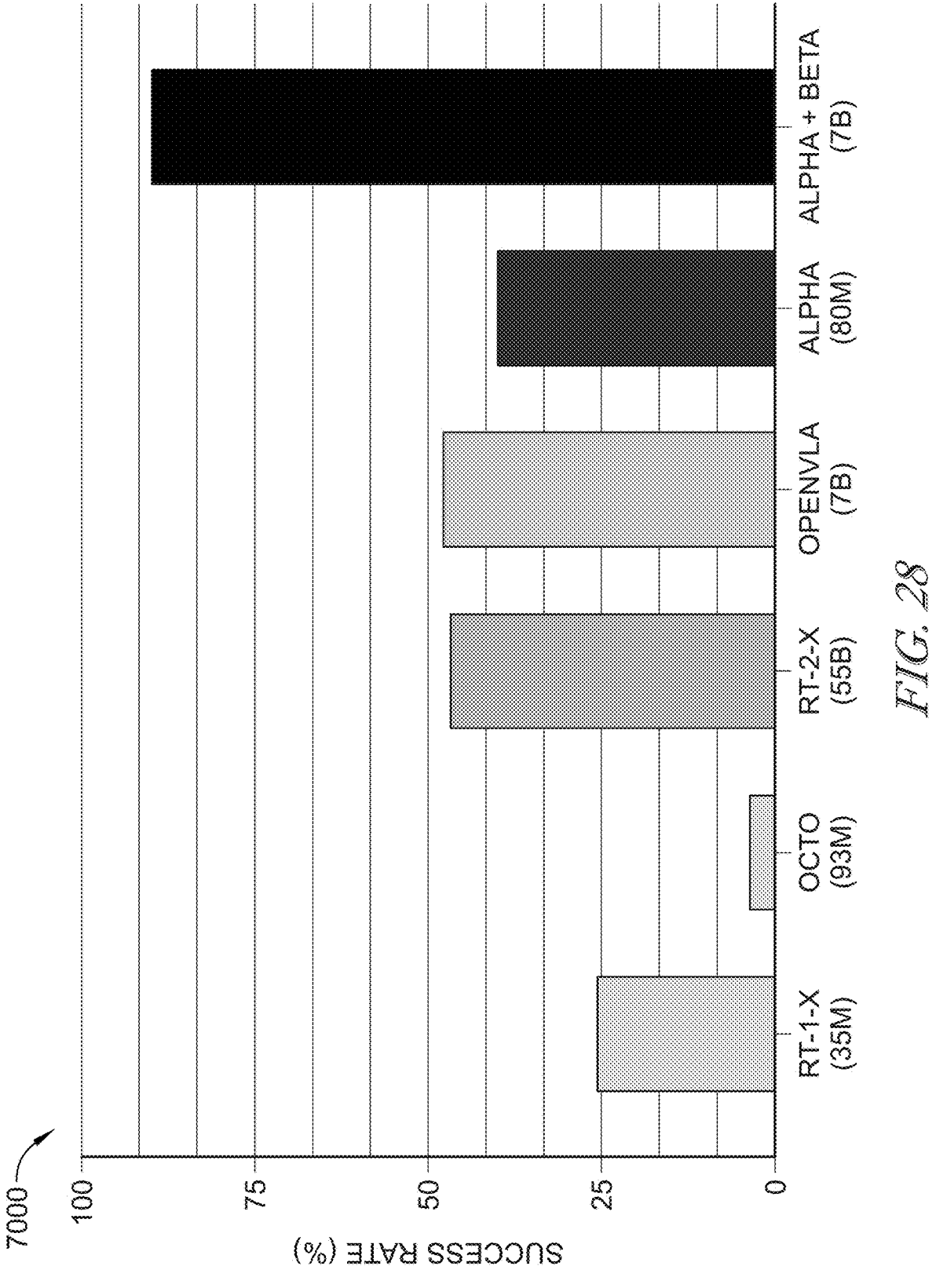
FIG. 28 is a chart illustrating a performance comparison between the BAM and other robotic vision-language-action (VLA) models.

FIG. 26 depicts an asynchronous technique that may be used with flow-matching or diffusion-based policies. This method involves an overlapping execution and prediction process to create a more continuous flow of actions. For example, at time T=0, the model outputs a chunk of a certain size, such as 6 actions. The robot begins executing these actions. Before the entire chunk is completed, for example, at time T=4 after executing the first 4 actions, the model starts generating the next chunk. The key insight of this method is to use the remaining actions from the current chunk (the last two actions in this example) to inform the generation of the new chunk. As shown in FIG. 28, the last two, yet-to-be-executed actions from the chunk generated at T=0 are "frozen," while the model generates the new chunk at T=4, which is conditioned on and consistent with these frozen actions. This ensures a smooth, continuous transition between chunks, effectively eliminating the pauses associated with synchronous methods and making the robot's motion more fluid and reactive.

FIG. 27 illustrates another overlapping execution strategy known as temporal ensembling. In this approach, the BAM is queried much more frequently, for example, at every timestep or every few timesteps (e.g., T=0, T=2, T=4). This frequent querying creates a buffer of multiple, overlapping predicted action chunks. The final action that is executed at any given timestep is not taken from a single chunk, but is instead calculated as a weighted average of all the predictions that have been made for that specific timestep from the different overlapping chunks currently in the buffer. This averaging and summing process, which may use an exponential weighting scheme to give more importance to more recent predictions, helps to smooth out jitter and reduce modeling errors. This results in a more stable and fluid trajectory, as the final command is a consensus of multiple predictions made over a short time window, making the system more robust to transient prediction noise.

e. Performance of Hierarchical BAM

The disclosed hierarchical BAM constitutes a material and substantial improvement over conventional robotic control systems by overcoming fundamental limitations inherent in the prior art. Whereas conventional models are narrowly circumscribed to controlling only a 7-degree-of-freedom ("DoF") end-effector—treating the robot as little more than a disembodied arm—the disclosed BAM architecture is engineered to command the full sixty-two degrees of freedom of the humanoid robot. This comprehensive, whole-body control paradigm represents a significant departure from the state of the art. It enables the robot to execute highly coordinated, human-like motions that leverage its entire physical structure for dynamic balance adjustments, extended reach through torso and leg positioning, and sophisticated obstacle negotiation by repositioning its base. These are capabilities that are unattainable with simplistic end-effector-only controllers, which cannot, by design, coordinate the robot's posture or center of gravity with the manipulation task at hand. The output action can be flexible to cover a wide range of DoFs. For example, the action can cover only the hands or end-effectors (e.g., 18-19 DoFs). control can also be extended to the entire upper body, including the torso, shoulders, elbows, wrists, and hands (e.g., 20-35 DoFs), or the whole body (e.g., up to all 62 DoFs), thereby controlling a high-dimensional action space.

Furthermore, the BAM's operational modality represents a technical advancement. Unlike prior systems that generate discrete, binned-value outputs, thereby artificially constraining motion to a limited set of predefined poses and introducing perceptible jerkiness and imprecision, the BAM generates continuous control outputs in real time. The reliance of the prior art on discrete actions is analogous to a film running at a low frame rate; motion is stilted, unnatural, and incapable of nuanced adjustment. The BAM's continuous control stream, by contrast, facilitates the seamless composition and blending of complex actions, a concept referred to as action chunking, which results in demonstrably smoother, more fluid, and time-consistent robotic movements that more closely resemble biological motion. Consequently, the BAM is not merely an incremental improvement; its architecture directly remedies the deficiencies in motion quality and behavioral range that plague conventional systems. This full-body, continuous-output design allows the robot to make micro-adjustments on the fly, yielding a system that exhibits markedly enhanced robustness to environmental variations and unforeseen operational contingencies, which is a key advantage for real-world deployment where conditions are seldom static.

The technical and functional superiority of the BAM is substantiated by rigorous comparative performance data, as delineated in FIG. 28. In complex manipulation tasks requiring both semantic generalization (e.g., recognizing an object's function regardless of its specific appearance) and motion generalization (e.g., placing an object in a novel position and orientation), the Alpha/Beta-model BAM achieved an approximate 90% success rate. This performance unequivocally surpasses that of established prior art systems, which demonstrated success rates of approximately 48% (OpenVLA), 46% (RT-2-X), 25% (RT-1-X), and 4% (Octo). The disclosed system, therefore, provides a nearly two-fold performance increase over its closest competitors, elevating the technology from the level of a laboratory experiment to one approaching practical, real-world reliability and demonstrating a substantial leap in capability.

Moreover, the BAM architecture achieves this superior performance with unprecedented parameter efficiency, underscoring its sophisticated and optimized design. The Beta-only BAM variant, comprising a relatively lean 80 million parameters, achieves a success rate of approximately 40%. This level of performance is comparable to or materially exceeds that of vastly larger and more computationally demanding models, including the 7-billion-parameter Open VLA and the 55-billion-parameter RT-2-X. The practical implications of this efficiency are profound, translating to lower hardware costs, reduced power consumption for longer operational times, and faster decision-making for improved reactivity. That the disclosed BAM can outperform models that are approximately 87 to 687 times its size provides compelling evidence of its advanced and more effective architecture. Collectively, these interconnected attributes—namely, the expanded 62-DoF control scope and continuous control output that serve as the foundation for the empirically validated superiority in task success, environmental robustness, and parameter efficiency—demonstrate that the disclosed BAM offers profound and tangible technical benefits over conventional models.

The disclosed hierarchical BAM can be trained and deployed in an end-to-end fashion to control the complex, high-degree-of-freedom movements of humanoid robots 1, 2700A-X, enabling seamless integration of perception, planning, and control within a single unified system. The BAM for humanoid robots can ingest multimodal sensory inputs, which may comprise a combination of real-time visual data from onboard cameras, proprioceptive state information from joint encoders and inertial measurement units, force-torque sensor readings from end effectors, and natural language instructions, creating a comprehensive understanding of both the robot's state and task parameters. The BAM can output a continuous sequence of low-level robot control commands, or "actions," that can be utilized by the robot 1, 2700A-X to directly specify joint torques, velocities, or target positions or Deltas thereof, providing smooth and coordinated motion across its entire body.

F. Alternative Embodiments

Although the processes are described herein with respect to training a BAM from a pre-trained model (e.g., MLLM, LLM, VLM, or VLA), various other types of models that may be used by or otherwise deployed at the robot can be trained with the same techniques. In some implementations, the model can be a hybrid system. For example, the model can include one or more mamba layers for each transformer layer of the model. Any combination of mamba layers can help streamline computations and reduce overall resource usage while maintaining or enhancing the performance of the model. The mamba layer(s) can also be used to better capture complex patterns and relationships within multimodal data, thereby improving the overall understanding and accuracy of the model in annotating objects or other aspects of images during runtime. Mamba layers may also speed up both training and inference times, allowing for quicker iterations and responses. Furthermore, the mamba layers can provide improved noise resilience, which helps the model maintain performance in less-than-ideal input conditions (e.g., images captured in poorly lit environments). Similarly, the mamba layers can allow for a scalable model architecture, making it easier to increase model size and complexity without degrading performance. This can be beneficial to ensure the model can accurately annotate many different types of objects captured in images, even if the model has not been previously trained to identify such types of objects, distortions, or other adaptations in the images.

In certain embodiments, the hierarchical BAM architecture 3008.2 may implement dynamic layer allocation mechanisms that adaptively adjust the number of active processing layers in real-time based on operational conditions and resource constraints. The system may continuously monitor computational resource availability through hardware performance counters and thermal sensors, measuring available GPU memory bandwidth, processor utilization, and thermal headroom. A task complexity assessment module may analyze incoming commands and sensory data to compute complexity scores based on factors including the semantic ambiguity of natural language instructions, visual scene complexity measured through edge density and object count, required manipulation precision, and the temporal horizon of the task. Battery and power constraints may be monitored through a power management subsystem that tracks remaining battery capacity, current power draw, and predicted energy consumption for completing the current task. Network latency measurements may be continuously collected through periodic heartbeat signals and round-trip time calculations to cloud-based and edge computing resources.

Environmental uncertainty metrics may be derived from sensor confidence scores, visual occlusion detection, novel object recognition rates, and prediction error in world models. Based on these multi-dimensional measurements, a layer allocation controller may dynamically activate or deactivate layers L2, L3, and L4, while maintaining L1 as continuously active for real-time control. For instance, when battery capacity drops below 20%, network latency exceeds 200 milliseconds, and task complexity scores remain below a threshold indicating routine operations, the system may deactivate the L4 and L3 layers, relying solely on L2 and L1 for efficient local execution. Conversely, when encountering a novel, high-complexity task with adequate computational resources and low network latency, the system may activate all layers to leverage maximum reasoning capability. This dynamic allocation strategy optimizes the trade-off between performance, energy efficiency, and response time, extending operational duration while maintaining task completion capabilities.

The hierarchical BAM architecture 3008.2 may incorporate sparse activation mechanisms wherein individual layers selectively activate based on conditional triggers rather than operating continuously. An anomaly detection module operating at each layer interface may monitor prediction confidence, output entropy, and error residuals from lower-level models to determine when higher-level reasoning is invoked. When the Beta model(s) 3008.2.22A-N successfully generates action commands with confidence scores exceeding a predetermined threshold (e.g., 0.95) and low output entropy (e.g., below 0.1 nats), the Gamma model(s) 3008.2.24 may enter a sleep state, reducing power consumption by approximately 40-60% through clock gating and voltage scaling. The Beta model(s) 3008.2.22A-N continues autonomous operation until a novelty trigger occurs, such as encountering an unfamiliar object configuration, receiving an ambiguous command, or detecting a significant deviation between predicted and observed environmental states.

Upon detecting such triggers, the system generates an escalation signal that activates the dormant Gamma model(s) 3008.2.24, which then provides higher-level guidance to resolve the ambiguity. Similarly, during routine, repetitive operations such as assembly line tasks where the robot executes well-learned motor primitives, the Beta model(s) 3008.2.22A-N may enter a reduced-frequency mode, operating at 1 Hz instead of its nominal 10 Hz, while the Alpha model(s) 3008.2.20A-N maintains high-frequency control. Emergency activation protocols may override sleep states when safety-critical conditions are detected, such as unexpected contact forces exceeding safe thresholds, rapid environmental changes detected through visual motion analysis, or explicit interrupt signals from safety monitoring systems. This sparse activation paradigm implements a form of computational resource allocation inspired by biological attention mechanisms, where mental resources are dynamically focused on challenging tasks while routine operations proceed with minimal oversight. The system may maintain activation state histories and learn optimal triggering thresholds through reinforcement learning, progressively improving the balance between energy conservation and task performance over extended deployment periods.

In embodiments involving multiple humanoid robots 1, 2700A-X operating in proximity, the system may implement peer-to-peer communication protocols that enable direct robot-to-robot information exchange without requiring centralized coordination through command centers 2750A-X or remote AI systems 2780. Each robot may maintain a distributed hash table (DHT) or a similar decentralized data structure that catalogs the locations, capabilities, current tasks, and learned skills of neighboring robots within communication range. A consensus protocol, such as a Byzantine fault-tolerant algorithm or a Raft consensus mechanism, may be employed to maintain a shared environmental model across the robot collective, wherein each robot contributes local observations of object positions, obstacle locations, and dynamic environmental features. When discrepancies arise between individual robot observations, the consensus algorithm resolves conflicts through weighted voting based on sensor confidence scores and historical reliability metrics. Task allocation in this peer-to-peer architecture may be accomplished through distributed auction mechanisms where robots bid on available tasks based on their current workload, proximity to task locations, relevant skill proficiency, and remaining battery capacity. For example, when a high-priority task emerges, robots may broadcast the task specification through the peer network, receive bids from capable robots, and allocate the task to the highest bidder without requiring external arbitration.

Knowledge sharing of newly learned skills may be facilitated through federated learning protocols where robots periodically exchange model weight updates, aggregating improvements discovered through individual operational experiences. The system may implement differential privacy techniques to protect proprietary task-specific optimizations while sharing generalizable skill improvements. Collaborative mapping and localization may be achieved through a distributed SLAM algorithm where each robot maintains a local map that is continuously merged with maps from peer robots through place recognition and loop closure detection. Communication between robots may utilize multiple wireless protocols including WiFi Direct for high-bandwidth local exchange, Bluetooth Low Energy for device discovery and coordination signals, and ultra-wideband (UWB) for precise relative positioning. This peer-to-peer architecture provides several advantages including robustness to single points of failure, reduced communication latency for local coordination, graceful degradation when individual robots malfunction, and scalability to large robot collectives without overwhelming centralized infrastructure.

The hierarchical BAM system may incorporate formal verification techniques to provide mathematical guarantees on safety-critical behaviors during robot operation. A runtime monitoring subsystem may continuously evaluate the robot's state trajectory against formally specified safety properties encoded in temporal logic languages such as Signal Temporal Logic (STL) or Metric Temporal Logic (MTL). These specifications may define constraints such as "the end-effector shall never exceed 2 m/s velocity when within 0.5 meters of a detected human" or "joint torques shall remain within rated limits continuously throughout task execution." The monitoring system evaluates these predicates in real-time by processing sensor data streams and robot state information, computing robustness metrics that quantify how far the current state is from violating safety specifications. When robustness metrics approach zero, indicating an imminent violation, the system triggers preemptive safety interventions. Reachability analysis modules may compute forward reachable sets representing all possible future states achievable from the current robot configuration within a specified time horizon, given the constraints of the robot's dynamics and maximum actuation capabilities.

By intersecting these reachable sets with forbidden regions (e.g., zones occupied by humans, fragile objects, or workspace boundaries), the system can determine whether a collision is unavoidable given the current trajectory. Control barrier functions (CBFs) may be synthesized offline and evaluated online to enforce safety constraints through minimal modifications to nominal control commands. The CBF approach formulates safety as maintaining the invariance of a safe set defined by constraint functions, modifying control inputs through quadratic programming optimization to ensure the robot state remains within safe regions while minimally deviating from desired performance objectives. For neural network-based controllers such as the Alpha model(s) 3008.2.20A-N, certification techniques including abstract interpretation, mixed-integer linear programming (MILP) encoding, or Satisfiability Modulo Theories (SMT) solving may be employed to compute provable bounds on network outputs given bounded input perturbations. These certified bounds enable the determination of worst-case behaviors under sensor noise, perception errors, or adversarial inputs.

Fail-safe fallback controllers, implemented as formally verified model-based controllers with guaranteed stability properties, may be maintained as backup systems that activate when the primary learned controllers encounter out-of-distribution states not covered by their training data. The activation condition for fallback controllers may be determined through uncertainty quantification metrics such as ensemble disagreement in multi-model systems or prediction entropy in Bayesian neural networks. This multi-layered formal verification framework provides defense-in-depth safety assurance, combining runtime monitoring for reactive safety, reachability analysis for predictive safety, control barrier functions for continuous constraint enforcement, and certified fallback controllers for exceptional conditions.

The humanoid robot system may implement comprehensive security hardening measures to defend against malicious attacks targeting the robot's hardware, software, and communication interfaces. Secure boot mechanisms may be implemented through a hardware root of trust, such as a Trusted Platform Module (TPM) or a dedicated secure element, that verifies cryptographic signatures of firmware and software components during the boot sequence, preventing the execution of unauthorized or tampered code. Code signing requirements may extend throughout the software stack, requiring all executable modules, including BAM model weights, control algorithms, and application software, to be signed by authorized private keys with corresponding public keys stored in tamper-resistant hardware. Input validation and sanitization may be performed at all data ingestion points, including camera feeds, microphone inputs, network messages, and user commands, by applying whitelisting of expected input formats, range checking for numerical values, and anomaly detection for unusual patterns. For neural network inputs, adversarial robustness may be enhanced through techniques including adversarial training on perturbation examples, input preprocessing that removes high-frequency perturbations imperceptible to humans but effective against models, and ensemble methods that combine predictions from multiple models trained with diverse augmentation strategies.

Physical adversarial attacks, such as carefully crafted stickers or patterns designed to fool vision systems, may be detected through multi-view consistency checking, temporal coherence analysis, and attention-based saliency detection that identifies suspicious focal points. Secure communication protocols may be implemented using Transport Layer Security (TLS) 1.3 or later for all network connections, with certificate pinning to prevent man-in-the-middle attacks, and perfect forward secrecy through ephemeral key exchange to protect against the compromise of long-term keys. Intrusion detection systems may monitor network traffic patterns, system call sequences, and resource utilization metrics to identify indicators of compromise such as unusual connection attempts, unauthorized file access, or anomalous computational loads. The intrusion detection system may employ machine learning models trained on normal operational patterns to detect zero-day attacks without requiring signature databases. Intrusion response mechanisms may include automatic isolation of compromised subsystems through network segmentation, rollback to known-good software states through verified snapshots, generation of forensic logs for post-incident analysis, and notification of security operations centers through out-of-band communication channels.

Access control may be implemented through role-based access control (RBAC) policies defining permissions for different user classes, with hardware-enforced memory protection preventing unauthorized access to sensitive data structures, and cryptographic key material stored in hardware security modules accessible only through authenticated API calls. Regular security audits, penetration testing, and vulnerability assessments may be conducted throughout the robot's lifecycle, with over-the-air update mechanisms enabling the rapid deployment of security patches while maintaining update authenticity through signature verification and rollback capabilities in case of failed updates.

In some implementations, the hierarchy supports conditional insertion of a lightweight "L2.5" adapter model between L2 and L1 during runtime. The adapter is automatically activated when a certified robustness indicator-such as a control-barrier-function (CBF) feasibility margin, contact stability score, or manipulability index-drops below a threshold; the adapter augments L2 outputs with fine corrective latents (e.g., micro-waypoint Deltas or impedance targets) to restore margin without altering L1's execution rate. When the margin recovers to a hysteresis-gated band, the L2.5 adapter is removed, returning to the nominal two-hop exchange. Activation and removal occur without changing the timing characteristics of L1 (e.g., 100-350 Hz) and may be logged in the medium-term memory for post-hoc verification. In further embodiments, L2 communicates to L1 via a compact latent vector (e.g., a subgoal pose with grasp affordance codes), while L1 concurrently streams back a compressed, low-dimensional task-space differential summary derived from local kinematics and contacts (e.g., a manipulability ellipsoid descriptor, null-space residual, or task-space Jacobian sketch). The "latent-down/Jacobian-up" duplex reduces bandwidth on the edge link and conditions subsequent L2 planning on the instantaneous kinematic affordances of the current posture and environment, improving subgoal selection in clutter and near joint limits. The duplex operates at asymmetric rates consistent with the hierarchy (e.g., Jacobian summaries at 20-100 Hz; latent subgoals at 1-10 Hz).

In other embodiments, the L1 layer may include per-region Alpha micro-policies (e.g., arm, leg, torso, head) that are hot-swapped at runtime based on tool, terrain, or contact regime without requiring a global L1 reset. A lightweight lateral-constraint module runs alongside the micro-policies to enforce cross-limb coupling (e.g., center-of-mass bounds, foot support polygon, head-arm collision cones) by projecting each limb's proposed action chunk through a shared feasibility operator before whole-body synthesis. This preserves continuity when switching limb-specific policies while maintaining balance and collision safety within the disclosed actuator and frequency ranges. In multi-robot deployments, replicas of the Gamma model(s) at L3 may form a peer-to-peer cohort that elects a temporary leader to issue shared, area-level plans (e.g., task allocation and waypoint graphs). A shadow replica-kept in near-lockstep via lightweight state Deltas-assumes leadership within a single L3 cycle upon leader loss ("split-brain" failover), preserving plan continuity without interrupting each robot's local L2/L1 loops. Consensus and failover operate at L3 timescales (e.g., 1-10 Hz) and leverage the disclosed distributed environment to minimize cloud dependency.

In further embodiments, human-readable Signal Temporal Logic (STL) snippets are provided as part of the L2 prompt or context window. The Beta model(s) 3008.2.22A-N compiles the STL into latent constraints (e.g., time-windowed region occupancy, sequencing, and avoidance clauses) that are bound to subgoal tokens delivered to L1. The resulting plan preserves end-to-end traceability from requirement to latent to motion, enabling offline audit and on-robot runtime checks that L1/L2 exchanges remain consistent with the declared STL specification. The L1 Alpha model(s) 3008.2.20A-N may be augmented with a compact key-value memory of short motor primitives. Keys are formed from proprioceptive/visual embeddings; upon recurrence of a similar context, retrieval provides a few-shot prior that seeds the action head, reducing compounding error and data demands for repetitive skills. Entries are updated with priority replay and decay to bound memory while retaining high-value maneuvers.

In further embodiments, during imitation and RL fine-tuning, the training pipeline injects synthetic network delay, clock jitter, and sensor noise profiles matched to the intended deployment tier (fully local, local-plus-home-server, cloud-assisted). The delay/noise schedules are ramped (curriculum) from light to heavy, teaching L2/L1 to maintain stability across the edge-cloud continuum and reducing sim-to-real brittleness when links degrade or handoff latencies increase. In some implementations, the Alpha model(s) 3008.2.20A-N and, optionally, Beta model(s) 3008.2.22A-N are equipped with parameter-efficient adapters (e.g., LoRA, QLORA, AdaLoRA) that can be trained or selected on-device to specialize for new tools, fixtures, or workcells without a full fine-tune. Adapter selection is keyed by task codes embedded in the L2 to L1 latent stream, enabling hot-swap at runtime and rapid rollback, while preserving the small-footprint inference characteristics disclosed for L1. In hybrid deployments, high-capacity perception running in the cloud or local server (e.g., segmentation, affordance detection) is distilled into a tiny on-robot perception head when measured bandwidth drops below a target. The system seamlessly promotes/demotes between remote and distilled heads while holding L1's reactivity constant; feature compatibility is maintained via a common latent schema so that L2/L1 interfaces and chunk semantics remain unchanged during switchover. The runtime scheduler prioritizes L1/L2 control cycles and safety monitors over background learning, logging, and communications. Under compute or network pressure, degradations occur in a prescribed order—throttling cloud-assisted features, then deferring non-critical uploads—while preserving the fixed-rate execution of L1 and the minimum viable cadence of L2. This explicit policy aligns with the disclosed edge-cloud architecture to guarantee that real-time control and safety loops are never preempted by asynchronous services.

G. Industrial Application

While the present disclosure shows several illustrative embodiments of a robot (in particular, a humanoid robot), it should be understood that these embodiments are designed to be examples of the principles of the disclosed assemblies, methods, and systems. They are not intended to limit the broad aspects of the disclosed concepts solely to the specific embodiments that have been illustrated. As will be realized by one skilled in the art, the disclosed robot, and its associated functionality and methods of operation, are capable of other and different configurations. Furthermore, several of its details are capable of being modified in various respects, all without departing from the fundamental scope of the disclosed methods and systems. For example, one or more of the disclosed embodiments, either in part or in whole, may be combined with another disclosed assembly, method, and system to create hybrid implementations. As such, one or more steps from the diagrams or components in the Figures may be selectively omitted or combined in a manner that is consistent with the principles of the disclosed assemblies, methods, and systems. Additionally, the order of one or more steps from the arrangement of components may be omitted or performed in a different order than what is explicitly described. Accordingly, the drawings, diagrams, and the detailed description provided herein are to be regarded as illustrative in nature, and not as restrictive or limiting, of the said humanoid robot. It should be understood that the use of the word "or" when separating element names in connection with a single reference number indicates that the same structure can have two or more different names. For example, the phrase "end effector or hand assembly 56" indicates that the structure that is referenced by the number 56 can be referred to or claimed as either an "end effector" or a "hand assembly." It should be understood that any parameter that disclosed a range herein may be set to any value within that range, and/or may set a smaller range within the larger disclosed range. For example, disclosing a range between 10 million and 2 trillion parameters discloses a range from 1 billion to 50 billion parameters. Further, disclosing a range between 100 mHz to 50 Hz discloses a range from 1 Hz to 50 Hz.

While the above-described methods and systems are primarily designed for use with a general-purpose humanoid robot, it should be understood that the disclosed assemblies, components, learning capabilities, or kinematic capabilities may be adapted for use with other types of robots. Examples of other such robots include, but are not limited to: an articulated robot (e.g., an arm having two, six, or ten degrees of freedom, etc.), a cartesian robot (e.g., rectilinear or gantry robots, robots having three prismatic joints, etc.), a Selective Compliance Assembly Robot Arm (SCARA) robot (e.g., a robot with a donut-shaped work envelope, with two parallel joints that provide compliance in one selected plane, with rotary shafts positioned vertically, with an end effector attached to an arm, etc.), a Delta robot (e.g., a parallel link robot with parallel joint linkages connected with a common base, having direct control of each joint over the end effector, which may be used for pick-and-place or product transfer applications, etc.), a polar robot (e.g., a robot with a twisting joint connecting the arm with the base and a combination of two rotary joints and one linear joint connecting the links, having a centrally pivoting shaft and an extendable rotating arm, a spherical robot, etc.), a cylindrical robot (e.g., a robot with at least one rotary joint at the base and at least one prismatic joint connecting the links, with a pivoting shaft and an extendable arm that moves vertically and by sliding, with a cylindrical configuration that offers vertical and horizontal linear movement along with rotary movement about the vertical axis, etc.), wheeled robots with torsos and arms, a self-driving car, a kitchen appliance, construction equipment, or a variety of other types of robot systems. The robot system may include one or more sensors (e.g., cameras, temperature sensors, pressure sensors, force sensors, inductive or capacitive touch sensors), motors (e.g., servo motors and stepper motors), actuators, biasing members, encoders, a housing, or any other component that is known in the art and is used in connection with robot systems. Likewise, the robot system may omit one or more of the aforementioned sensors (e.g., cameras, temperature sensors, pressure sensors, force sensors, inductive or capacitive touch sensors), motors (e.g., servo motors and stepper motors), actuators, biasing members, encoders, a housing, or any other component that is known in the art to be used in connection with robot systems. In other embodiments, other configurations or components may be utilized.

As is well known in the data processing and communications arts, a general-purpose computer typically comprises a central processor or other processing device, an internal communication bus, various types of memory or storage media (e.g., RAM, ROM, EEPROM, cache memory, disk drives, etc.) for code and data storage, and one or more network interface cards or ports for communication purposes. The software functionalities that are described herein involve programming, which includes executable code as well as associated stored data. This software code is executable by the general-purpose computer. In operation, the code is stored within the memory of the general-purpose computer platform. At other times, however, the software may be stored at other locations or transported for loading into the appropriate general-purpose computer system.

A server, for example, typically includes a data communication interface for engaging in packet data communication over a network. The server also includes a central processing unit (CPU), which may be in the form of one or more processors, for executing the program instructions.

The server platform typically includes an internal communication bus, program storage, and data storage for the various data files that are to be processed or communicated by the server, although the server often receives its programming and data via network communications. The hardware elements, operating systems, and programming languages of such servers are conventional in nature, and it is presumed that those who are skilled in the art are adequately familiar therewith. The server functions may be implemented in a distributed fashion on a number of similar platforms to distribute the processing load.

Hence, aspects of the disclosed methods and systems that are outlined above may be embodied in the form of computer programming. Program aspects of the technology may be thought of as "products" or "articles of manufacture," which are typically in the form of executable code or associated data that is carried on or embodied in a type of machine-readable medium. "Storage" type media includes any or all of the tangible memory of the computers, processors, or the like, or any associated modules thereof. This may include various semiconductor memories, tape drives, disk drives, and the like, which may provide non-transitory storage at any time for the software programming. All or portions of the software may at times be communicated through the Internet or various other telecommunication networks. Thus, another type of media that may bear the software elements includes optical, electrical, and electromagnetic waves, such as those that are used across physical interfaces between local devices, through wired and optical landline networks, and over various air-links. The physical elements that carry such waves, such as wired or wireless links, optical links, or the like, also may be considered as media that bear the software. As used herein, unless specifically restricted to non-transitory, tangible "storage" media, terms such as computer or machine "readable medium" refer to any medium that participates in the process of providing instructions to a processor for execution.

A machine-readable medium may take many forms, including but not limited to, a tangible storage medium, a carrier wave medium, or a physical transmission medium. Non-volatile storage media include, for example, optical or magnetic disks, such as any of the storage devices in any computer or computers or the like, such as may be used to implement the disclosed methods and systems. Volatile storage media include dynamic memory, such as the main memory of such a computer platform. Tangible transmission media include components such as coaxial cables, copper wire, and fiber optics, including the wires that comprise a bus within a computer system. Carrier-wave transmission media can take the form of electric or electromagnetic signals, or acoustic or light waves, such as those that are generated during radio frequency (RF) and infrared (IR) data communications. Common forms of computer-readable media therefore include, for example: a floppy disk, a flexible disk, a hard disk, magnetic tape, any other magnetic medium, a CD-ROM, a DVD or DVD-ROM, any other optical medium, punch cards, paper tape, any other physical storage medium with patterns of holes, a RAM, a PROM and EPROM, a FLASH-EPROM, any other memory chip or cartridge, a carrier wave that is transporting data or instructions, cables or links that are transporting such a carrier wave, or any other medium from which a computer can read programming code or data. Many of these forms of computer-readable media may be involved in carrying one or more sequences of one or more instructions to a processor for execution.

It is to be understood that the invention is not limited to the exact details of construction, operation, exact materials, or specific embodiments shown and described herein, as obvious modifications and equivalents will be apparent to one who is skilled in the art. While the specific embodiments have been illustrated and described in detail, numerous modifications may come to mind without significantly departing from the spirit of the invention, and the scope of protection is only limited by the scope of the accompanying Claims. In the drawings, some structural or method features may be shown in specific arrangements or orderings. However, it should be appreciated that such specific arrangements or orderings may not be required. Rather, in some embodiments, such features may be arranged in a different manner or order than shown in the illustrative figures. Additionally, the inclusion of a structural or method feature in a particular figure is not meant to imply that such a feature is required in all embodiments and, in some embodiments, may not be included or may be combined with other features.

It should also be understood that the term "substantially" as utilized herein means a deviation of less than 15% and preferably less than 5%. It should also be understood that the term "near" means within 10 cm, the term "proximate" means within 5 cm, and the term "adjacent" means within 1 cm. It should also be understood that other configurations or arrangements of the above-described components are contemplated by this Application. Moreover, the description provided in the background section should not be assumed to be prior art merely because it is mentioned in or associated with the background section. The background section may include information that describes one or more aspects of the subject of the technology. Finally, the mere fact that something is described as conventional does not mean that the Applicant admits it is prior art.

The following applications are hereby incorporated by reference for any purpose: (i) PCT Application Nos. PCT/US25/10425, PCT/US25/11450, PCT/US25/12544, PCT/US25/16930, PCT/US25/19793, PCT/US25/23064, PCT/US25/23325, PCT/US25/24817, and PCT/US25/25005; (ii) U.S. patent application Ser. Nos. 18/919,263, 18/919,274, 19/000,626, 19/006,191, 19/033,973, 19/038,657, 19/064,596, 19/066,122, 19/180,106, 19/223,945, 19/224,109, 19/224,252, 19/249,517, 19/252,392, 19/252,708, 19/306,591, 19/319,712, 19/322,446, 19/323,751, 19/325,486, 19/325,415, 19/321,159, 19/324,342, 19/329,008, 19/329,474, 19/329,559, 19/337,845, 19/337,852, 19/337,899, 19/347,690, 19/342,470, 19/342,474, 19/347,994, 19/351,294, 19/352,959, 19/355,393, 19/321,022, 19/355,531, 19/355,786, 19/357,879, 19/358,414; and (iii) U.S. Design patents application Ser. Nos. 29/889,764, 29/928,748, 29/935,680, 29/954,572, 29/967,462, 29/993,115, 29/998,761, 30/024,341, 30/024,351, 30/024,102, 30/024,341, 30/026,493, 30/026,579, 30/026,737, 30/026,738, 30/026,746, 30/026,750, 30/026,978, and 30/024,351; (iv) U.S. Provisional Patent Application Nos. 63/556,102, 63/557,874, 63/558,373, 63/561,307, 63/561,311, 63/561,313, 63/561,315, 63/561,317, 63/561,318, 63/564,741, 63/565,077, 63/573,226, 63/573,528, 63/573,543, 63/574,349, 63/614,499, 63/615,766, 63/617,762, 63/620,633, 63/625,362, 63/625,370, 63/625,381, 63/625,384, 63/625,389, 63/625,405, 63/625,423, 63/625,431, 63/626,028, 63/626,030, 63/626,034, 63/626,035, 63/626,037, 63/626,039, 63/626,040, 63/626,105, 63/632,630, 63/632,683, 63/633,113, 63/633,405, 63/633,920, 63/633,931, 63/633,941, 63/634,042, 63/634,599, 63/634,697, 63/635,152, 63/677,087, 63/685,856, 63/690,334, 63/692,747, 63/692,765, 63/694,253, 63/694,304, 63/696,507, 63/696,533, 63/697,793, 63/697,816, 63/700,749, 63/702,185, 63/705,715, 63/706,768, 63/707,547, 63/707,897, 63/707,949, 63/708,003, 63/715,117, 63/715,270, 63/720,222, 63/722,057, 63/753,670, 63/757,440, 63/759,665, 63/760,617, 63/763,209, 63/766,911, 63/770,620, 63/770,654, 63/772,440, 63/773,078, 63/776,429, 63/792,520, 63/819,533, 63/837,511, 63/837,536, 63/839,386, 63/839,517, 63/839,612, 63/839,880, 63/839,918, and 63/841,314, each of which is expressly incorporated by reference herein in its entirety.

In this application, to the extent any U.S. patents, U.S. patent applications, or other materials (e.g., articles) have been incorporated by reference, the text of such materials is only incorporated by reference to the extent that it does not conflict with the materials, statements, and drawings set forth herein. In the event of such a conflict, the text of the present document controls, and terms in this document should not be given a narrower reading in virtue of the way in which those terms are used in other materials incorporated by reference. It should also be understood that structures or features not directly associated with a robot cannot be adopted or implemented into the disclosed humanoid robot without careful analysis and verification of the complex realities of designing, testing, manufacturing, and certifying a robot for the completion of usable work nearby or around humans. Theoretical designs that attempt to implement such modifications from non-robotic structures or features are insufficient, and in some instances, woefully insufficient, because they amount to mere design exercises that are not tethered to the complex realities of successfully designing, manufacturing, and testing a robot.

The invention claimed is:

1. A method for controlling a humanoid robot using a hierarchical bipedal action model (BAM), comprising:
   obtaining a hierarchical BAM that is generated by:
      collecting training data comprising: (i) obtaining video data from a $3^{rd}$ party database, and (ii) obtaining real-world robot demonstrations;
      preprocessing the training data to form distinct segments that have natural language descriptions;
      training, using the preprocessed training data, both a Beta model and an Alpha model; and
   deploying the trained hierarchical BAM on a humanoid robot; and
   controlling the humanoid robot to perform an autonomous task using the trained hierarchical BAM.

2. The method of claim 1, wherein deploying the hierarchical BAM comprises loading the Alpha model on a GPU that is positioned within the humanoid robot.

3. The method of claim 1, wherein at least one of the Alpha model and the Beta model is a diffusion model.

4. The method of claim 1, wherein the Beta model operates at a frequency that is less than 50 Hz.

5. The method of claim 4, wherein the Beta model is trained using a cross-entropy loss function and has more than 500 million parameters.

6. The method of claim 1, wherein the Alpha model operates at a frequency that is greater than 50 Hz.

7. The method of claim 6, wherein the Alpha model is trained using a regression-based loss function and has fewer than 500 million parameters.

8. The method of claim 1, wherein the Alpha and Beta models are trained end-to-end, and wherein said training includes allowing error gradients from the output of the Alpha model to be backpropagated through the Beta model.

9. The method of claim 1, further comprising the step of executing a safety verification that rejects or truncates outputs from the Alpha model that violate a predetermined constraint.

10. The method of claim 1, wherein the step of collecting training data includes capturing first-person video data synchronized with head and hand positions using a virtual reality or augmented reality headset.

11. The method of claim 1, wherein the natural language descriptions are generated using an AI model.

12. The method of claim 1, wherein obtaining a hierarchical BAM includes the step of obtaining at least one pre-trained model having a set of parameters; and wherein training the hierarchical BAM includes using supervised learning to modify the set of parameters based in part on the preprocessed training data.

13. The method of claim 2, wherein deploying the trained hierarchical BAM includes loading the Beta model on a GPU that is not positioned within the humanoid robot.

14. A method for controlling a robot using a hierarchical action model, comprising:

obtaining a hierarchical action model by:

collecting training data comprising obtaining: (i) video data from a $3^{rd}$ party database, (ii) first-person video data, and (iii) data from a robot demonstration;

training, using the training data, a hierarchical action model that includes an Alpha model and a Beta model, and wherein the Alpha model has a first number of parameters and the Beta model has a second number of parameters that is larger than the first number of parameters; and deploying the trained hierarchical action model on a robot; and controlling the robot to perform an autonomous task using the trained hierarchical action model.

15. The method of claim 14, wherein controlling the robot includes the step of using a retrieval-augmented generation technique to obtain additional real-time knowledge from external sources.

16. The method of claim 14, wherein at least one of the Alpha and Beta models is a diffusion model.

17. The method of claim 16, wherein the Alpha model is trained using reinforcement learning.

18. The method of claim 17, wherein the Beta model is trained using unsupervised learning.

19. The method of claim 14, wherein controlling the robot includes generating continuous actions comprising a first set of X, Y, Z floating-point coordinates and a first set of X, Y, Z floating-point rotations.

20. The method of claim 14, wherein deploying the hierarchical action model comprises loading the Alpha model on a GPU that is positioned within the robot.

21. The method of claim 20, wherein deploying the trained hierarchical action model includes loading the Beta model on a GPU that is not positioned within the robot.

22. The method of claim 14, wherein the first-person video data is captured using a virtual reality or augmented reality headset.

23. A method for controlling a robot using an action model, comprising:

obtaining an action model by:

collecting training data comprising obtaining: (i) video data from a $3^{rd}$ party database, (ii) first-person video data, and (iii) data from a robot demonstration;

training an action model using the training data, and wherein the action model includes more than 1 billion parameters; and deploying the trained action model on a robot; and using the trained action model to generate continuous meter-actions.

24. The method of claim 23, wherein the first-person video data is captured using a virtual reality or augmented reality headset.

25. The method of claim 23, wherein the continuous actions include a first set of X, Y, Z floating-point coordinates and a first set of X, Y, Z floating-point rotations.

26. The method of claim 23, wherein the action model is trained using reinforcement learning and the deployment of the action model includes loading the model on a GPU located within the robot.

27. The method of claim 23, further comprising using a retrieval-augmented generation technique to obtain additional real-time knowledge from sources that are external to the robot.

28. The method of claim 23, further comprising the step of executing a safety verification that rejects or truncates outputs from the action model that violate a predetermined constraint.

29. The method of claim 1, wherein controlling the humanoid robot includes the step of using a retrieval-augmented generation technique to obtain additional real-time knowledge from external sources.

30. The method of claim 1, wherein the Beta model is trained using unsupervised learning and the Alpha model is trained using reinforcement learning.

31. The method of claim 1, wherein the hierarchical BAM further comprises a Gamma model that includes more than 1 trillion parameters, and wherein the Gamma model is not deployed on the humanoid robot.

32. The method of claim 1, wherein controlling the humanoid robot includes using the trained hierarchical BAM to generate continuous actions.

33. The method of claim 1, wherein controlling the humanoid robot includes using the trained hierarchical BAM to generate X, Y, Z floating-point coordinates and X, Y, Z floating-point rotations.

34. The method of claim 1, wherein the humanoid robot includes at least thirty electric actuators, and wherein at least ten of the thirty electric actuators include a strain wave gearbox.

35. The method of claim 1, wherein a majority of the humanoid robot is covered with a deformable textile that includes polymers.

36. The method of claim 35, wherein the humanoid robot includes an illumination assembly configured to communicate the humanoid robot's status.

37. The method of claim 14, wherein the Beta model operates at a frequency that is less than 50 Hz and has more than 500 million parameters.

38. The method of claim 37, wherein the Alpha model operates at a frequency that is greater than 50 Hz and has fewer than 500 million parameters.

39. The method of claim 38, wherein the Alpha and Beta models are trained end-to-end, and wherein said training includes allowing error gradients from the output of the Alpha model to be backpropagated through the Beta model.

40. The method of claim 39, wherein the Beta model is trained using a cross-entropy loss function and the Alpha model is trained using a regression-based loss function.

41. The method of claim 14, wherein the robot includes at least thirty electric actuators, and wherein at least one of the thirty electric actuators includes a strain wave gearbox.

42. The method of claim 41, wherein a majority of the robot is covered with a deformable textile that includes polymers.

43. The method of claim 14, wherein the hierarchical action model further comprises a Gamma model that includes more than 1 trillion parameters, and wherein the Gamma model is locally hosted relative to the robot.

44. The method of claim 23, wherein the action model includes an Alpha model that operates at a frequency that is greater than 50 Hz and has fewer than 500 million parameters.

45. The method of claim 44, wherein the action model includes a Beta model that operates at a frequency that is less than 50 Hz and has more than 500 million parameters.

46. The method of claim 45, wherein the Beta model is trained using a cross-entropy loss function and the Alpha model is trained using a regression-based loss function.

47. The method of claim 23, wherein the action model includes an Alpha model and a Beta model, and said Alpha and Beta models are trained end-to-end, and wherein said training includes allowing error gradients from the output of the Alpha model to be backpropagated through the Beta model.

48. The method of claim 23, wherein the robot includes at least thirty electric actuators, and wherein at least one of the thirty electric actuators includes a strain wave gearbox.

49. The method of claim 48, wherein a majority of the robot is covered with a deformable textile that includes polymers.

50. The method of claim 23, wherein the action model further comprises a Gamma model that includes more than 1 trillion parameters, and wherein the Gamma model is locally hosted relative to the robot.

51. A method for controlling a robot using a model, comprising:

obtaining a model by:

collecting training data comprising obtaining: (i) video data from a $3^{rd}$ party database, and (ii) data from a robot demonstration;

training a model using the training data, and wherein the trained model includes more than 1 billion parameters; and deploying the trained model on a robot; and using the trained model to generate X, Y, Z floating-point coordinates and X, Y, Z floating-point rotations.

52. The method of claim 51, further comprising using a retrieval-augmented generation technique to obtain additional real-time knowledge from sources that are external to the robot.

53. The method of claim 51, wherein the model includes: (i) a Beta model that operates at a frequency that is less than 50 Hz, and (ii) an Alpha model that operates at a frequency that is more than 50 Hz.

54. The method of claim 53, wherein the Alpha and Beta models are trained end-to-end, and wherein said training includes allowing error gradients from the output of the Alpha model to be backpropagated through the Beta model.

55. The method of claim 51, wherein the model includes: (i) an Alpha model that has fewer than 500 million parameters, and (ii) a Beta model that has more than 500 million parameters.

56. The method of claim 55, wherein the Alpha and Beta models are trained end-to-end, and wherein said training includes allowing error gradients from the output of the Alpha model to be backpropagated through the Beta model.

57. The method of claim 56, wherein the model includes: (i) an Alpha model that is trained using a regression-based loss function, and (ii) a Beta model that is trained using a cross-entropy loss function.

58. The method of claim 51, wherein the robot includes at least thirty electric actuators, and wherein at least one of the thirty electric actuators includes a strain wave gearbox.

59. The method of claim 58, wherein a majority of the robot is covered with a deformable textile that includes polymers.

60. The method of claim 51, wherein the model further comprises a Gamma model that includes more than 1 trillion parameters, and wherein the Gamma model is locally hosted relative to the robot.

* * * * *